US007778924B1

(12) United States Patent
Ananda

(10) Patent No.: US 7,778,924 B1
(45) **Date of Patent: *Aug. 17, 2010**

(54) SYSTEM AND METHOD FOR TRANSFERRING ITEMS HAVING VALUE

(75) Inventor: Mohan Ananda, Westlake Village, CA (US)

(73) Assignee: Stamps.com, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/668,421

(22) Filed: Sep. 22, 2000

Related U.S. Application Data

(60) Division of application No. 09/163,993, filed on Sep. 29, 1998, which is a continuation-in-part of application No. 08/872,792, filed on Jun. 10, 1997, now Pat. No. 6,671,813.

(51) Int. Cl.
*G06F 21/00* (2006.01)

(52) U.S. Cl. ............................ 705/50; 705/51; 705/52; 705/53; 705/54; 705/56; 705/57; 705/58; 705/59

(58) Field of Classification Search ................. 705/401, 705/410, 60, 408, 61, 62, 402, 403, 404, 705/405, 406, 407, 409, 50–59; 380/51, 380/55
See application file for complete search history.

(56) References Cited

U.S. PATENT DOCUMENTS 3,798,605 A * 3/1974 Feistel ........................ 713/155
4,253,158 A 2/1981 McFiggans (Continued)

FOREIGN PATENT DOCUMENTS

EP 0 782 111 7/1997

(Continued)

OTHER PUBLICATIONS

"Encrypted Data Transmission with Dynamic Key Renewal.", Aug. 1992, IBM Technical Disclosure Bulletin, vol. 35, Issue 3, pp. 62-62.*

(Continued)

*Primary Examiner*—Calvin Loyd Hewitt, II
*Assistant Examiner*—Cristina Owen Sherr
(74) *Attorney, Agent, or Firm*—The Hecker Law Group, PLC

(57) ABSTRACT

The present invention is directed to a system for providing secured access to a software rental or a postage metering system. The virtual postage meter software of this invention enables a user to print postage indicia on documents, envelopes or labels. To generate valid postage indicia the virtual meter software is executed on a first computer while it is in communication with the remotely located second computer. All communication between the first computer and the second computer utilize data encryption algorithms to preserve the security and integrity of the data transferred. In one embodiment, the second computer is a collection of one or more computers with virtual postage meter enabling software capable of communicating simultaneously to a number of user computers that are concurrently executing the virtual postage meter software. The second computer is connected to one or more US FIPS 140-1 security level 3 or better certified cryptographic devices identified as Postal Security Devices (PSD). The printed postage indicia appears as a two-dimensional barcode that includes digital signature, amount of postage, ZIP code and other relevant information.

20 Claims, 34 Drawing Sheets

U.S. PATENT DOCUMENTS

| | | | | |
|---|---|---|---|---|
| 4,301,507 | A | | 11/1981 | Soderberg et al. |
| 4,447,890 | A | | 5/1984 | Duwel et al. |
| 4,471,441 | A | | 9/1984 | Check, Jr. |
| 4,562,306 | A | | 12/1985 | Chou et al. |
| 4,661,001 | A | | 4/1987 | Takai et al. |
| 4,682,793 | A | | 7/1987 | Walz |
| 4,725,718 | A | | 2/1988 | Sansone et al. |
| 4,743,747 | A | | 5/1988 | Fougere et al. |
| 4,752,950 | A | * | 6/1988 | Le Carpentier ........ 379/106.11 |
| 4,757,537 | A | | 7/1988 | Edelmann et al. |
| 4,775,246 | A | * | 10/1988 | Edelmann et al. ............. 705/62 |
| 4,802,217 | A | | 1/1989 | Michener |
| 4,802,218 | A | | 1/1989 | Wright et al. |
| 4,812,994 | A | | 3/1989 | Taylor et al. |
| 4,813,912 | A | | 3/1989 | Chickneas et al. |
| 4,831,555 | A | | 5/1989 | Sansone et al. |
| 4,853,865 | A | | 8/1989 | Sansone et al. |
| 4,854,961 | A | | 8/1989 | Pastor |
| 4,858,138 | A | | 8/1989 | Talmadge |
| 4,862,386 | A | | 8/1989 | Axelrod et al. |
| 4,864,506 | A | | 9/1989 | Storace |
| 4,900,903 | A | | 2/1990 | Wright et al. |
| 4,900,904 | A | | 2/1990 | Wright et al. |
| 4,908,770 | A | | 3/1990 | Breault et al. |
| 4,933,849 | A | | 6/1990 | Connel et al. |
| 4,935,961 | A | | 6/1990 | Gargiulo et al. |
| 4,949,257 | A | | 8/1990 | Orbach |
| 4,949,381 | A | | 8/1990 | Pastor |
| 4,970,504 | A | | 11/1990 | Chen |
| 4,980,542 | A | | 12/1990 | Jackson et al. |
| 4,991,208 | A | * | 2/1991 | Walker et al. ............... 380/239 |
| 4,994,986 | A | | 2/1991 | Cihiwsky et al. |
| 4,999,806 | A | | 3/1991 | Chernow et al. |
| 5,047,928 | A | | 9/1991 | Wiedemer |
| 5,058,008 | A | | 10/1991 | Schumacher |
| 5,060,263 | A | * | 10/1991 | Bosen et al. ................ 713/184 |
| 5,109,413 | A | | 4/1992 | Comerford |
| 5,111,030 | A | | 5/1992 | Brasington et al. |
| 5,142,577 | A | | 8/1992 | Pastor |
| 5,153,917 | A | | 10/1992 | Kato |
| 5,166,886 | A | | 11/1992 | Molnar et al. |
| 5,181,245 | A | | 1/1993 | Jones |
| 5,267,171 | A | | 11/1993 | Suzuki et al. |
| 5,293,319 | A | | 3/1994 | DeSha et al. |
| 5,311,596 | A | | 5/1994 | Scott et al. |
| 5,319,562 | A | | 6/1994 | Whitehouse |
| 5,323,465 | A | | 6/1994 | Avarne |
| 5,341,505 | A | | 8/1994 | Whitehouse |
| 5,346,202 | A | | 9/1994 | Jurkewitz |
| 5,377,268 | A | | 12/1994 | Hunter |
| 5,377,269 | A | | 12/1994 | Heptig et al. |
| 5,448,641 | A | | 9/1995 | Pintsov et al. |
| 5,454,038 | A | * | 9/1995 | Cordery et al. ............... 705/60 |
| 5,457,642 | A | | 10/1995 | Brookner |
| 5,476,420 | A | | 12/1995 | Manning |
| 5,481,611 | A | | 1/1996 | Owens et al. |
| 5,495,411 | A | | 2/1996 | Ananda |
| 5,510,992 | A | | 4/1996 | Kara |
| 5,548,645 | A | | 8/1996 | Ananda |
| 5,553,139 | A | | 9/1996 | Ross et al. |
| 5,553,143 | A | | 9/1996 | Ross et al. |
| 5,570,465 | A | | 10/1996 | Tsakanikas |
| 5,573,277 | A | | 11/1996 | Petkovsek |
| 5,606,507 | A | | 2/1997 | Kara |
| 5,612,884 | A | | 3/1997 | Haines |
| 5,638,513 | A | * | 6/1997 | Ananda ......................... 726/5 |
| 5,657,689 | A | * | 8/1997 | Lee ............................ 705/410 |
| 5,666,284 | A | | 9/1997 | Kara |
| 5,666,421 | A | | 9/1997 | Pastor et al. |
| 5,677,720 | A | | 10/1997 | Sung et al. |
| 5,682,318 | A | | 10/1997 | Kara |
| 5,684,951 | A | | 11/1997 | Goldman et al. |
| 5,717,597 | A | | 2/1998 | Kara |
| 5,742,683 | A | | 4/1998 | Lee et al. |
| 5,745,887 | A | | 4/1998 | Gargiulo et al. |
| 5,754,306 | A | | 5/1998 | Taylor et al. |
| 5,774,886 | A | | 6/1998 | Kara |
| 5,778,076 | A | | 7/1998 | Kara et al. |
| 5,781,438 | A | | 7/1998 | Lee et al. |
| 5,781,634 | A | | 7/1998 | Cordery et al. |
| 5,793,867 | A | | 8/1998 | Cordery et al. |
| 5,796,834 | A | | 8/1998 | Whitney et al. |
| 5,796,841 | A | | 8/1998 | Cordery et al. |
| 5,799,290 | A | | 8/1998 | Dolan et al. |
| 5,801,364 | A | | 9/1998 | Kara et al. |
| 5,801,944 | A | | 9/1998 | Kara |
| 5,812,991 | A | | 9/1998 | Kara |
| 5,819,240 | A | | 10/1998 | Kara |
| 5,822,739 | A | * | 10/1998 | Kara .......................... 705/410 |
| 5,825,893 | A | | 10/1998 | Kara |
| 5,884,277 | A | | 3/1999 | Khosla |
| 5,896,293 | A | | 4/1999 | Teramoto et al. |
| 5,905,774 | A | | 5/1999 | Tatchell et al. |
| 5,918,234 | A | | 6/1999 | Shah et al. |
| 5,923,762 | A | | 7/1999 | Dolan et al. |
| 5,929,415 | A | | 7/1999 | Berson |
| 5,930,796 | A | | 7/1999 | Pierce et al. |
| 5,943,658 | A | | 8/1999 | Gravell et al. |
| 5,953,427 | A | | 9/1999 | Cordery et al. |
| 5,966,714 | A | | 10/1999 | Huang et al. |
| 5,983,227 | A | | 11/1999 | Nazem et al. |
| 5,987,441 | A | | 11/1999 | Lee et al. |
| 5,988,897 | A | | 11/1999 | Pierce et al. |
| 6,005,945 | A | * | 12/1999 | Whitehouse ................. 380/51 |
| 6,010,156 | A | | 1/2000 | Block |
| 6,012,039 | A | | 1/2000 | Hoffman et al. |
| 6,026,385 | A | | 2/2000 | Harvey et al. |
| 6,039,257 | A | | 3/2000 | Berson et al. |
| 6,061,672 | A | | 5/2000 | Baker et al. |
| 6,064,993 | A | | 5/2000 | Ryan, Jr. |
| 6,070,150 | A | | 5/2000 | Remington et al. |
| 6,151,590 | A | * | 11/2000 | Cordery et al. ......... 705/410 X |
| 6,160,877 | A | | 12/2000 | Tatchell et al. |
| 6,173,273 | B1 | | 1/2001 | Herbert |
| 6,175,626 | B1 | | 1/2001 | Aucsmith et al. |
| 6,356,882 | B1 | | 3/2002 | Carroll et al. |
| 6,385,731 | B2 | | 5/2002 | Ananda |
| 6,470,327 | B1 | | 10/2002 | Carroll et al. |
| 6,523,014 | B1 | | 2/2003 | Pauschinger |

FOREIGN PATENT DOCUMENTS

| | | |
|---|---|---|
| WO | WO 95/17732 | 6/1995 |
| WO | WO 98/57302 | 12/1998 |

OTHER PUBLICATIONS

"Information Based Indicia Program (IBIP) Indicium Specification", Jun. 13, 1996, The United States Postal Service, Engineering Center, 23 pages.*

Information Based Indicia Program Host System Specification, Draft, Oct. 9, 1996, The United States Postal Service (USPS).

* cited by examiner

DATABASE COMPUTER
122
DISPLAY
124
132
KEYBOARD
128
120
134
MULTI-USER MODEM
126
CENTRAL RENTAL FACILITY
180
COMMUNICATION PATH 136A
136B
136C
MODEM
106
110
114
USER COMPUTER
102
DISPLAY
104
112
KEYBOARD
108
REMOTE USER COMPUTER SYSTEM
150

Client Systems Software

Server System Software

Administrator System Software

SYSTEM AND METHOD FOR TRANSFERRING ITEMS HAVING VALUE

This is a divisional of pending U.S. application Ser. No. 09/163,993, entitled "On-Line Postage System," filed on Sep. 29, 1998, which is a continuation-in-part of pending U.S. application entitled "Secured On-Line Metering System," Ser. No. 08/872,792, filed on Jun. 10, 1997, which is a continuation-in-part of issued U.S. application entitled "Secured On-Line Metering System," Ser. No. 08/482,429, filed on Jun. 7, 1995, which is a continuation of issued U.S. application entitled "Secure Software Rental System Using Continuous Asynchronous Password verification," Ser. No. 08/178,398, filed on Dec. 22, 1993, specifications of which are herein incorporated by reference.

BACKGROUND

A. Field of the Invention

The present invention relates to the field of secured on-line postage processing systems.

B. Background Art

The United States Postal Service (USPS) processes over 165 billion pieces of mail each year and generates revenue of about 60 billion dollars annually. A significant percentage of the revenue, about 20 billion dollars, is from metered mail. Metered mail is generated by utilizing postage meters that print a special mark, also known as postal indicia on mail pieces. Current postal indicia contains only human readable information such as meter serial number, date of mail, postage value, and local post office information. Because the existing postage meters and indicia are not very secure the postage meters are vulnerable to fraudulent attacks. The US General Accounting Office recently estimated that postage meter fraud has cost the USPS in excess of 100 million dollars every year. The existing postage meters are vulnerable to tampering and the indicia generated by the postage meters can be forged or copied. To alleviate these problems the USPS recently announced the Information Based Indicia Program (IBIP) under which cryptographic postage indicia is to be used in place of existing postage indicia.

The use of personal computers (PC) and communication modems (CM) has increased significantly in recent years and is expected to continue to grow. Using electronic mail capabilities, PC users communicate more frequently amongst themselves. Additionally, centralized computer systems have evolved allowing PC users to access large databases. Such databases include various information libraries: news, weather, sports, stock markets, entertainment, education, and so on. Access to such databases is commonly controlled so that users must subscribe to the centralized computer systems. In a typical session, the user connects to the centralized computer system using the PC, transfers information to the user's PC, and uses the information without further connection to the database of the centralized computer system. The centralized computer system enables a large number of users to concurrently access the database of the central computer system.

While centralized computer systems frequently provide access to information databases, such systems less frequently provide access to copyrighted application software. The primary reason for not providing copyrighted application software from databases of centralized computer systems is due to a lack of tamper-proof security methods and apparatuses for preventing unauthorized copying of copyrighted application software. Prior art systems do not provide a comprehensive method or apparatus for permitting the rental of copyrighted application software without having any possibility of the copyrighted application software being copied and used without being connected to the database.

A prior art system, disclosed in U.S. Pat. Nos. 4,796,181 and 5,047,928 issued to John D. Wiedemer on Jan. 3, 1989 and Sep. 10, 1991, respectively, implements a computer software security and billing system that enciphers an application program using a numeric key. The computer of the user requires a hardware security device and a removable billing device. Both devices carry unique codes. The security device containing the billing device is coupled to the user's computer. A security program accesses the application software and writes billing information into the billing device. The billing module must be periodically replaced so the user can be charged for the software usage. Thus, the system of Wiedemer is directed to a security device including a billing device that is installed in a user's computer for enciphering/deciphering software and billing for usage of the software. This system disadvantageously requires special hardware for billing use of application software and does not use a dynamic password for preventing unauthorized use of application software.

Another prior art system, disclosed in U.S. Pat. No. 4,999,806 issued to Fred Chernow, et al., on Mar. 12, 1991, is a system for distributing software by telephone. A central station accepts credit card information, transmits an acceptance code to a caller, and terminates the call. The central station first verifies the caller's credit card, and then calls back the caller. The transaction is continued after receiving the acceptance code. The central station transfers a control transfer program and initialization program to the caller. The caller (or purchaser) executes the initialization program so that the central station can control the caller's computer. The control transfer program then transfers a protection program for ensuring that a copying program is not resident in the memory of the caller's computer. A storing program is then transferred to the caller's computer for modifying the purchased program for storage on the caller's computer. The purchased program is then transferred to the caller's computer. During execution of the system for distributing software, the various transmitted programs are erased so that only a copy of the purchased software remains on the caller's computer. Thus, the system of Chernow, et al., is directed to a system of transmitting copy protected versions of software to a caller's computer for a limited amount of time similar to a demonstration. The system of Chernow et al., is similar to copy protection of software and does not use a dynamic password for preventing unauthorized use of application software.

A further prior art system, disclosed in U.S. Pat. No. 5,138,712 issued to John R. Corbin on Aug. 11, 1992, implements a method and apparatus for licensing software on a computer network. Encrypted license information is stored in a license token, and is sorted in a database controlled by a license server. To access a program, the license server locates the correct license token for a software application and transmits the license token to a license library. The application has an attached application specific license access module that decodes the licensing token. The license information is verified by license library routines coupled to the software application. The license is then checked out and the license token is updated. The application specific license access module encodes the updated license token before returning it to the license server. Thus, only a single application can be breached by unauthorized cracking of an encrypted application. Thus, the system of Corbin is directed to providing network protection against unauthorized use of software in a computer network.

With respect to secured on-line postage processing systems the USPS under the IBIP activities published specifications for IBIP postage meters that identifies a special purpose hardware device known as a Postal Security Device (PSD) that is to be located at a user's site. The PSD in conjunction with the user's personal computer and printer will function as the IBIP postage meter. The USPS published a number of documents describing the PSD specifications, the cryptographic indicia specifications and other related and relevant information. The present invention includes a new method and apparatus for implementation of a IBIP postage meter. In one embodiment the invention does not require any special purpose hardware device at the user site and operates as a virtual postage meter.

This virtual postage meter satisfies all the security and other cryptographic indicia related requirements specified by the USPS.

SUMMARY OF THE INVENTION

The present invention comprises a system directed to providing secure on-line access to a software rental system as well as an on-line postage system. The system comprises a first computer system, a second computer system and a secured communication medium. The systems of the invention, are fully operational while a secure and uninterrupted communication link is maintained between the first and the second computer systems.

The present invention may be embodied in various models. For example, one embodiment of the invention is directed to a software rental system that comprises a client-server architecture and an authentication protocol for secured communication between the server and the client systems. Another embodiment of the invention comprises a client-server architecture and an authentication protocol directed to an on-line postage system. Yet another embodiment of the invention is directed to an on-line postage system that comprises a client-server architecture where a secured communication medium is maintained via the use of alternative authentication protocols including Internet secure sockets layer protocol and additional cryptographic devices. This patent application describes each of these embodiments.

A. Software Rental System with Authentication Protocol

One embodiment of the present invention is a secure software rental system. The system enables a user in a remote location using a personal computer and a modem to connect to a central rental facility, transfer application software from the central rental facility to the remote computer, and execute the application software on the remote computer while electronically connected to the central rental facility. When the communication link between the central and remote computers is interrupted or terminated, the application software no longer executes on the remote computer. This is accomplished by integrating header software with the application software according to the present invention.

The application software stored on the central rental facility is integrated with the header software to provide a security feature of the present invention. The use of header software allows the user to only execute the application software while the user is electronically connected to the central rental facility continuously. This prevents the user from copying the application software to a storage device of the remote computer, and subsequently executing the application software after interrupting or terminating the communications link between the central and remote computers.

The system of the present invention comprises a plurality of remote computers, communication modems, a multi-user communication modem, a database computer, and a memory system. The user connects the remote computer to the database of the central rental facility using methods well-known in the art of computer communications. The central rental facility requires the user to provide a unique user identification password to access the system. Each user of the system is allocated a unique user identification password.

A plurality of users having remote computers are able to communicate with the central rental facility using multi-user communication modem coupled to the central rental facility. The database computer comprises a multi-user, multitasking controller, password validation modules, user-registration databases, and memory system. When a user transmits a password to the central rental facility, the central rental facility activates the user registration database through the user password module. The user registration database contains information about each user that is stored in a separate file for each user. The user validation module compares the password with the password stored in the user registration database for the user. When the password is validated, the controller of the central rental facility establishes continuous connection with the remote computer of the user. Otherwise, communications with the remote computer are terminated.

When the continuous connection between the central rental facility and the remote computer is established, the user is able to access rental application software database through a directory request module of the central rental facility. The multi-user controller of the central rental facility initiates the interface between the user and the rental application software database. The user is then able to select application software from the rental application software database. When the user selects a software application, the multi-user controller of the central rental facility transfers the software application to the remote computer using a file transfer module. The software is transmitted through the multi-user communication modem of the central rental facility and the communication modem of the remote computer to the user.

When the application software is transferred to the remote computer, the central rental facility registers a transfer time. The transfer time is temporarily stored in the user file for transfer of the application software. The temporary storage on the central rental facility is only maintained during the time that the user is continuously connected to the central rental facility. The multi-user controller of the central rental facility stores the transfer time of each application software that the user transfers in a separate file. The multi-user controller also transmits a message containing the transfer time and an identification number for each transmitted application software to the remote computer. The message is encrypted by the central rental facility before transfer, and transmission of the message is accomplished transparently to the user. The user is then able to execute the application software.

The application software executes normally on the remote computer without any apparent modification of the application software. However, each application software of the rental application software database is modified to include header software. The application software is coupled to the header software by interface parameters. When executing the application software, the header software is an integral part of the application software and is executed as part of the initialization process for the application software. The interface parameters are adapted to the application software although the header software is the same for all application software. The internal functions of the header software include a rental security manager, user processor clock interface, user operating system interface, and user display interface. The header software primarily carries out dynamic password verification, which is an asynchronous process with respect to the functions of the application software and is carried out at finite intervals of time.

The rental security manager performs functions including interfacing with the communication manager that in turn interfaces with the communication modem, interfacing with the controller of the central rental facility, and interfacing with the application software. Also, the rental security manager generates passwords, correlates passwords, executes authorization verification, continues authorization verification, and terminates execution of the application software. The user processor clock interface obtains the current time from the user processor at finite intervals and provides it to the rental security manager. The user operating system interface determines the appropriate interface parameters for executing the application software on the operating system on the remote computer. The user display interface generates and provides messages to the user as necessary.

When the user executes the application software, the rental security manager initiates authorization verification. The authorization verification process begins by obtaining the time through the user processor clock interface. The rental security manager decrypts the authorization verification message containing the rental application software transfer time from the central rental facility. It determines the time difference between the transfer time from the central rental facility and the user processor clock time of the remote computer. The rental security manager generates a new authorization verification password using the time difference and the user identification password. It stores the new authorization verification password temporarily in a store of the rental security manager. The rental security manager the prepares a message containing the clock time, the user identification password, and identification number of the application software. The rental security manager encrypts the message, and transfers it to the central rental facility.

The multi-user controller of the central rental facility decrypts the transmitted message. It then computes a time difference by comparing the user processor clock time and the transfer time. The transfer time was stored previously in the user file for the application software. The multi-user controller generates an authorization verification password using the time difference computed by the controller and the decrypted user identification password. The multi-user controller creates a new message containing the processor clock time, the user identification password, and the authorization verification password. The message is encrypted by the multi-user controller, and transmitted to the remote computer.

The rental security manager decrypts the received message. The decrypted message is compared against the stored user processor clock time, the user identification password, and the authorization verification password using the password correlation module. When the password correlation module completes successfully, the authorization verification process is completed and the application software continues to execute. Otherwise, the authorization verification fails and termination of the executing application software is initiated. The user is notified of the authorization verification failure. The system performs the authorization verification process three times consecutively when failures occur before terminating the application software execution. The above listed steps are repeated at fixed time intervals during execution of the application software. The authorization verification process occurs transparently to the user when successful.

The authorization verification method thus prevents the user from circumventing the rental scheme in three ways. In one case, it prevents the user from transferring the application software to the remote computer and disconnecting the communication link while executing the application software. This attempt fails because the rental security manager is unable to communicate with the central rental facility. In another case, the authorization verification method prevents the user from copying the application software to a storage device, disconnecting the communication link, and re-executing the application software. This attempt fails because the transfer time is not available or the rental security manager is unable to communicate with the central rental facility. In yet another case, it prevents the user from establishing a communication link and re-executing a previously copied version of the application software that was stored on the remote computer. This attempt fails because the previous transfer time cannot be found on the central rental facility.

This embodiment of the present invention provides a secure system for allowing remote execution of rental application software and monitoring the time period that the application software is executed. The system also allows a single user to access more than one application software while independently monitoring each execution of application software using the multi-user, multitasking controller of the central rental facility. The multi-user, multitasking controller of the central rental facility is also capable of interfacing with a plurality of users concurrently.

B. On-Line Postage System with Authentication Protocol

An embodiment of the invention comprises an on-line postage system that operates in conjunction with the United States Postal Service (USPS). In one or more embodiments, the invention utilizes on-line postage system software. One or more embodiments of the on-line postage system software comprises user code that resides on a client system and controller code that resides on a postal security device (PSD) server system. The on-line postage system of the invention allows a client to print a postal indicium at home, at the office, or any other desired place in a secure and fraud-free manner. In one or more embodiments, the on-line postage system of the invention comprises a user system electronically connected to a PSD server system, which in turn is connected to a USPS system.

In one embodiment of the on-line postage system; a licensed, registered client sends a request for authorization to print a desired amount of postage. The PSD server verifies that the client's account holds sufficient funds to cover the requested amount of postage, and if so, grants the request. The client system then sends image information for printing of postal indicium for the granted amount to a printer so that a postal indicium is printed on an envelope or label. The printed indicium appears as a two-dimensional bar-code that includes a unique serial number, mail delivery point information, and the amount of postage.

When a client system sends a postage print request to the PSD server, the request must be authenticated before the client system is allowed to print the postage, and while the postage is being printed. If password verification fails, the asynchronous dynamic password verification method terminates the session and printing of postage is aborted.

In an embodiment of the on-line postage system, information processing equipment communicate over a secured communication line. In turn, the PSD server system communicates with a system located at the USPS for verification and authentication purposes. The information processing components of the on-line postage system include a client system, a server system, a USPS system and a communication medium among those systems.

C. On-Line Postage System with Alternative Authentication Protocol

In one embodiment of the invention, the security and authenticity of the information communicated among the systems are maintained by different authentication protocols. In one embodiment for example, in which the Internet is the medium of communication, security for information exchanged over the communication medium of choice (i.e. the Internet) is accomplished on the software level through the built in features of the SSL (secure sockets layer) Internet communication protocol. An encryption hardware device imbedded in the server system is also used to secure information as it is processed by the secure system and to ensure authenticity and legitimacy of requests made and granted.

In one embodiment, the on-line postage system of the invention does not require any special purpose hardware for the client or user system. In this embodiment, the client system of the invention is implemented in the form of software that can be executed on a secured user computer (hereinafter sometimes referred to as a "client system") allowing the user computer to function as a virtual postage meter. The software can only be executed for the purpose of printing the postage indicia when the user computer is in communication with a server computer located, for example, at a postage meter vendor's facility (hereinafter sometimes referred to as a "server system"). Means of communication between the server and user systems in one or more embodiments includes the Internet or any other communication medium. The server system is capable of communicating with one or more client systems simultaneously.

In one embodiment, a user of the on-line postage system may apply and obtain a meter license from the USPS. The application may be completed and submitted using a licensing utility included with the on-line postage system client software. A completed license application is electronically submitted to the server system. The server system software converts the application information into the proper format and submits it to the Central Meter Licensing System (CMLS) of the USPS for approval.

Using an embodiment of the current invention, a user may purchase postage by selecting a payment method. Several payment modes are provided by the virtual postage meter client system software. In one embodiment, the payment mode includes automatic clearing house (ACH) funds transfer, credit card, debit card, and electronic funds transfer. The server system receives payment information for the client and interfaces with various financial institutions including the USPS lock box bank for completing the postage purchase transaction.

In one embodiment, server system software performs an address correction function according to USPS specifications on destination addresses entered into the system by a user. The corrected address, if any, is automatically provided to the user if there is an error in the originally entered destination address.

In one embodiment, the user specifies a postage class (i.e. first class, priority class, etc.), and enters the weight of the mail piece either manually or through an optional interface with a digital scale. The server system software receives this information from the client system and calculates the postage value based on the most recently updated USPS rate table. The correct postage value and other necessary parameters for printing of the corresponding postage indicia is communicated back to the client system. The postage indicia and the recipient's address are printed at the same time by a printer attached to the client system. The postage indicia and the recipient's address include identical information and security parameters for auditing purposes.

The client and server systems exchange data using any communication medium. In an embodiment of this invention the communication between client system and server system is accomplished through the Internet. The server system is protected by a firewall. The firewall permits a client to communicate with a server system, only if the information packet transmitted by the client system complies with a security policy set by the server system.

In one embodiment, the server system comprises a private network and a public network connected to the Internet and to each other via a firewall. The firewall and the public network prevent direct access to the private network via an Internet connection.

The public network comprises a transaction server. The private network comprises a database server. The database server can only be accessed from the transaction server through the firewall. The database server is primarily used for storing information.

Both the transaction server and the database server have backup servers to circumvent any emergency interruptions in the operation of at least one of these servers. In one embodiment, a cryptographic module that meets the certification requirements of Federal Information Processing Standards (FIPS) Publication 140-1 security levels for processing sensitive information is connected to the transaction server. Similarly an identical cryptographic module is connected to the database server. These cryptographic modules generate a unique digital signature for each mail piece for which a postage indicia is generated. In one embodiment of the invention, a digital signature is generated utilizing a public key cryptography.

In one embodiment, the digital signature is incorporated in the postage indicia is used to verify the validity of the postage indicia. In one embodiment, cryptographic modules are responsible for performing all the cryptographic functions that are required for the server system. The combination of the cryptographic modules and the servers, in one embodiment, comprises a Postal Security Device (PSD).

In an embodiment of the invention, the PSD ensures protection of critical postage related information, security of postage value, security of resetting of postage meters, prevention of unauthorized transfer of indicia data to Client systems and security of communications between client system and server system.

In one or more embodiments of the invention all communication between client system and server system are encrypted. The communication encryption scheme employed in one embodiment is an industry standard known as Secure Sockets Layer (SSL), a protocol developed by Netscape for a software layer that sits between the application software and the TCP/IP stack. The SSL is implemented to provide data encryption, message integrity, and user authentication in server client communications.

DETAILED DESCRIPTION

A method and apparatus for providing a secure software rental system is described. In the following description, numerous specific details, such as number and nature of messages, communication applications, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

A. Embodiment of Computer Execution Environment (Hardware) For a User Computer.

Figure 1:
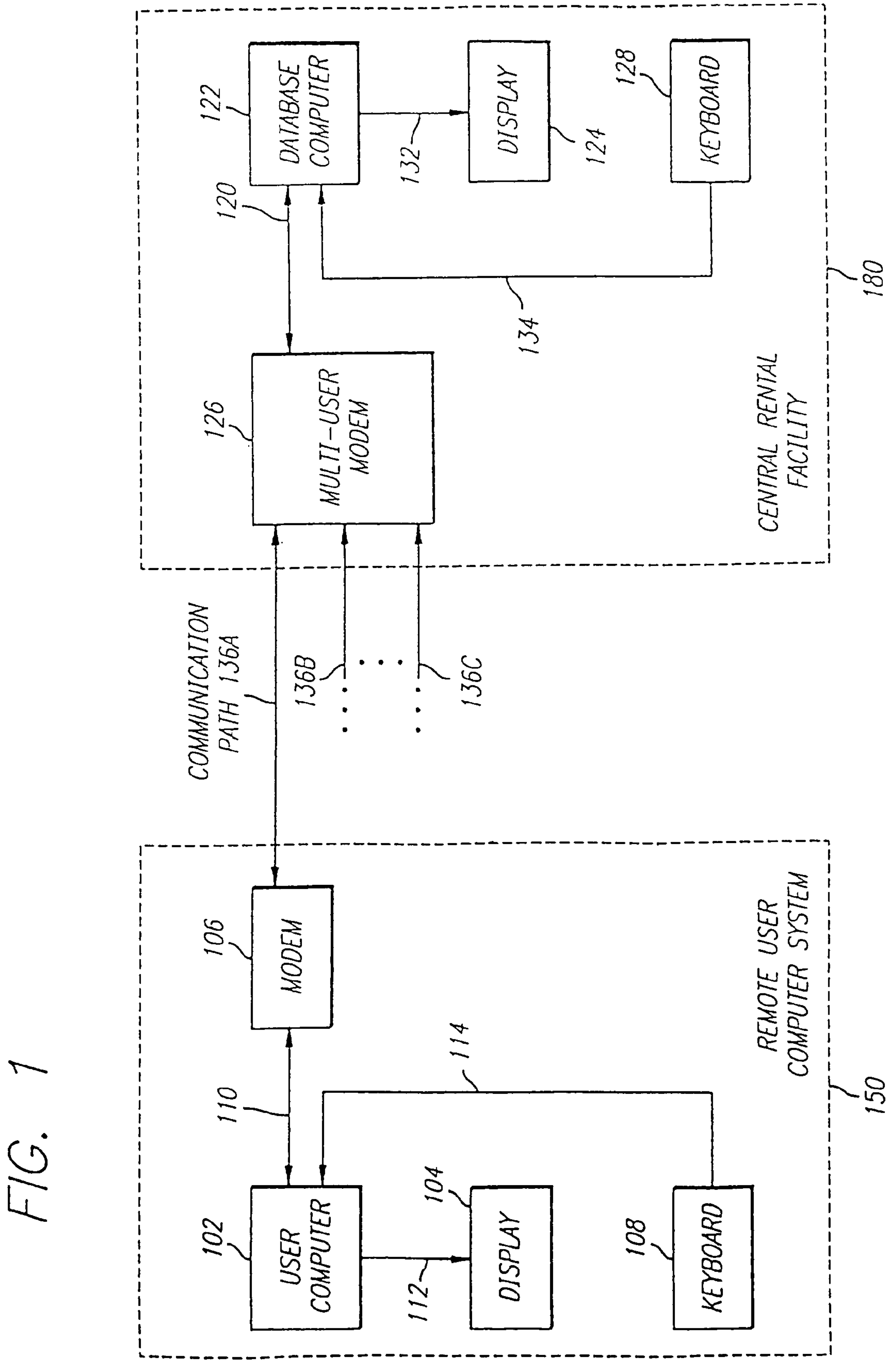
FIG. 1 is a diagram illustrating a remote user computer system and a central rental facility.

FIG. 1 is a diagram illustrating a remote user computer system (herein also referred to as client system) 150 connected to a central rental facility (herein also referred to as server system) 180 by electronic communications path 136A for securely renting software. The remote user computer system 150 includes user computer 102, a display device 104, a keyboard 18, and a communication modem 106. The central rental facility 180 includes database computer 122, a display device 124, a keyboard 128, and a multi-user communication modem 126. Coupling 112 connects user computer 102 to display 104 for providing output to a user. Coupling 114 connects keyboard 108 to user computer 102 for providing input from a user. Modem 106 is connected to user computer 102 by coupling 110.

Modem 106 of remote user computer system 150 is coupled to multi-user communication modem 126 by communication path 136A. In one embodiment of the present invention, communication path 136A is a telephone transmission line. In another embodiment, communication path 136A includes a means of communication through available Internet service providers or Systems. Thus, the present invention is not limited to a telephone transmission line, and other communication paths may be utilized without departing from the scope of the present invention. Multi-user modem 126 is coupled to a plurality of communication paths 136A-136C for establishing communications with a plurality of remote user computer systems concurrently. Multi-user modem 126 is connected to database computer 122 by coupling 120. Coupling 132 connects database computer 122 to display 124 for providing output to an operator. Coupling 134 connects keyboard 128 to database computer 122 for providing input from an operator while a single keyboard 128 and display device 124 are illustrated in FIG. 1, it should be apparent to a person skilled in the art that the present invention may be practiced with a plurality of such devices coupled to the database computer.

The user computer 102 of the remote user computer system 150 comprises a processing means coupled to main memory (e.g., random access memory RAM and/or read only memory ROM), secondary storage means (e.g., media storage systems and/or CDROM), and input/output ports for communicating with other devices including keyboards, printers, displays, etc. As is well-known in the art, the user computer system 150 may further include printing devices for providing hard copy output from the user computer 102, CD-ROM drives for storing information including multimedia information, scanning devices for providing electronic images as input, and manual input devices (e.g., mice, pen systems, etc.) for providing input. The database computer 122 is a multitasking, multi-user computer capable of executing a plurality of processes in parallel. In the preferred embodiment of the present invention, a file server workstation operating the Windows operating environment is used as the database computer 122.

However, the present invention may be implemented using a mainframe computer or a plurality of computers connected and operated in parallel for the database computer 122. Similarly, the central rental facility may further comprise printing devices, CD-ROM drives, scanning devices, manual input devices, etc.

Figure 20:
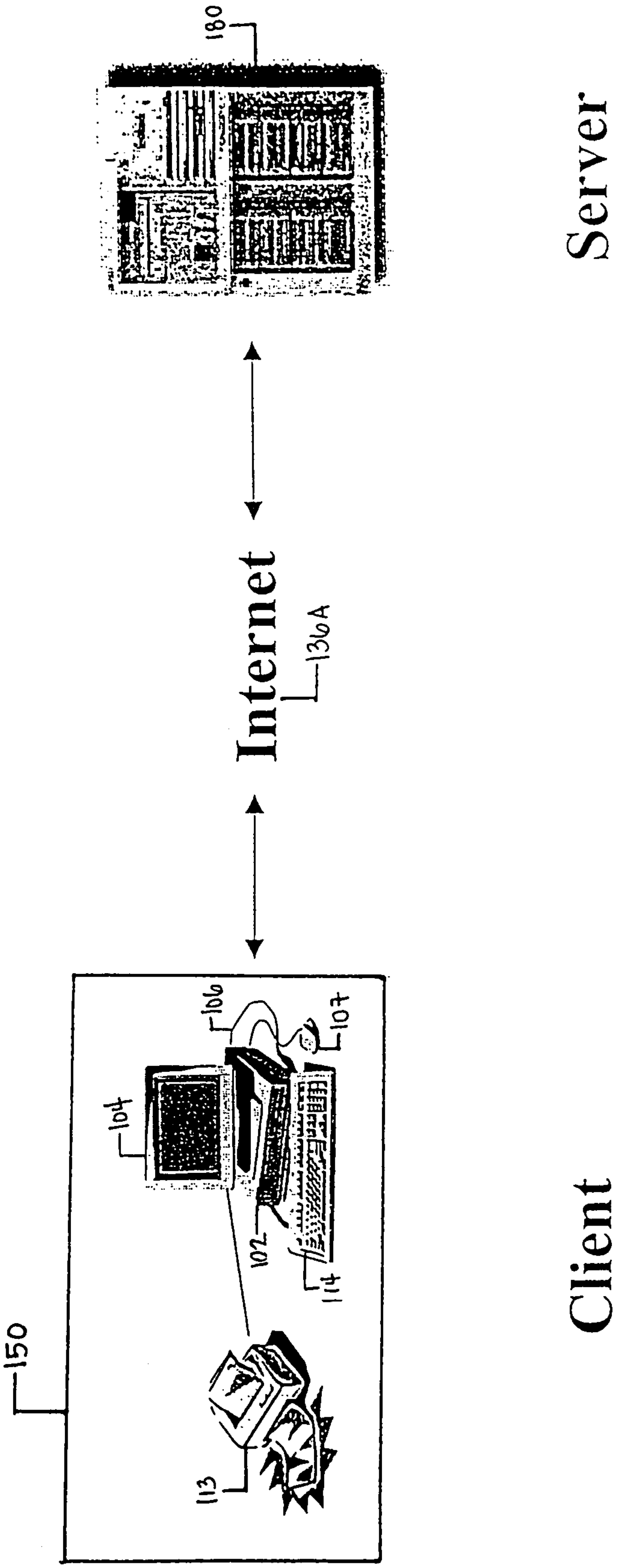
FIG. 20 illustrates a remote user computer system (client) and postage meter vendor's computer facility (server).
Figure 21:
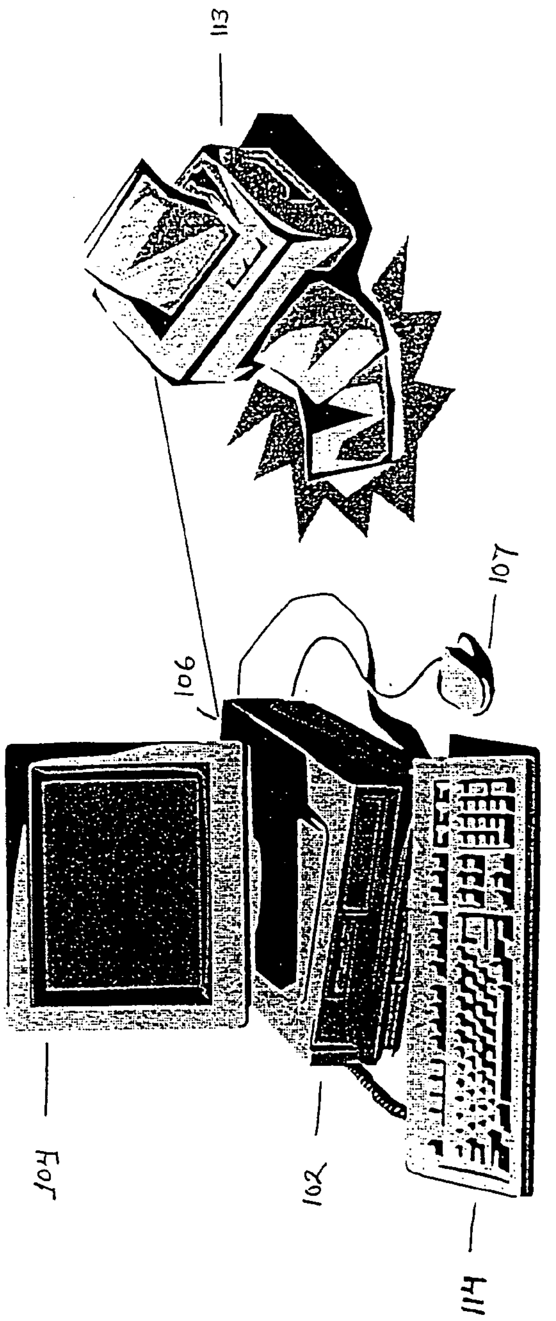
FIG. 21 illustrates a remote user computer system (client) at a larger scale.

One or more embodiments of the invention can be implemented as computer software in the form of computer readable program code executed on a general purpose computer such as client system 150 illustrated in FIGS. 20 and 21. A keyboard 114 and mouse 107 are coupled to a bi-directional system bus 10018. The keyboard and mouse are for introducing user input to the computer system and communicating that user input to central processing unit (CPU) 102. Other suitable input devices may be used in addition to, or in place of, the mouse 107 and keyboard 114. I/O (input/output) unit 10019 coupled to bi-directional system bus 10018 represents such I/O elements as a printer, A/V (audio/video) I/O, etc.

As illustrated in FIGS. 1, 20, 21, and 22, client system 150 includes a video memory 10014, main memory 10015 and mass storage 10012, all coupled to bi-directional system bus 10018 along with keyboard 108, mouse 107 and CPU 2102. The mass storage 10012 may include both fixed and removable media, such as magnetic, optical or magnetic optical storage systems or any other available mass storage technology. Bus 10018 may contain, for example, thirty-two address lines for addressing video memory 10014 or main memory 10015. The system bus 10018 also includes, for example, a 32-bit data bus for transferring data between and among the components, such as CPU 2102, main memory 10015, video memory 10014 and mass storage 10012. Alternatively, multiplex data/address lines may be used instead *6f* separate data and address lines.

Figure 22:
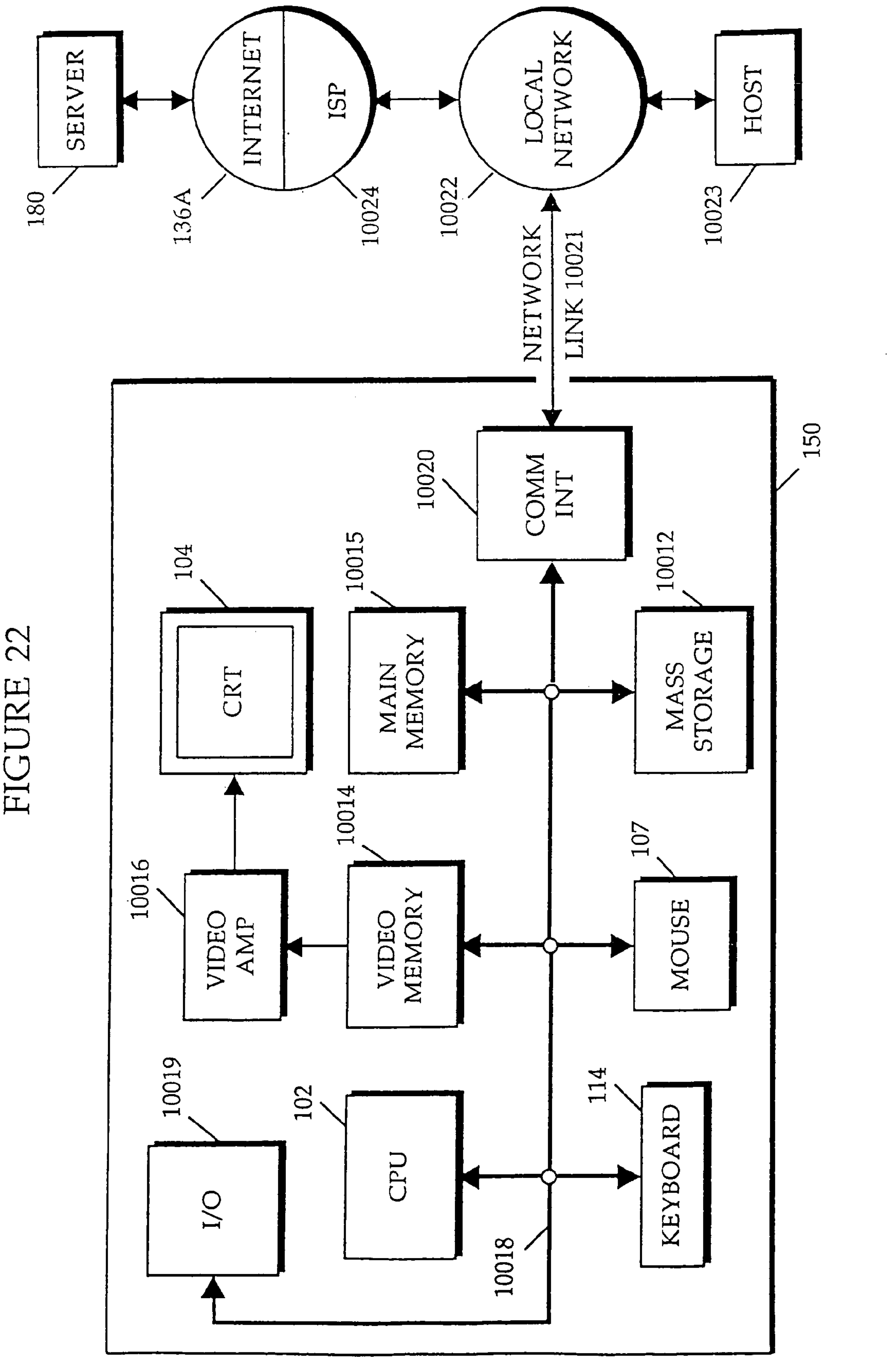
FIG. 22 is an illustration of the hardware components of a client system.

FIG. 22 illustrates one embodiment of the invention, where the CPU 102 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 15015 is comprised of dynamic random access memory (DRAM). Video memory 10014 is a dual-ported video random access memory. One port of the video memory 10014 is coupled to video amplifier 10016. The video amplifier 10016 is used to drive the cathode ray tube (CRT) raster monitor 104. Video amplifier 10016 is well known in the art and may be implemented by any suitable apparatus. This circuitry converts pixel data stored in video memory 15014 to a raster signal suitable for use by monitor 104. Monitor 104 is a type of monitor suitable for displaying graphic images.

Computer system 150, as illustrated by FIG. 22, in one embodiment includes a communication interface 10020 coupled to bus 10018. Communication interface 10020 provides a two-way data communication coupling via a network link 10021 to a local network 10022. For example, if communication interface 10020 is an integrated services digital network (ISDN) card or a modem, communication interface 10020 provides a data communication connection to the corresponding type of telephone line, which comprises part of network link 136A. If communication interface 10020 is a local area network (LAN) card, communication interface 10020 provides a data communication connection via network link 136A to a compatible LAN. Wireless links are also possible. In any such implementation, communication interface 10020 sends and receives electrical, electromagnetic or optical signals which carry digital data streams representing various types of information.

According to an embodiment of the current invention, as illustrated in FIG. 22, network link 10021 provides data communication through one or more networks to other data devices. For example, network link 10021 may provide a connection through local network 10022 to host computer 10023 or to data equipment operated by an Internet Service Provider (ISP) 10024. ISP 10024 in turn provides data communication services through the world wide packet data communication network now commonly referred to as the "Internet" 136A. Local network 10022 and Internet 136A both use electrical, electromagnetic or optical signals which carry digital data streams. The signals through the various networks and the signals on network link 10021 and through communication interface 10020, which carry the digital data to and from computer system 150, are exemplary forms of carrier waves transporting the information.

In another embodiment, computer system 150 sends messages and receives data, including program code, through the network(s), network link 10021, and communication interface 120. In the Internet example, server 180 might transmit a requested code for an application program through Internet 136A, ISP 10024, local network 10022 and communication interface 120. In accord with one embodiment of the invention, one such downloaded application is the on-line postage system software described herein.

In one embodiment received code may be executed by CPU 102 as it is received, and/or stored in mass storage 10012, or other non-volatile storage for later execution. In this manner, computer 150 may obtain application code in the form of a carrier wave.

The computer systems described above are for purposes of example only. An embodiment of the invention may be implemented in any type of computer system or programming or processing environment.

B. The Secure Software Rental System

In the present invention, a user accesses the central rental facility 180 using the remote user computer system 150 illustrated in FIG. 1. The remote user computer system 150 comprises the elements necessary for accessing the central rental facility 180. The user connects to the central rental facility 180 using communication methods well-known in the art for connecting to other database systems (e.g., Compuserve, etc.). The secure software rental system of the present invention requires that each user be assigned or allocated a unique user identification password. The user identification password is necessary for accessing the central rental facility 180. When electronically connected to the remote user computer system 150 using the modem 106, the central rental facility 180 requests the user to provide the user identification password. The user inputs the user identification password through the keyboard 108 to user computer 102. User computer 102 transmits the user identification password to the central rental facility using modem 106. The database computer 122 of central rental facility 180 receives the user identification password through multi-user modem 126. When the database computer 122 receives the user identification password, the database computer 122, as illustrated in FIG. 2, retrieves the user registration database 212 using electronic connection 260 from system memory/storage 220.

1. Modules of the Central Rental Facility

Figure 2:
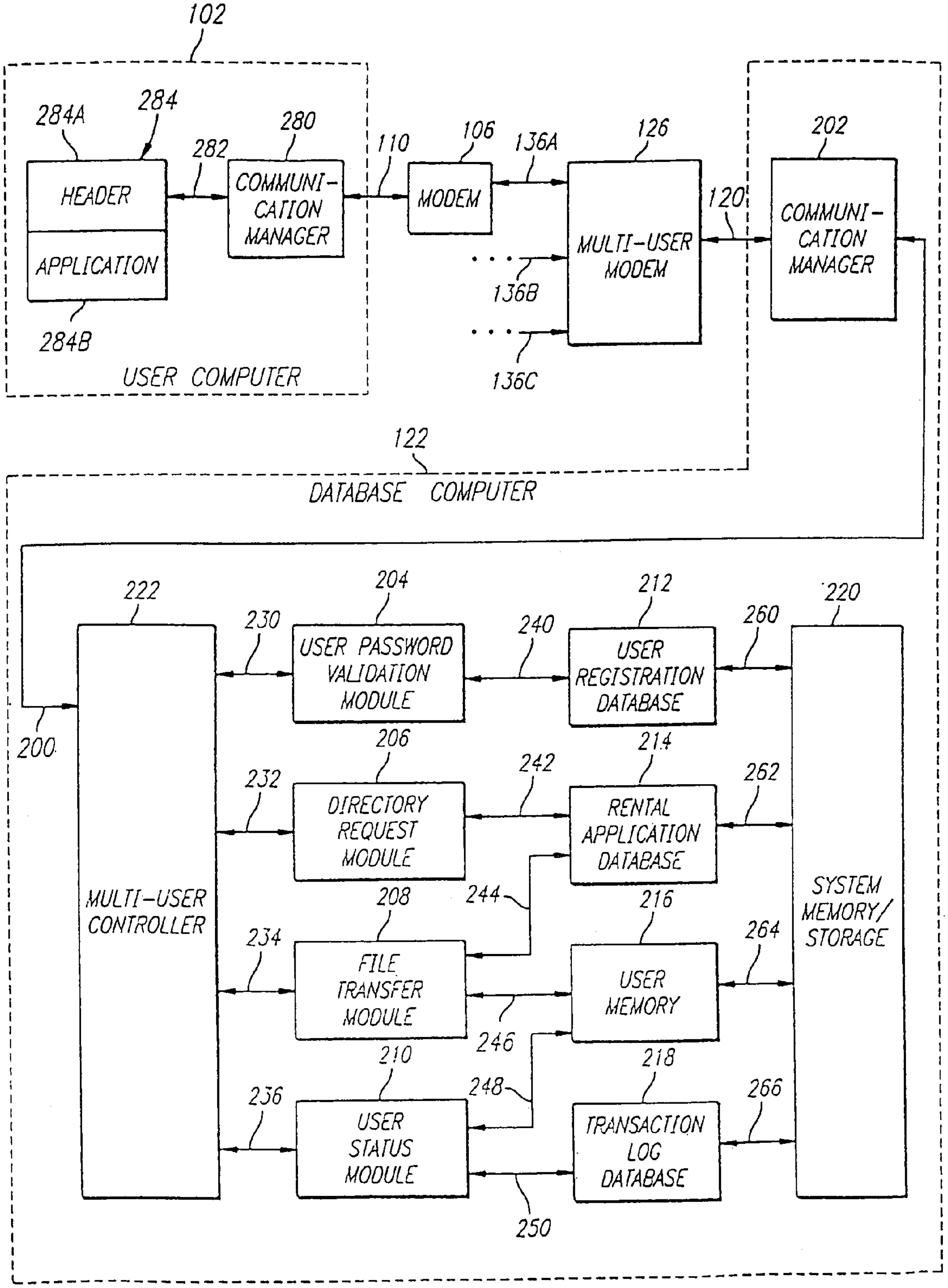
FIG. 2 is a diagram further illustrating the remote user computer system and the central rental facility.

In FIG. 2, the user computer 102 comprises a rental application 284 and communication manager 280. The database computer 122 includes communication manager 202, multi-user controller 222, a plurality of control modules 204-210, databases 212-214, and system memory/storage 220. The user computer 102 is coupled to the database computer 122 through the multi-user modem 126 of the central rental facility 180, as illustrated in FIG. 1. The rental application 284 comprising header 284A and application 284B is coupled to communication manager 280 by connection 282. Communication manager 280 is coupled to modem 106 by connection 110. Modem 106 of the remote user computer system 150 is coupled to multi-user modem 126 through communication path 136A.

Multi-user modem 126 is coupled to communication manager 202 by connection 120. Communication manager 202 is coupled to multi-user controller 222 by connection 200. Multi-user controller 222 is coupled to user password validation module 204, directory request module 206, file transfer module 208, and user status module 210 by connections 230, 232, 234, and 236, respectively. The user password validation module is connected to user registration database 212 by coupling 240. The directory request module 206 is connected to the rental application database 214 by coupling 242. The file transfer module 208 is coupled to the rental application database 214 and user memory 216 by coupling 244 and 246, respectively. The user status module 210 is connected to user memory 216 and transaction log database 218 by couplings 248 and 250, respectively. User registration database 212, rental application database 214, user memory 216, and transaction log database 218 to system memory/storage 220 by connections 260, 262, 264, and 266, respectively.

The central rental facility 180 is operated by the multi-user controller 222 that is capable of processing a plurality of users and interfaces with various subsystem elements including multi-user modem 126. Initially, the multi-user controller 222 recognizes that the user has transmitted a user identification password to the central rental facility 180, thereby causing the controller 222 to activate the user registration database 212 through the user password validation module 204. The user registration database 212 contains stored information regarding the identifications of authorized users of the secure software rental system, as well as other relevant information regarding users, in an identifiable file for each user. The user identification password may comprise, up to a predetermined number of characters, any combination of letters of the alphabet and numbers. For example, the Social Security number of the user may be used as the user identification password.

The password validation module 204 performs a check to determine whether or not the transmitted user identification password is authorized by first retrieving and then searching the user registration database 212. When the search fails to locate the user in the user registration database 212, the user password validation module 204 notifies the multi-user controller 22 of the failure. The password validation module 204 transmits the status of the search to controller 222 characterizing the user identification password transfer to the central rental facility 180 as an unauthorized access. The multi-user controller 222 transmits an appropriate message to the remote user computer system 150 that is displayed on its display 104 (shown in FIG. 1), and the central rental facility 180 terminates the connection to the remote user computer system 150.

When the search performed by the password validation module 204 successfully locates the user in the user registration database 212, the user password validation module 204 transmits validity information to the multi-user controller 222. The multi-user controller 222 establishes continuous connection between the central rental facility 180 and the remote user computer system 150 using communication manager 202. This enables the user to directly access the database of the central rental facility 180 (including the rental application database 214) using the remote user computer system 150. The multi-user controller 222 initiates the interface between the remote user computer system 150 and the rental application database 214 by a series of queries from the multi-user controller 222 to the user and by receiving appropriate responses from the user.

The user selects an application software by reviewing the directory of the rental application database 214 using the directory request module 206. In response to an appropriate user command, the multi-user controller 222 transfers the selected application software from the rental application database 214 using the file transfer module. The file transfer module is electronically coupled to the rental application database 214 by connection 244, and it transfers the selected application software from the rental application database through multi-user communication modem 126 to the remote user computer system 150. The multi-user controller 222 transmits the selected application software by means of the communication manager 202 through the multi-user modem 126 across communication path 136A to modem 106 that is controlled by communication manager 280 of the user computer 102.

At the time of the application software transfer to the remote user computer system 150, the multi-user controller 222 registers a transfer time for the application software obtained from the timer clock of the database computer 122. In the preferred embodiment of the present invention, the time of the database computer is measure to a precision of nanoseconds. The transfer time is temporarily stored in the user file of the user registration database 212. The temporarily stored transfer time is kept until the user terminates the communication link between the remote user, computer system 150 and the central rental facility 180. If the user transfers another software application from the rental application database 214 to the remote user computer system 150 during the same time period that the user has already transferred an application software from the central rental facility 180, the multi-user controller 222 registers and stores the transfer time of the latter application software. In this manner, during a rental session when the remote user computer system 150 is continuously connected to the central rental facility 180, the multi-user controller 222 maintains a listing of transfer times containing the transfer time of each application software.

In addition to the transfer time of the application software, the multi-user controller transmits a message containing the transfer time of the selected application software and an identification number for the application. The information contained in the message is not displayed to the user. The multi-user controller 222 of the database computer 122 includes encryption and decryption capabilities. Thus, the multi-user controller 222 encrypts the message before transmitting it to the user computer 102.

Once the transfer of an application software to the remote user computer system 150 is completed, the user is able to execute the application software on the user computer 102 of the remote user computer system 150 as though the user is independent of the central rental facility 180. The input and/or output format of the application software is not modified by the present invention. The method of using the software and the input and/or output format of the software are determined by the developer or manufacturer of the application software; therefore, the user executes the software as if the user purchased the software, without any noticeable difference in the operation or interface of the application software. Each application software of the present invention is modified, however, the modification is not apparent to the user.

The application software 284B is modified by integrating it with header software 284A. The combined header and application software is referred to as the rental application software 284 as illustrated in FIG. 2.

2. Header Software

Figure 3:
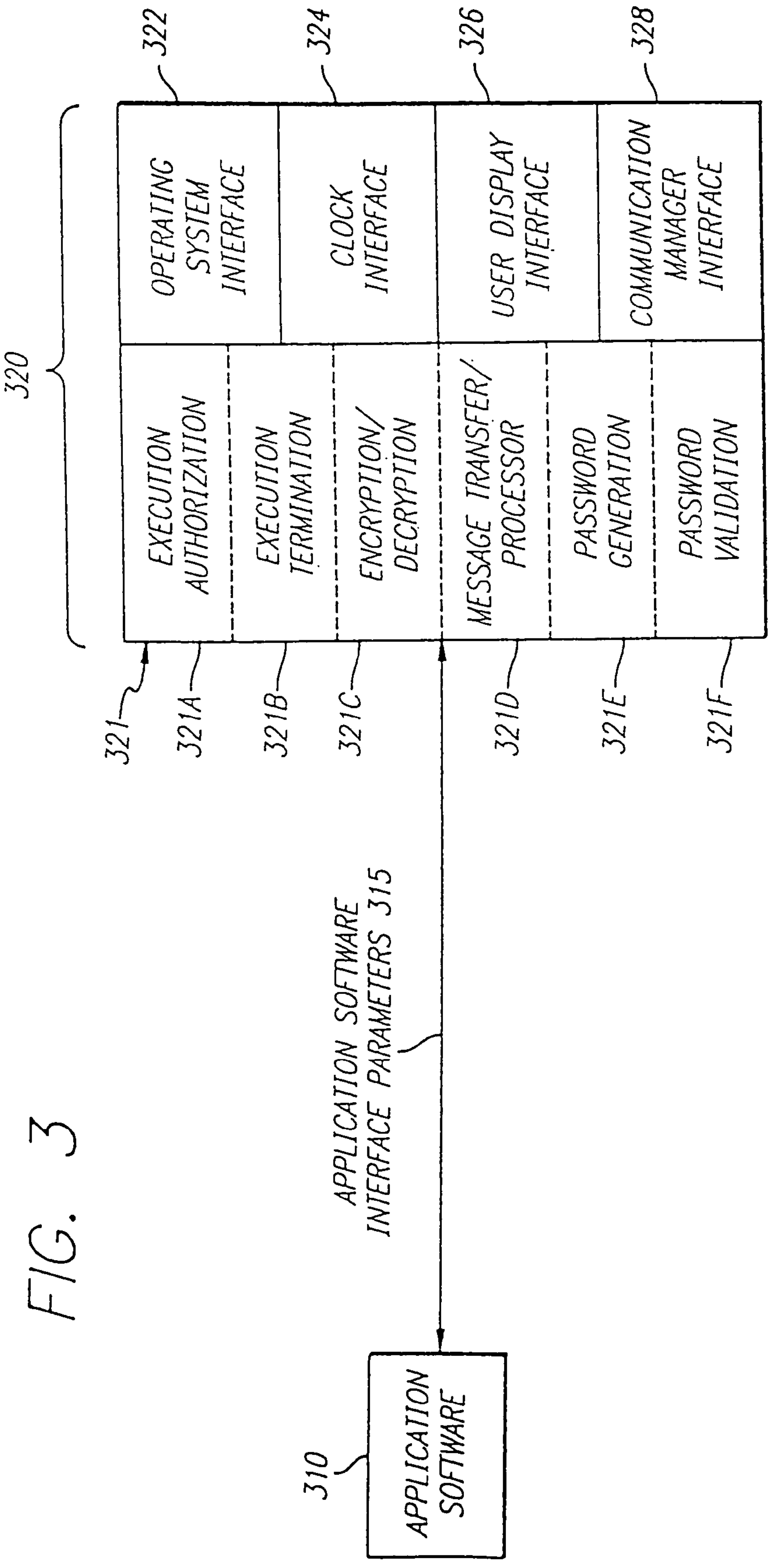
FIG. 3 is a diagram illustrating rental application comprising an application software and a header according to the present invention.

The internal functions of header software 284A are shown in FIG. 3. In FIG. 3, header software 284A is identified as header 320, and application software 284B is identified as application software 310. Header 320 is coupled to application software 310 by application software interface parameters 315. The header software 320 comprises a rental security manager 321, an operating system interface 322, a clock interface 324, user display interface 326, and communication manager interface 328. The rental security manager comprises several functions or modules: an execution authorization module 321A, an execution termination module 321B, an encryption/decryption module 321C, a message transfer processor 321D, a password generation module 321E, and password validation module 321F.

One function of the header software 320 is to prevent unauthorized use of the application software 310. The rental security manager 321 performs this function. The rental security manager 321 interfaces with the application software 310 through the interface parameters 315. The rental security manager 321 determines whether the user may continue to access the application software 310 using a series of tests. When the user passes the periodic test, the user is authorized to continue executing the application software 310. When the test fails, the rental security manager 321 terminates execution of the application software 310 and notifies the user of unauthorized use.

The user operating system interface 322 determines the appropriate interface parameters 315 for executing the application software 310 dependent on the user processor and the operating system (e.g., DOS, Windows, OS/2, etc.).

The clock interface 324 of header 320 obtains the current time, at finite time intervals, from the processor clock of the user computer 102. The time interval is set by the header software 320. In the preferred embodiment of the present invention, a value of 100 ms is used for the time interval. The present invention is not limited to a time interval of 100 ms, and other time intervals may be utilized without departing from the scope of the present invention. The user processor clock interface 324 may register the time to a precision level of nanoseconds; however, this depends on the number of bits used to represent the precision of the clock. The user processor clock interface 324 provides the timing information to the rental security manager 321.

The user display interface 326 generates and provides messages (e.g., "Execution is terminated.", etc.) to the user. The header 320 also includes a communication manger interface 328 for controlling the communication modem 106 and interfacing with the multi-user controller 222 of the central rental facility 180.

3. Secured Communication Scheme

When the user initiates execution of the application software 310, the execution command initiates the application software 310 which in turn initiates the processing of the header software 320. This activates the rental security manager 321 to initiate the process of authorization verification. The authorization verification module 321A obtains the current time from the processor clock of the user computer 102 through the user processor clock interface 324. The time is designed as the local processor clock time, and a sufficient number of digits are used to represent the time to achieve a precision of nanoseconds. The rental security manager 321 also includes encryption/decryption module 321C for encrypting/decrypting authorization verification messages. The multi-user controller 222 and the encryption/decryption module 321C of the rental security manager 321 employ the same encryption/decryption method (DEM). The authorization verification messages are communicated by the message transfer processor 321D between the header software 320 and the multi-user controller 222 of the central rental facility 180.

In response to receiving an authorization verification message, the multi-user controller 222 of the central rental facility 180 decrypts the authorization verification message containing the user processor clock time and the identification number of the application software 310. The time difference between the transfer time and the current processor clock time of the user computer 102 is computed by multi-user controller 222. Using the time difference and the unique user identification password that is originally given to the user, initial access to the central rental facility 180 is achieved, and a new authorization verification password is generated by the multi-user controller 222 using the password generation module.

The password generation module (of controller 222 and module 321E of rental security manager 321) utilizes a pseudo random number generation algorithm that is dependent on two parameters: the time difference and the user identification password. The password generation module is flexible so that a large number of pseudo random values may be generated by proper selection of variables. Moreover, the number of characters associated with the pseudo random number parameters may be preset by proper selection of the algorithm variable as well. The password generation algorithm is deterministic, and therefore a unique, pseudo random number exists for a specific time difference and user identification password. If either the time difference or the user identification password is changes in any manner, the password, generation module generates a resulting pseudo random value that is significantly different from the previous one. The password generation module guarantees a varying, unique, pseudo random number for the user that is used as the password for continuous authorization verification. The password can not be reproduced unless the exact user processor clock time (accurate to the nanosecond level of precision), the exact transfer time, the user identification password, and the deterministic algorithm are known.

The pseudo random number generation algorithm is kept confidential from the user. The user cannot derive the algorithm from the executable element of the integrated application software 310 and the header software 320 because the source code of the rental application 284 is not available to the user. Further, the password generation module (of controller 222 and module 321E of rental security manager 321) utilizing the algorithm operates without the user's knowledge, and information regarding password generation is not provided to the user until the authorization verification fails. When authorization verification fails, the user is notified that the application software is terminating and is advised to verify the communication link.

Once the password generation module 321E generates the new authorization verification password, the rental security manager 321 stores the password temporarily as a function of the processor clock time. The message transfer processor 321D of the rental security manager 321 prepares a message containing the user processor clock time, the user identification password, and the identification number of the application software 310 that is to be transmitted to the multi-user controller 222 at the central facility 180. Prior to transmission, the encryption/decryption module 321C encrypts the message. The encrypted message is transmitted to the multi-user controller 222 of the central facility 180 through the communication manager interface 328. Encrypting the message provides added protection in case the message communicated between the remote user computer system 150 and the central rental facility 180 is tapped.

Multi-user controller 222 receives the encrypted message containing the processor clock time, the user identification password, and the identification number of the application software 310 via multi-user communication modem 126, and decrypts the message using the DEM algorithm. The message does not contain the authorization verification password generated by the pseudo random number password generation module 321E of the header software 320. The multi-user controller 222 computes the time difference between the user processor clock time and the transfer time of the application software 310 that was stored temporarily in the user file of the user registration database 212. The multi-user controller 222 generates a pseudo random number parameter using the deterministic algorithm dependent on the time difference and the user identification password. Because the multi-user controller 222 and the password generation module 321E of the rental security manager 321 use the same encryption/decryption algorithm, the multi-user controller 222 generates a pseudo random number parameter that is identical to the one generated by the rental security manager 321 using identical input parameters.

Once the multi-user controller 222 generates a pseudo random number parameter, it creates a new message containing the processor clock time, the user identification password, and the pseudo random number parameter. The multi-user controller 222 encrypts the message using the DEM algorithm, and transmits the message back to the user. The multi-user controller 222 does not use the clock time of the database computer 122 to accomplish this. Any time difference between the user processor clock of the user computer 102 and the clock of the central rental facility 180 is irrelevant to this process. Therefore, the authorization verification process is dependent on the user processor clock time for computing the time difference from the transfer time. The user processor clock time of the user computer 102 may err from true time known to the central rental facility 180 or any other clock. The authorization verification process is therefore independent of the accuracy of the user processor clock time. The multi-user controller 222 computers the time difference using the user processor clock time to distinguish the authorization verification password from other passwords.

The rental security manager 321 receives the encrypted message containing the user processor clock time, the user identification password, and the pseudo random number parameter generated by multi-user controller 222. The encryption/decryption module 321C of the rental security manager 321 (utilizing the DEM algorithm) decrypts the received message. The password validation module 321F compares the message using a password correlation algorithm against the stored information regarding the user processor clock time, the user identification password, and the authorization verification password. The correlation process of the password validation module 321F compares the received message and the stored message on a bit-by-bit basis. When the correlation function is successfully completed, the current authorization verification process is completed, and the header 320 allows the application software to continue executing. The entire authorization verification process is performed without the knowledge of the user.

When the password validation module 321F (using the password correlation function) detects a discrepancy between the received message and the stored message, the password correlation fails causing the authorization verification process to fail. In response to the password correlation failure, the execution termination module 321B initiates termination of the executing application software 310; however, the application software 310 is not terminated based on a single authorization verification failure. Generally, the rental security manager 321 does not terminate execution of application software 310 until three consecutive failures of authorization verification occur. This prevents erroneous authorization verification failure caused by the header software 320 or the central rental facility 180 or both including bit errors introduced during communication or by either the encryption or decryption process. If three failures do occur, the execution termination module 321B also notifies the user (through the user display interface 326) that the user has attempted to execute the application software 310 without proper authorization.

After successfully completing the first authorization verification process, the rental security manager 321 sequences the authorization verification process to occur at finite time intervals throughout the execution of the application software 310. When authorization verification is continuously successful during this period, the user does not have knowledge of this process, and it does not impact the execution and use of the application software 310.

a) Method of operation

Figure 11:
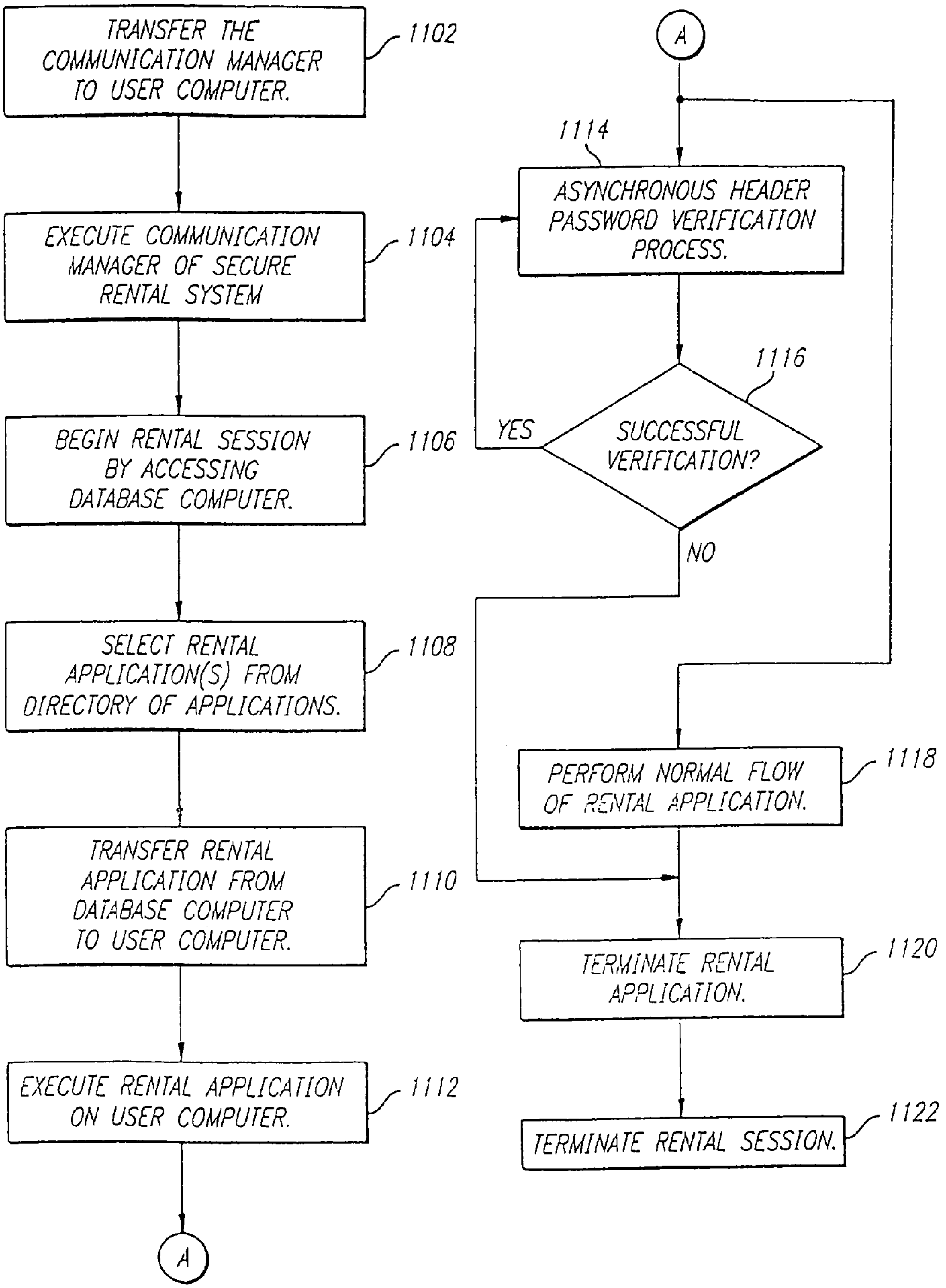

FIG. 11 is a flow diagram illustrating the present invention for providing secure software rental. In step 1102, the communication manager 280 is transferred from the database computer 122 (alternatively referred to as the central rental facility 180) to the user computer 102. In step 1104, the communication manager 280 is executed using the user computer 102. In step 1106, the user computer 102 accesses the database computer 122 to begin a rental session. In step 1108, a rental application is selected from a rental application database 214 contained in the database computer 122. The user browses the rental application database 214 on the database computer 122 using the directory request module, and selects one or more rental applications. In step 1110, the selected rental application is transferred from the database computer 122 to the user computer 102. In step 1112, the rental application is executed on the user computer 102. In step 1118, the normal flow of the rental application is executed. Execution continues at step 1120.

In step 1114, an asynchronous header password verification process is executed in parallel with the normal flow of rental application of step 1118. This process ensures that continuous communication is maintained between the user computer 102 and the database computer 122. In decision block 1116, a check is made to determine if the password verification is successful. When decision block 1116 returns true (yes), execution continues at step 1114. When decision block 1116 returns false (no), execution continues at step 1120. In step 1120, the rental application is terminated. In step 1122, the rental session is terminated.

Figure 8:
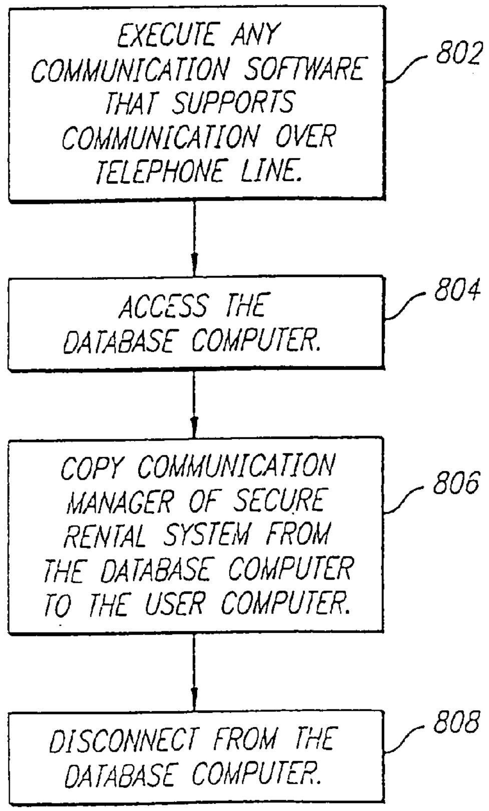
FIG. 8 is a flow diagram illustrating transfer of a communication manager from the central rental facility to the remote user computer system.

FIG. 8 is a flow diagram illustrating step 1102 of FIG. 11 for transferring the communication manager 280 to the user computer 102 from the database computer 122. Step 1102 is normally performed once. Subsequent execution of the steps illustrated in FIG. 11 is performed without step 1102. In step 802 of FIG. 8, any communication software that supports communication over telephone transmission lines is executed using the user computer 102. The communication software may be any off-the-shelf communication application. In step 804, the user computer 102 accesses the database computer 122 using the communication software. In step 806, a communication manager of the Secure Rental System is copied from the database computer 122 to the user computer 102. In step 808, the user computer 102 is disconnected from the database computer 122.

b) Dynamic Asynchronous Password Verification

Figure 9:
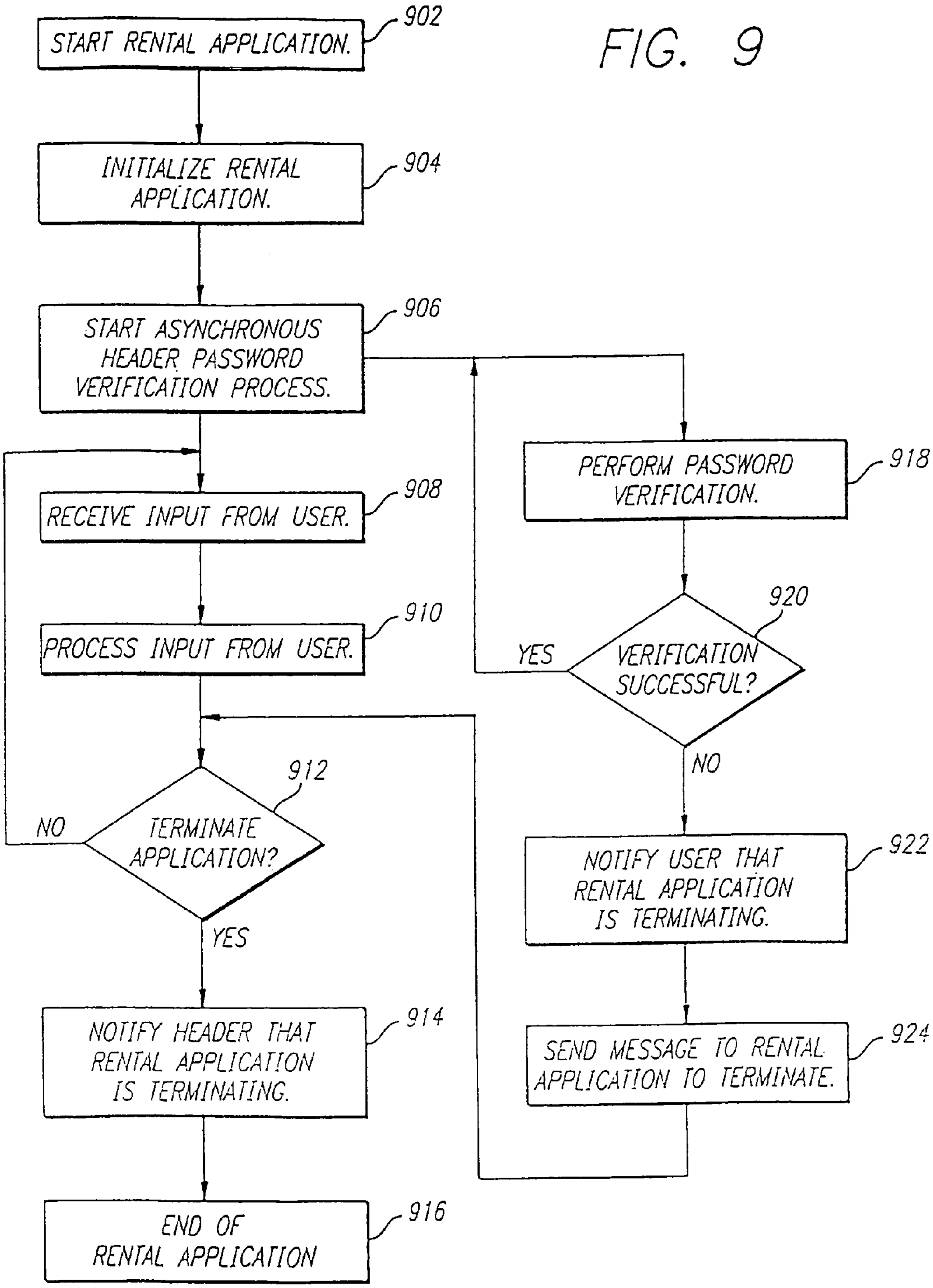
FIG. 9 is a flow diagram illustrating the step 1118 of FIG. 11 of the present invention.

FIG. 9 is a flow diagram illustrating the step 1118 of FIG. 11 for performing the normal flow of the rental application. In step 902, the rental application starts executing. In step 904, the rental application is initialized. In step 906, the asynchronous header password verification process is started using the application software interface parameters 315. The asynchronous header password verification process operates in parallel with the process including steps 902-916. In the normal flow process, execution continues at step 908. In step 908, the rental application receives input from the user. In step 910, the input received from the user is processed. Execution continues at decision block 912.

In the asynchronous header password verification process, execution continues at step 918. In step 918, the password verification process is performed. In decision block 920, a check is made to determine if the verification is successful. When decision block 920 returns true (yes), execution continues at step 918. When decision block 920 returns false (no), execution continues at step 922. In step 922, the user is notified that the rental application is terminating. In step 924, a message is sent to the rental application for it to terminate. Execution continues at decision block 912.

In decision block 912, a check is made to determine if the rental application should terminate. When decision block 912 returns false (no), execution continues at step 908. When decision block 912 returns true (yes), execution continues at step 914. Thus, decision block 912 returns true (yes) when either the rental application terminates normally, or the password verification process is not successful and sends a terminate message to the normal flow process. In step 914, the header is notified that the rental application is terminating. In step 916, the rental application is terminated.

c) Asynchronous Header Password Verification Process

FIGS. 10A-10D are flow diagrams illustrating the asynchronous header password verification process of the present invention. In step 1002, the password verification process is started. In step 1004, the header software 320 establishes program-to-program communications with communication manager 280 of the user computer 102. In decision block 1006, a check is made to determine if communication is established between the header software 320 and the communication manager 280. When decision block 1006 returns false (no), execution continues at step 1016. In step 1016, the user is notified that communication with the database, computer 122 is not established. In step 1018, a message is sent to the rental application for it to terminate. In step 1020, the header 320 terminates.

When decision block 1006 returns true (yes), execution continues at step 1008. In step 1008, a rental application transfer time request is created using a user identification and a rental application identifier (alternatively referred to as the application identifier). In step 1010, the rental application transfer time request is encrypted. In step 1012, the rental application transfer time request is encrypted. In step 1012, the rental application transfer time request is sent to the database computer 122 using the communication manager 280. In decision block 1014, a check is made to determine if thirty seconds has elapsed since the rental application transfer time request was sent to the database computer 122. When decision block 1014 returns false (no), execution continues at decision block 1014. When decision block 1014 returns true (yes), execution continues at step 1022 of FIG. 10B.

Figure 10A:
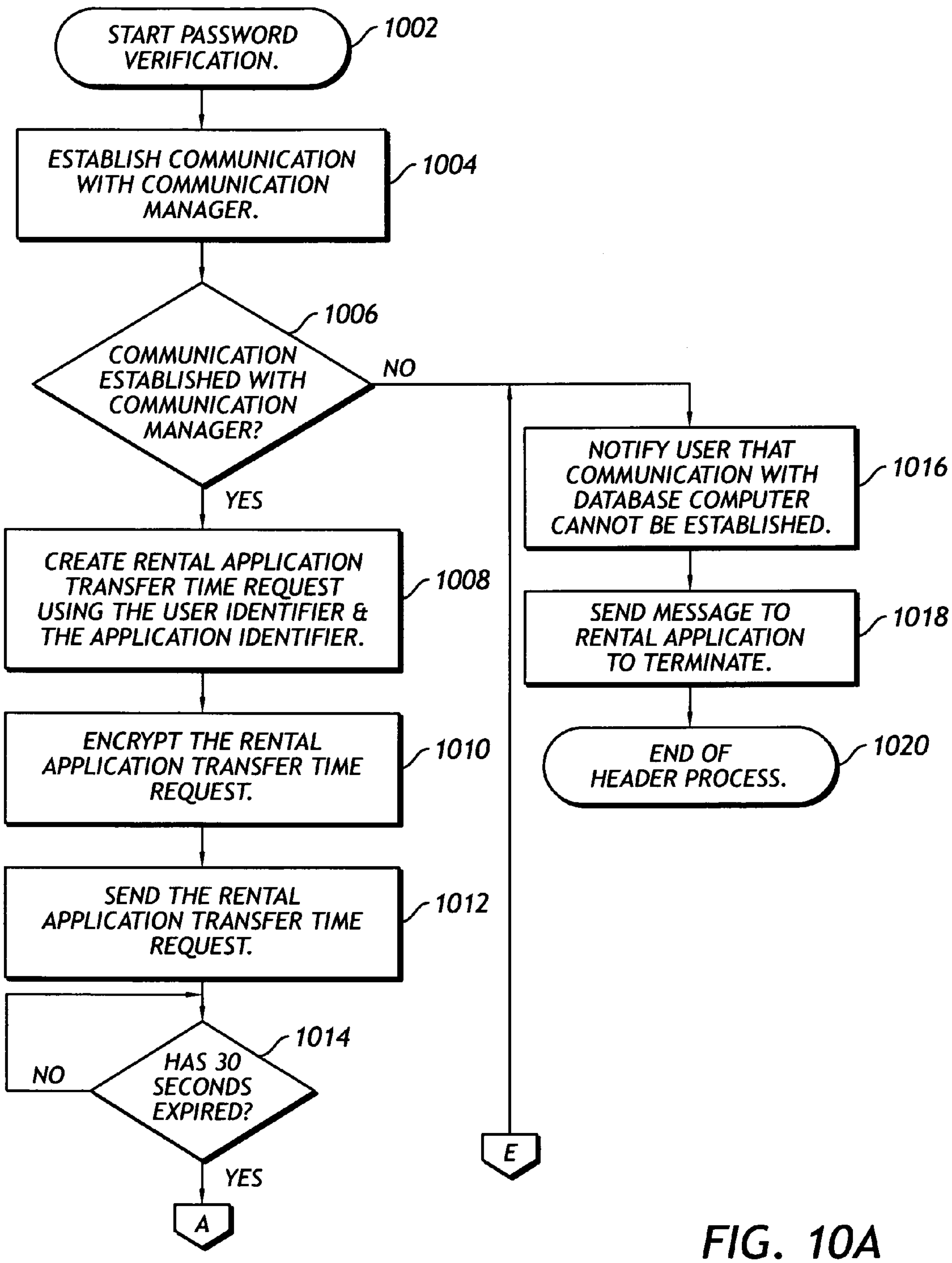
FIGS. 10A-10D are flow diagrams illustrating the asynchronous header password verification process of the present invention; and, FIG. 11 is a flow diagram illustrating the present invention for providing a secure software rental system.
Figure 10B:
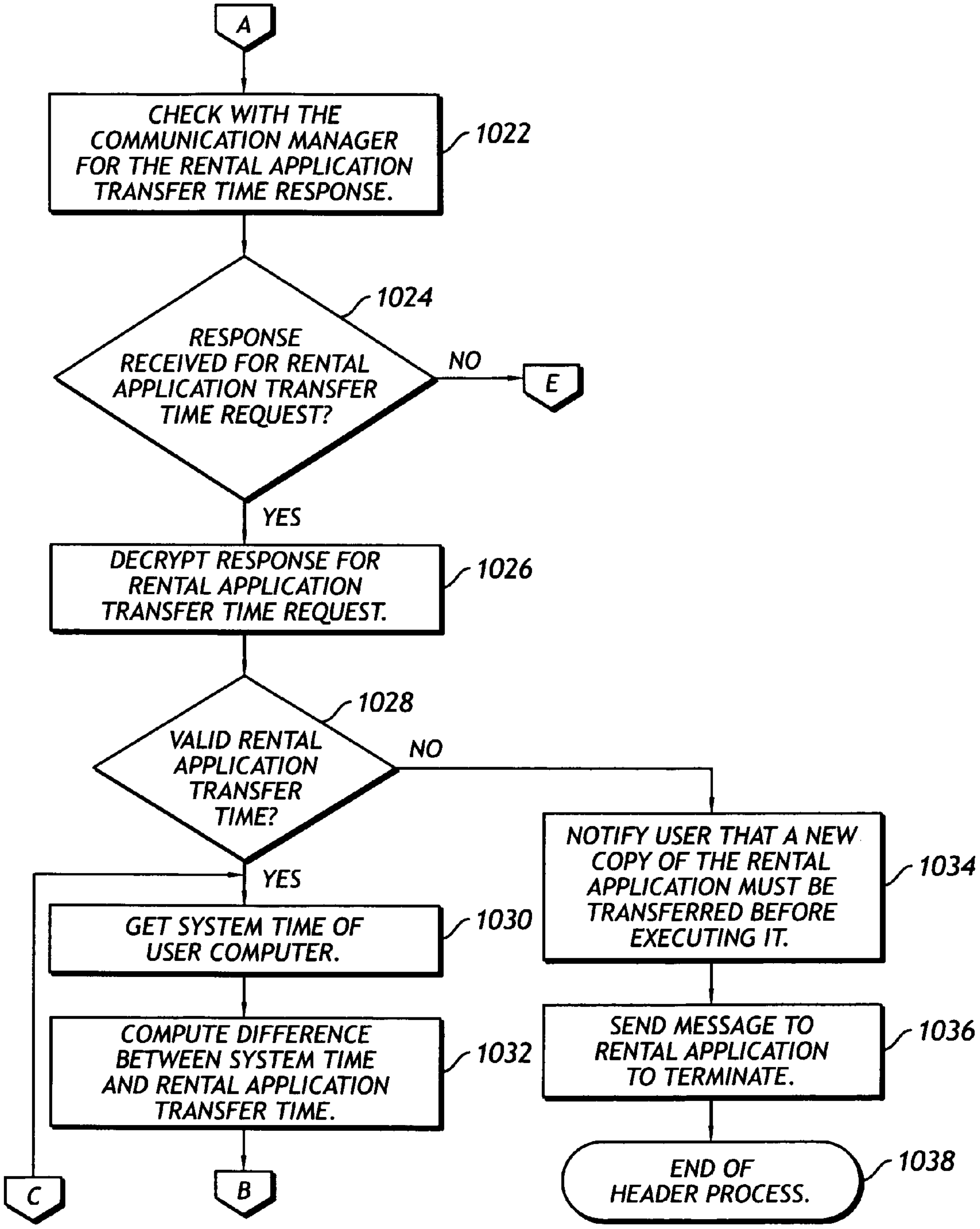

In step 1022 shown in FIG. 10B, the communication manager is checked for the rental application transfer time request. In decision block 1024, a check is made to determine if a response was received for the rental application transfer time request. When decision block 1024 returns false (no), execution continues at step 1016 of FIG. 10A notifying the user that communication with the database computer 122 is not established. When decision block 1024 returns true (yes), execution continues at step 1026. In step 1026, the response for the rental application transfer time request is decrypted.

In decision block 1028, a check is made to determine if the rental application transfer time is valid. When decision block returns false (no), execution continues at step 1034. In step 1034, the user is notified that a new copy of the rental application must be transferred from the database computer 122 to the user computer 102 before it can be executed. In step 1036, a message is sent to the rental application for it to terminate. In step 1038, the header 320 is terminated. When decision block 1028 returns true (yes), execution continues at step 1030. In step 1030, the system time of the user computer 102 is obtained. In step 1032, the difference between the system time of the user computer 102 and the rental application transfer time are computed. Execution continues at step 1040 of FIG. 10C.

Figure 10C:
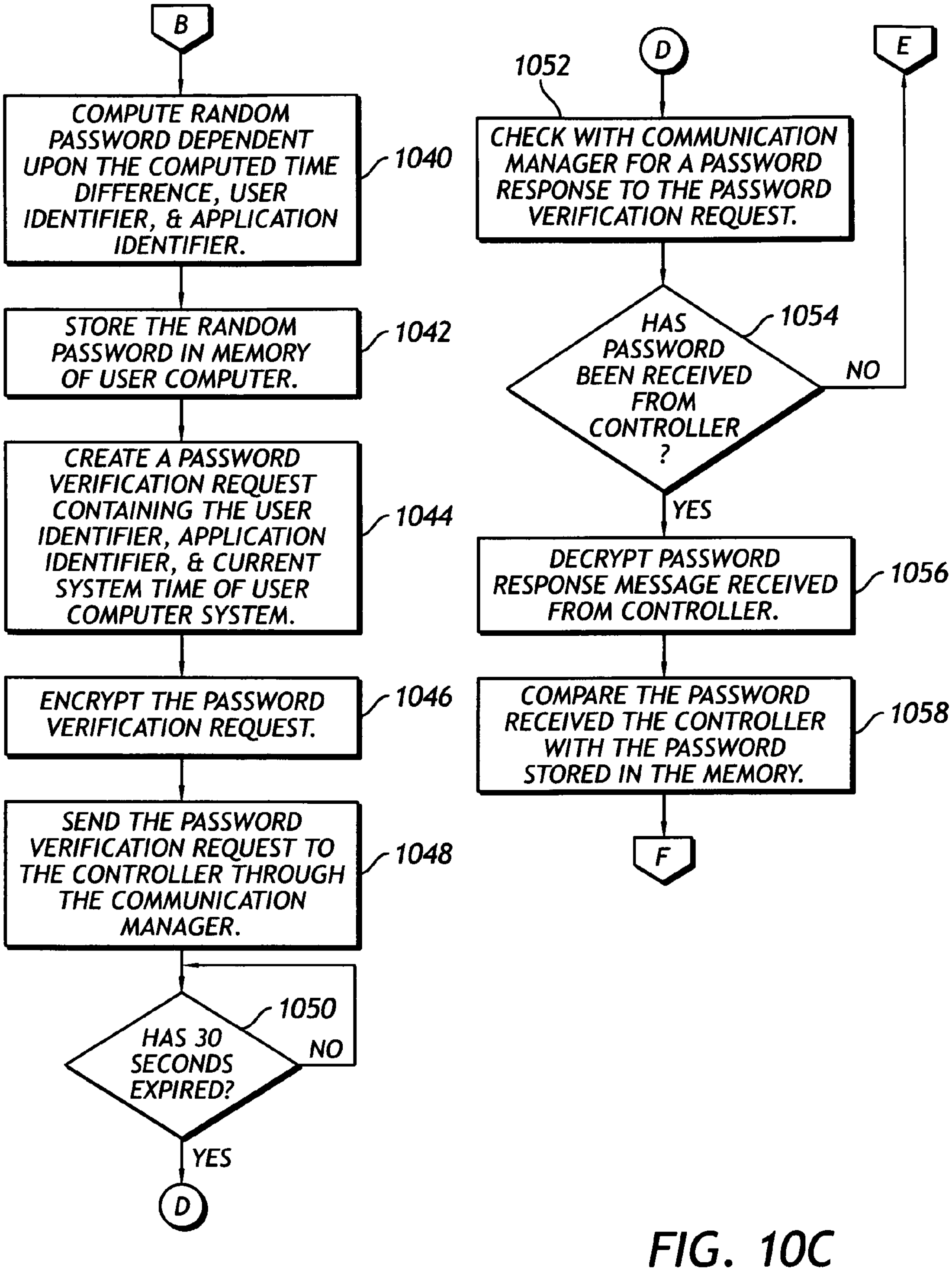
Figure 10D:
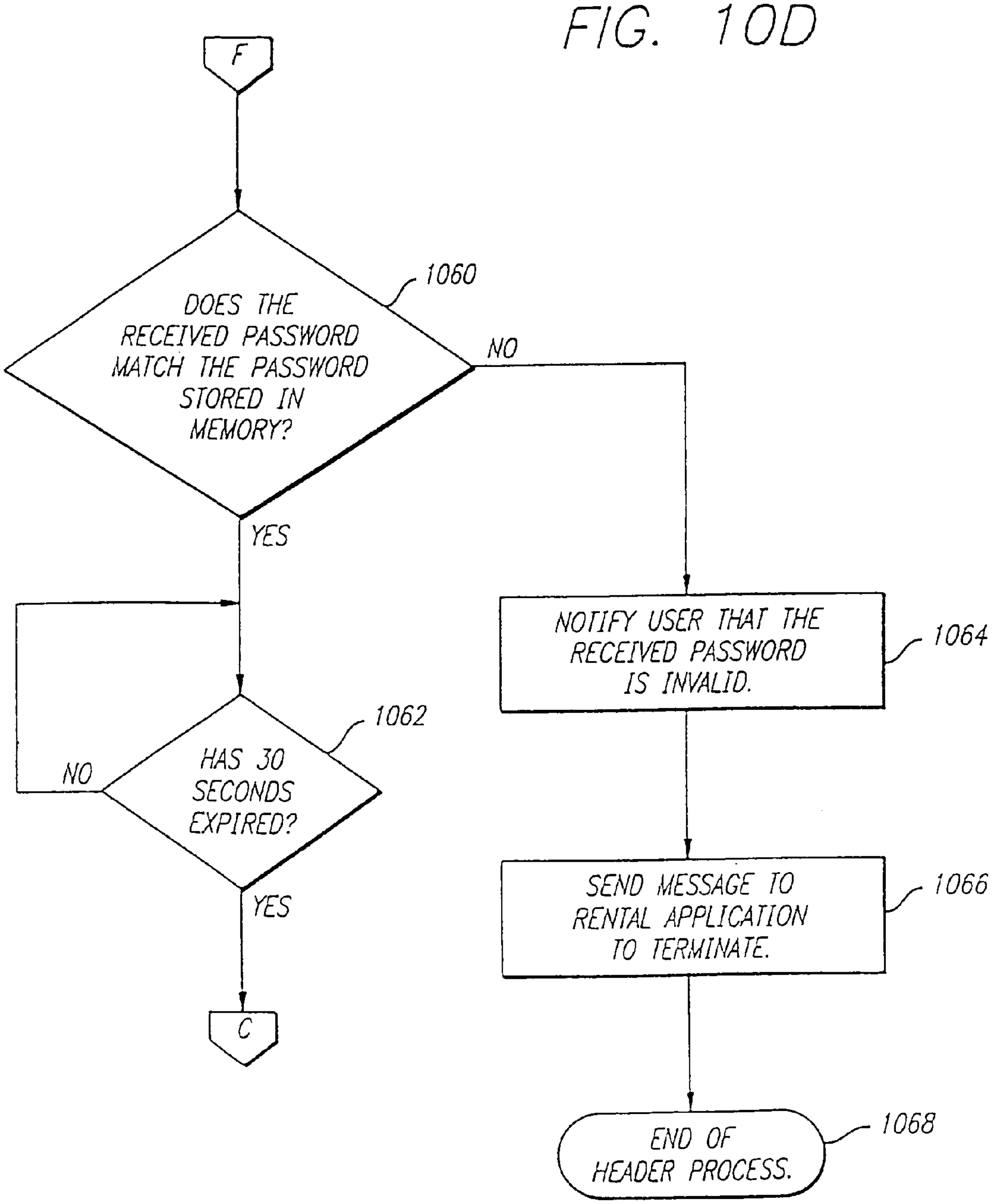

In step 1040 shown in FIG. 10C, a random password is computed dependent upon the computed time difference, the user identifier, and the application identifier. In step 1042, the random password is stored in memory of the user computer 102. In step 1044, a password verification request is created containing the user identifier, the application identifier, and the current system time of the user computer system. In step 1046, the password verification request is encrypted. In step 1048, the password verification request is sent to the controller 222 of the database computer 122 through the communication manager. In step 1050, a check is made to determine if thirty seconds has elapsed since the password verification request was sent to the multi-user controller 222. When decision block 1050 returns false (no), execution continues at decision block 1050. When decision block 1050 returns true (yes), execution continues at step 1052.

In step 1052, the communication manager is checked for a password response to the password verification request. In decision block 1054, a check is made to determine whether a password has been received from the multi-user controller 222. When decision clock 1054 returns false (no), execution continues at step 1016 shown in FIG. 10A. When decision block 1054 returns true (yes), execution continues at step 1056. In step 1056, the password response message from the multi-user controller 222 is decrypted. The decrypted password received from the multi-user controller 222 is compared with the password stored in the memory of the user computer 102. Execution continues at step 1060 of FIG. 10D.

In decision block 1060, a check is made to determine if the received password matches the password stored in the memory. When decision block 1060 returns false (no), execution continues at step 1064. In step 1064, the user is notified that the received password is invalid. In step 1066, a message is sent to the rental application for it to terminate. In step 1068, the header 320 terminates. When decision block 1060 returns true (yes), execution continues at decision block 1062. In decision block 1062, a check is made to determine if thirty seconds has elapsed. When decision block 1062 returns false (no), execution continues at decision block 1062. When decision block 1062 returns true (yes), execution continues at step 1030 shown in FIG. 10B.

There are, however, at least three ways that a user may attempt to circumvent the rental scheme. In the first method, the user disconnects the communication link while the application software 310 is being executed. This event is detected by the header software 320 because the dynamic password authorization procedure fails due to the lack of a communications link. In the second method, the user attempts to execute a previously transferred and stored application software 310 without having a communication link to the central rental facility 180. This event is detected by the header software 320 producing a failure because a communication link does not exist. In the third method, the user attempts to execute a previously stored application software using an established communication link with the central rental facility 180. This event is detected by the header software 320 producing a failure because a valid transfer time does not exist. The three methods are disclosed in detail below.

4. Disconnecting Communication Link While Executing Application Software

In the first manner of attempting to circumvent the software rental system, after transferring the executable element of the application software 310 to the user computer 102 and initiating execution of the application software 310, the user disconnects the communication link between the remote user computer system 150 and the central rental facility 180. FIG. 9 is a flow diagram illustrating step 1118 of FIG. 11 for performing the normal flow of the rental application prior to the user disconnecting the communication link with the central rental facility 180. FIGS. 10A-10D are flow diagrams illustrating the asynchronous password verification process under normal operation. If the communication link is disconnected after initiating execution of the application software 310, communication failure is located in one of two places in the asynchronous password verification process.

The first failure begins at step 1012 of FIG. 10A. In step 1012, the rental application transfer time request is sent to the database computer 122 using the communication manager 280 of the user computer 102. In decision block 1014, a check is made to determine if thirty seconds has elapsed since the rental application transfer time request was sent to the database computer 122. When decision block 1014 returns false (no), execution continues at decision block 1014. When decision block 1014 returns true (yes), execution continues at step 1022 of FIG. 10B. In step 1022, the communication manager 280 is checked for the rental application transfer time request. In decision block 1024, a check is made to determine if a response was received for the rental application transfer time request. A rental application transfer request is not obtained because the communication link was disconnected after execution of the application software 310 was initiated. Decision block 1024 returns false (no) and execution continues at step 1016 of FIG. 10A. In step 1016, the user is notified that communication with the database computer 122 is not established. A message is sent to terminate the rental application in step 1018 and the header 320 terminates in step 1020.

The second failure begins at step 1048 of FIG. 10C. In step 1048, the password verification request is sent to the multi-user controller 222 of the database computer 122 through the communication manager 280. In decision block 1050, a check is made to determine if thirty seconds has elapsed since the password verification request was sent to the multi-user controller 222. When decision block 1050 returns false (no), execution continues at decision block 1050. When decision block 1050 returns true (yes), execution continues at step 1052. In step 1052, the communication manager 280 is checked for a password response to the password verification request. In decision block 1054, a check is made to determine if a password has been received from the multi-user controller 222. A password response is not obtained because the communication link was disconnected after execution of the application software 310 was initiated. Decision block 1024 returns false (no) and execution continues at step 1016 of FIG. 10A. In step 1016, the user is notified that communication with the database computer 122 is not established. A message is sent to terminate the rental application in step 1018 and the header 320 terminates in step 1020.

5. Execute Rental Application Using Stored Application Software Without Connecting to the Central Rental Facility In the second manner of attempting to circumvent the software rental system, the user copies the executable element of the application software 310 to a storage device (e.g., a hard disc or a floppy disc) of the user computer 102. The user subsequently loads the executable element of the application software 310 from the storage device and attempts to execute it using the user computer 102 without a communication link established between the user computer 102 and the central rental facility 180.

Figure 4:
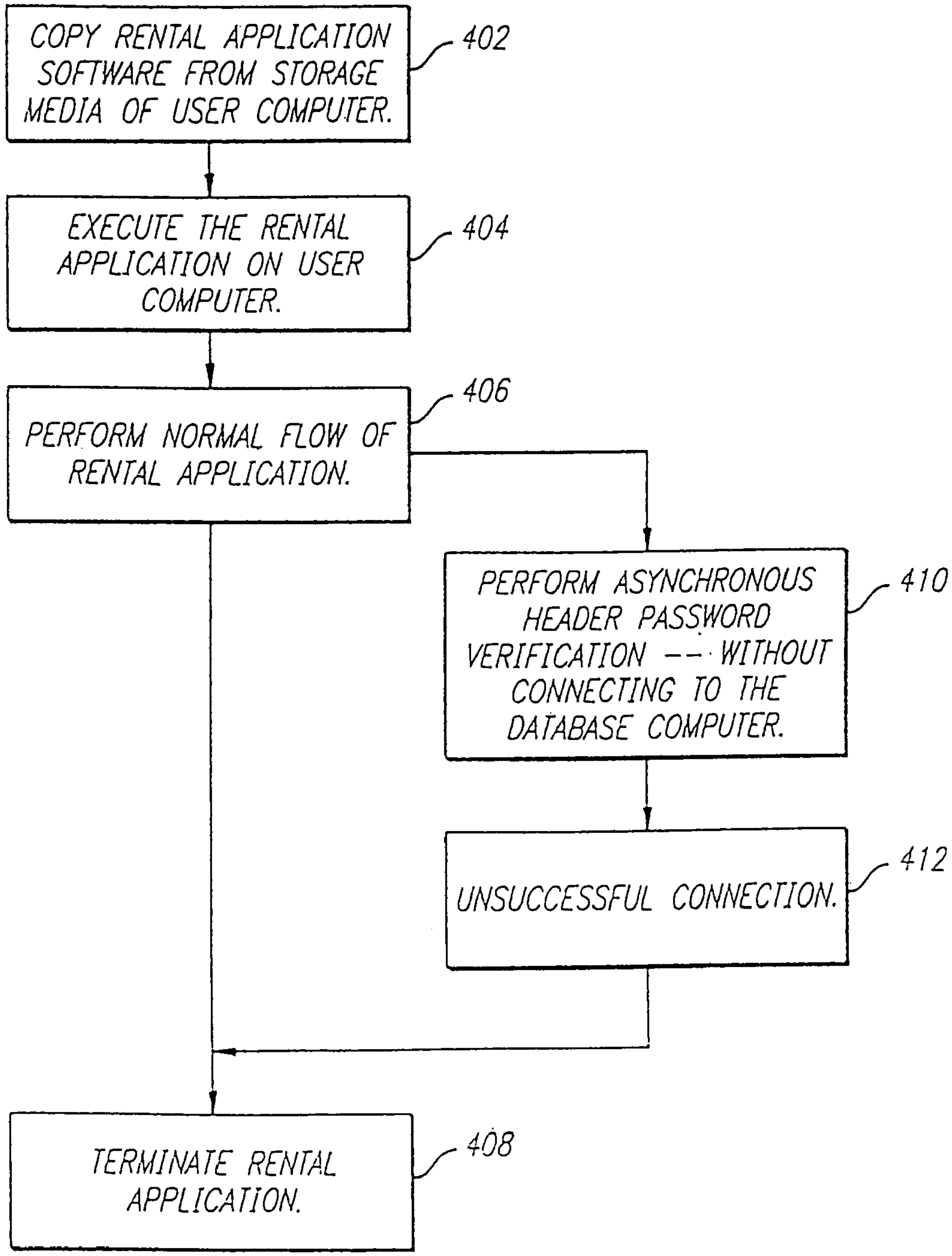
FIG. 4 is a flow diagram illustrating the present invention for preventing execution of a rental application stored in the user computer when the user computer is not connected to the central rental facility.
Figure 5:
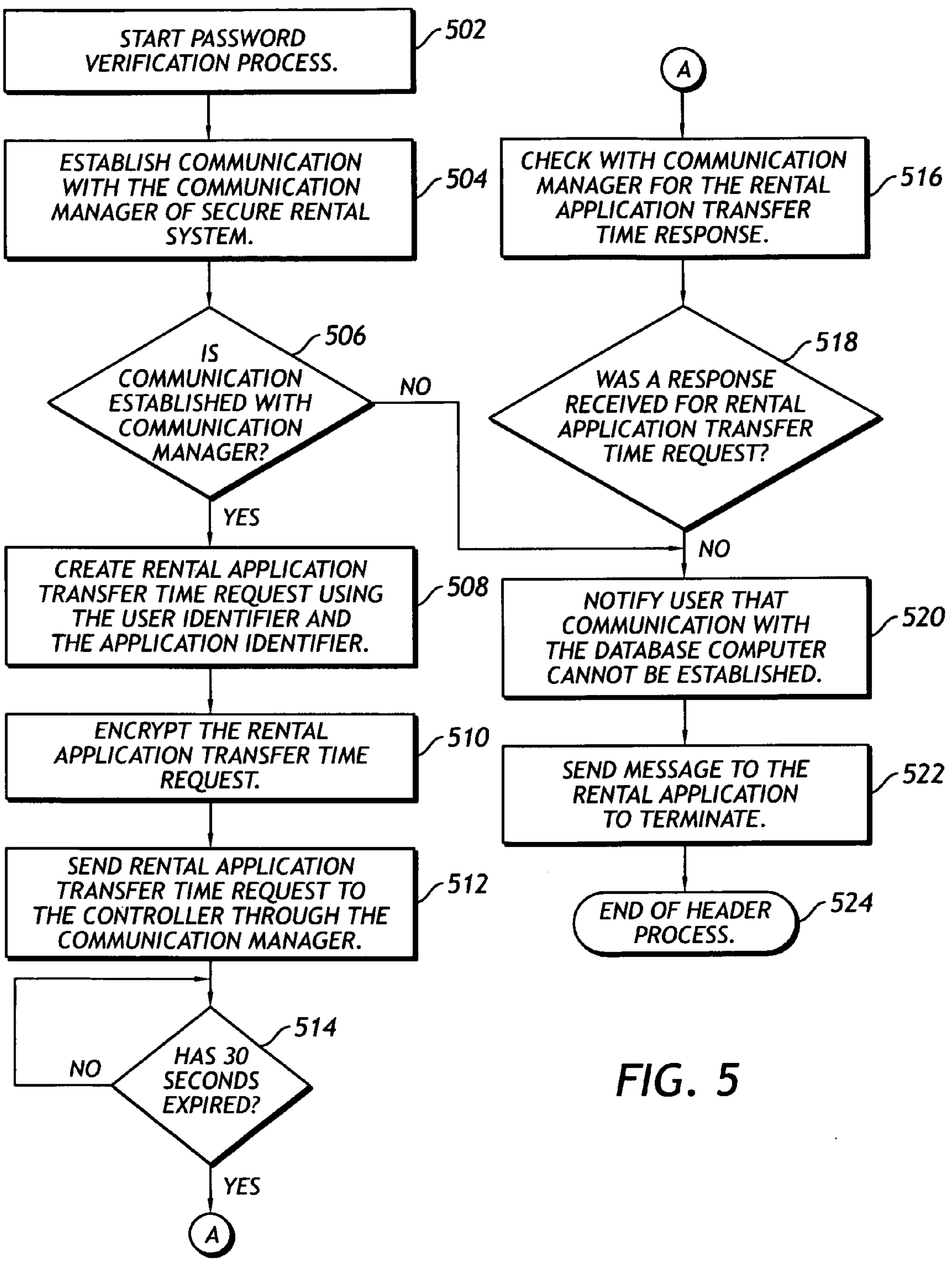
FIG. 5 is a flow diagram further illustrating FIG. 4.

Since the application software 310 is available in the user computer 102, the user may attempt to execute it. Attempting to execute the application software 310 immediately triggers the header software 320 that is integrated with it, thereby activating the rental security manager 321. In turn, the rental security manager 321 initiates the authorization verification process. In the authorization verification process, an encrypted message containing the user processor clock time, the user identification password, and the identification number for the application software 310 is communicated to the multi-user controller 222 of the central rental facility 180. When the rental security manager 321 attempts to initiate communications using the communication manager interface 328, it however detects an error because the communication link with the central rental facility 180 is disconnected. Once the error is detected, the rental security manager 321 determines that an unauthorized attempt to execute the application software 310 occurred, and it terminates the application software 310. An appropriate message is displayed to the user through the user display interface 326. FIGS. 4 and 5 illustrate the present invention in detail for this case.

FIG. 4 is a flow diagram illustrating the present invention when a rental application that is stored on the storage media of the user computer 102 is executed without connecting to the database computer 122. In step 402, a rental application is copied from a storage media of the user computer 102 to the memory of the user computer 102 without connecting to the database computer 122. In step 404, the rental application is executed on the user computer 102. In step 406, the normal flow of the rental application is performed as disclosed in FIG. 2. Execution continues at step 408. In step 410, parallel with the normal flow of the rental application of step 406, the asynchronous header password verification process is performed without connecting to the database computer 122. In step 412, a message for an unsuccessful connection is sent to the rental application. Execution continues at step 408. In step 408, the rental application terminated.

FIG. 5 is a home diagram illustrating step 410 of FIG. 4 for performing the asynchronous header password verification without connecting to the database computer 122. In step 502, the password verification process starts. In step 504, communication is established between the header software 320 and the communication manager 280 of the user computer 102. In step 506, a check is made to determine if communication is established between the header software 320 and the communication manager 280 of the user computer 102. When decision block 506 returns false (no), execution continues at step 520. When decision block 506 returns true (yes), execution continues at step 508. In step 508, a rental application transfer time request is created using the user identifier and the application identifier.

In step 510, the rental application transfer time request is encrypted. In step 512, the rental application transfer time request is sent to the multi-user controller 222 through the communication manager. In decision block 514, a check is made to determine if 30 seconds has expired. When decision block 514 returns false (no), execution continues at decision block 514. When decision block 514 returns true (yes), execution continues at step 516. In step 516, the communication manager is checked for the rental application transfer time response. In decision block 518, a check is made to determine if a response was received for the rental application transfer time request. When decision block 518 returns false (no) because the user computer 102 is not connected to the database computer 122, execution continues at step 520. In step 520, the user is notified that communication with the database computer 122 is not established. In step 522, a message is sent to the rental application for it to terminate. In step 524, the header terminates.

Since the user computer 102 is connected to the central rental facility 180 via the communication link, the rental security manager 321 transmits the encrypted transfer time request message (containing the user identification password and the identification number of the application software) to the multi-user controller 222 of the central rental facility 180. After the message is received by the multi-user controller 222, it decrypts the message and tries to retrieve the transfer time associated with the application software 310 that is represented by an identification number. As stated previously, the transfer time of a particular application software 310 is stored temporarily in the user file in the central rental facility 180 during the time period when the user computer 102 is connected to the central rental facility 180 by a communication link and the user transfers then application software 310 to the user computer 102 from the rental application database 262. The multi-user controller 222 uses the file transfer module 208 to transfer the application software 310.

6. Execute Stored Rental Application—Connected to the Central Rental Facility Without Transferring Rental Application The third method of attempting to circumvent the present invention involves the user establishing a communication link between user computer 102 and the central rental facility 180. Instead of currently transferring the application software 310 from the rental application database 214 of the central rental facility 180, the user loads an executable element of the application software 310 into the user computer 102 from a copy of the application software 310 previously stored in a storage device of the user computer 102.

Figure 6:
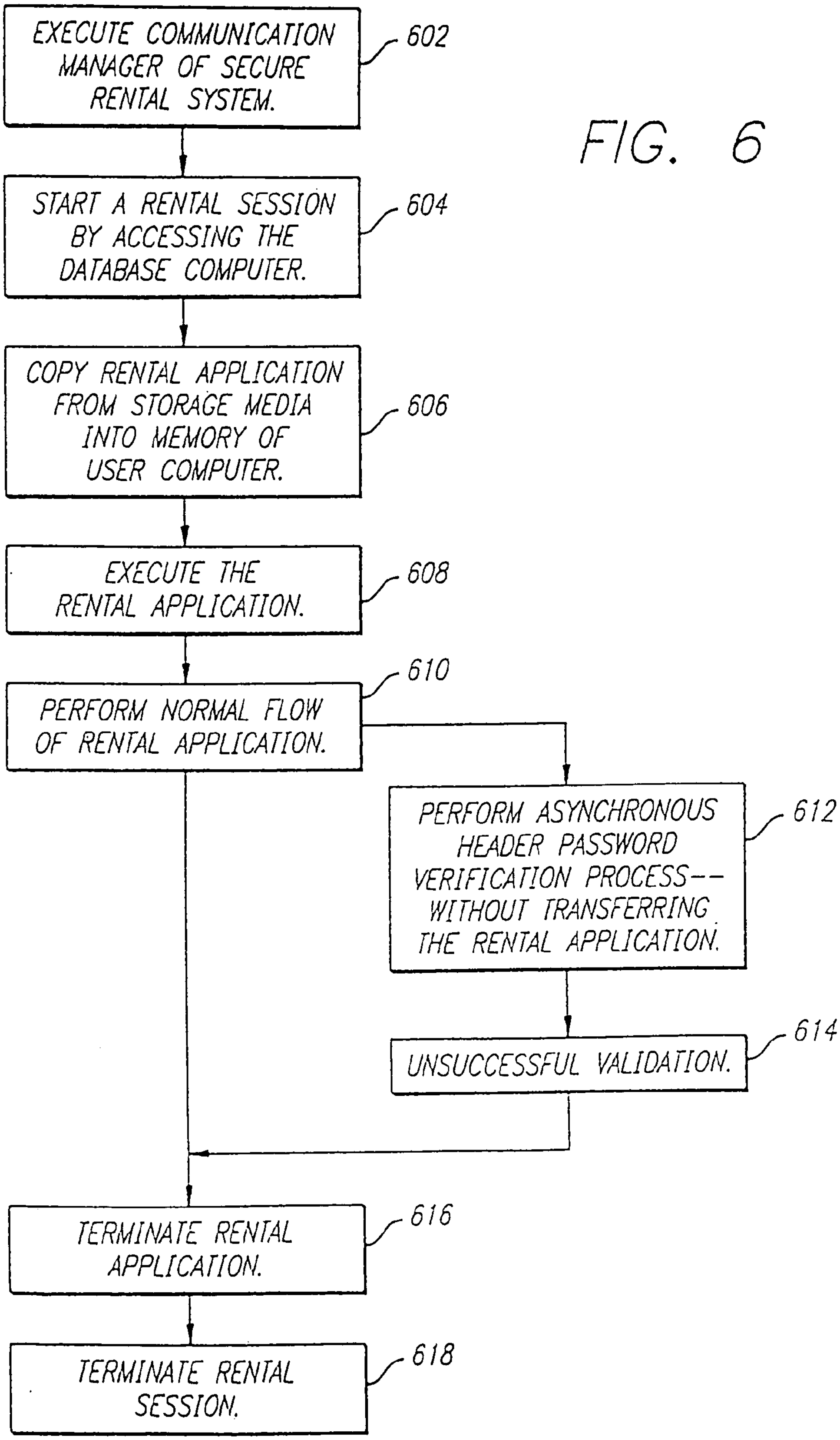
FIG. 6 is a flow diagram illustrating the present invention when a rental application stored on the storage media of the user computer is executed after connecting to the database computer without transferring the rental application from the database computer.
Figure 7A:
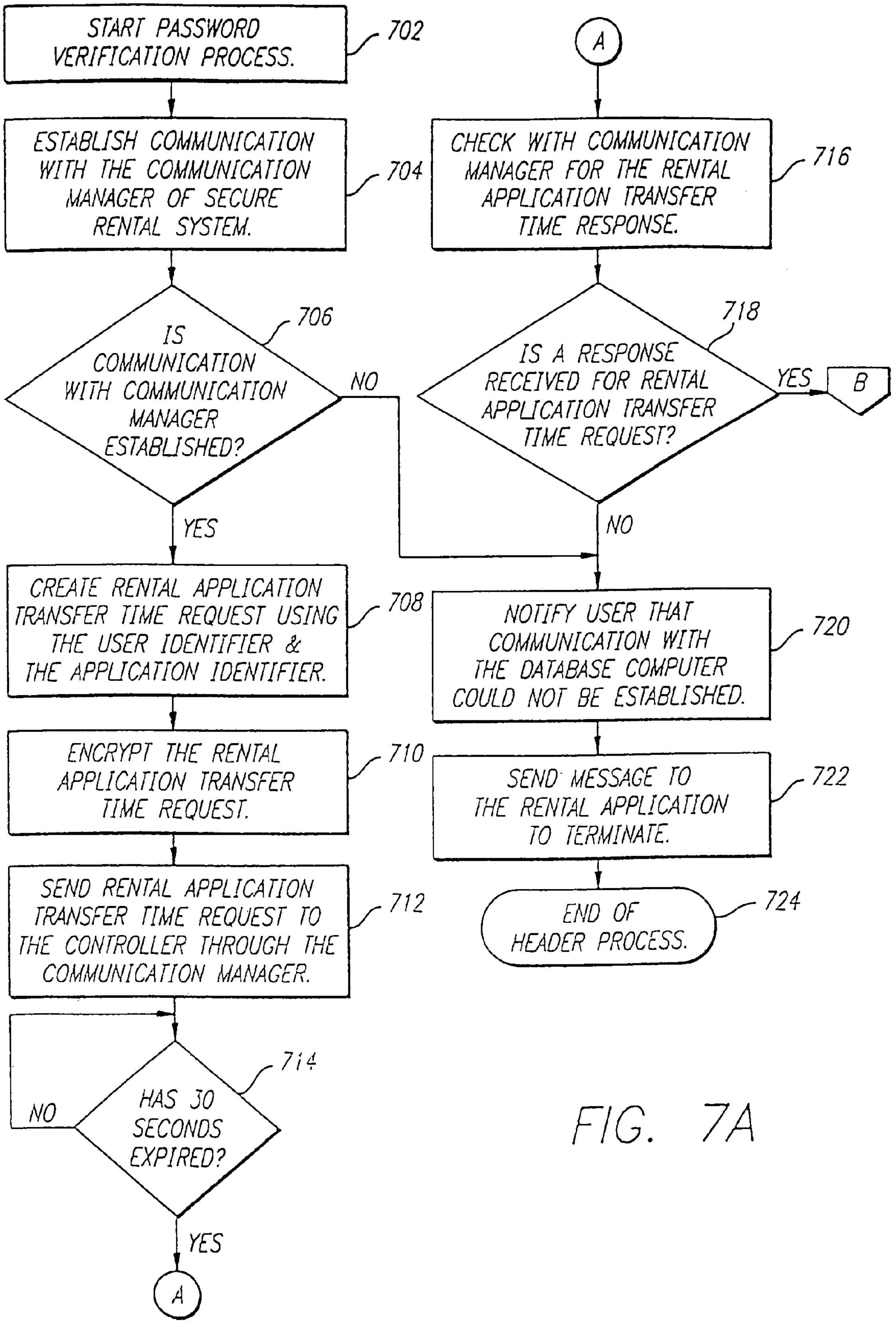
FIGS. 7A-7B are flow diagrams further illustrating FIG. 6.
Figure 7B:
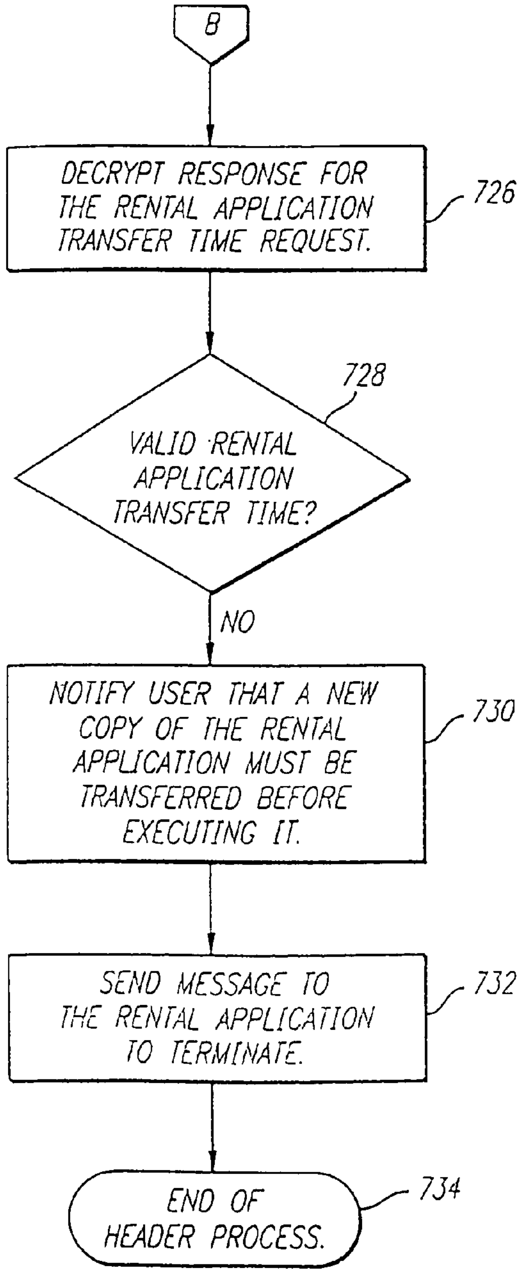

The information including the application software transfer time is erased from storage of the central rental facility 180 when the communication session with the user is terminated. If the user computer 102 subsequently reestablishes a communication link with the central rental facility 180, the transfer time of the application software 310 transferred in a prior session is not available at the central rental facility 180. Therefore, when the multi-user controller 222 tries to retrieve the transfer time from the user file, it fails to locate the information. This triggers an error condition, and the error condition is communicated to the rental security manager 321. The rental security manager 321 determines that an unauthorized attempt to execute the application software has been made and terminates the application software 310. An appropriate message is displayed to the user through the user display interface 326. FIGS. 6, 7A and 7B illustrate the present invention in detail for this case.

FIG. 6 is a flow diagram illustrating the present invention when a rental application that is stored on the storage media of the user computer 102 is executed after connecting to the database computer 122 without, however, transferring the rental application from the database computer 122. In step 602, the communication manager of the present invention is executed. In step 604, a rental session is started by accessing the database computer 122. In step 606, the rental application is copied from the storage media of the user computer 102 into the memory of the user computer 102. In step 608, the rental application is executed. In step 610, the normal flow of the rental application is performed. Execution continues at step 616. In step 612, in parallel with the normal flow process of step 610, the asynchronous header password verification process is performed without transferring the rental application. In step 614, a message for an unsuccessful connection is sent to the rental application. Execution continues at step 616. In step 616, the rental application is terminated. In step 618, the rental session is terminated.

FIGS. 7A-7B are flow diagrams illustrating step 612 of FIG. 6 for performing the asynchronous header password verification process after connecting to the database computer 122 without, however, transferring the rental application from the database computer 122. In step 702, the password verification process is started. In step 704, communication is established between the user and database computers using the communication manager of the present invention. In decision 706, a check is made to determine if communication is established using the communication manager. When decision block 706 returns false (no), execution continues at step 720. When decision block 706 returns true (yes), execution continues at step 708.

In step 708, a rental application transfer time request is created using the user identifier and the application identifier. In step 710, the rental application transfer time request is encrypted. In step 712, the rental application transfer time request is sent to the multi-user controller 222 through the communication manager. In decision block 714, a check is made to determine if thirty seconds has expired. When decision block 714 returns false (no), execution continues at decision block 714. When decision block 714 returns true (yes), execution continues at step 716. In step 716, the communication manager is checked for rental application transfer time response. In decision block 718, a check is made to determine if a response is received for the rental application transfer time request. When decision block 718 returns false (no), execution continues at step 720. In step 720, the user is notified that communication with the database computer 122 could not be established. In step 722, a message is sent to the rental application for it to terminate. In step 724, the header is terminated. When decision block 718 returns true (yes), execution continues at step 726 of FIG. 7B.

In step 726 shown in FIG. 7B, the response for the rental application transfer time request is decrypted. In decision block 728, a check is made to determine if the rental application transfer time is valid. When decision block 728 returns false (no), execution continues at step 730. In step 730, the user is notified that a new copy of the rental application must be transferred to the user computer 102 before the rental application can be executed. In step 732, a message is sent to the rental application for it to terminate. In step 734, the header 320 is terminated.

7. Multiple Users and Applications

The present invention requires the user to transfer the application software 310 from the rental application database 214 to user computer 102 in each communication session between the remote user computer system 150 and the central rental facility 180 for the user to execute the application software 310. The present invention enables the central rental facility 180 to monitor the time period when a particular application software 310 is executed by a user. Since the multi-user controller 222 continuously interfaces and interacts with the rental security manager 321 during execution of the application software 310, the multi-user controller 222 is able to monitor and record the pertinent information regarding the execution in the user file for billing and accounting purposes.

Further, the multi-user controller 222 is able to transfer, interface, and monitor more than one application software 310 concurrently with regarding to a user. Thus, the user may transfer more than one application software 310 from the rental application database 214 and execute each one during a single communication session between the user computer 102 and the central rental facility 180.

In addition, the multi-user controller 222 is capable of interfacing with a number of users concurrently. However, each user is handled separately and no other user has access to any information of any other user. The multi-user controller 222 operates by interfacing with user password validation module 204, directory request module 206, file transfer module 208, and user status module 210. The user password validation module 204 interfaces with user registration database 214 through electronic interface 240. Directory request module 206 interfaces with rental application database 214 through electronic interface 242. File transfer module 208 interfaces both rental application database 214 and user memory 216 through electronic interfaces 244 and 246. User status module 210 interfaces the connected user status in memory 216 through electronic interface 248 and also interfaces transaction log database 218 through electronic interface 250.

The memory/storage unit 220 of central rental facility 180 stores all relevant information for operating the central rental facility 180 and can be updated as needed using on-line executive and management software in the database computer 122 of the central rental facility 180. The management function includes monitoring and administrating operating of central rental facility 180. Further, the management software is capable of providing periodic status information of the operations of the central rental facility 180 to the operator.

Thus, the present invention provides a system for securely renting application software to users connected to the database computer 122. It prevents unauthorized copying and usage of the application software. The system provides a unique security method that is specific to each user for preventing circumvention of the system by the user and persons other than the user, thereby preventing other persons from using the application software. The present invention implements a general security scheme that is independent of any specific application software. The system allows the user to access application software without being made aware that the security system is continuously processing during execution of the application software.

C. Secure On-Line Postage System

The present invention can be applied to secure on-line postage metering service, particularly in conjunction with the United States Postal System (USPS).

In the following description, numerous specific details such as the virtual postage meter architecture, communication protocol, meter licensing process, cryptographic process, and mail piece generation are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

In one embodiment of the current invention, the rental software is an on-line postage metering program and on-line dynamic password verification methods described above are used to provide a secure authentication process. The On-line postage metering system embodiment of this invention, allows a user to print a postal indicium at home, at the office, or at any other desired place in a secure and fraud-free manner by using a printer connected to a user's computer.

Figure 12:
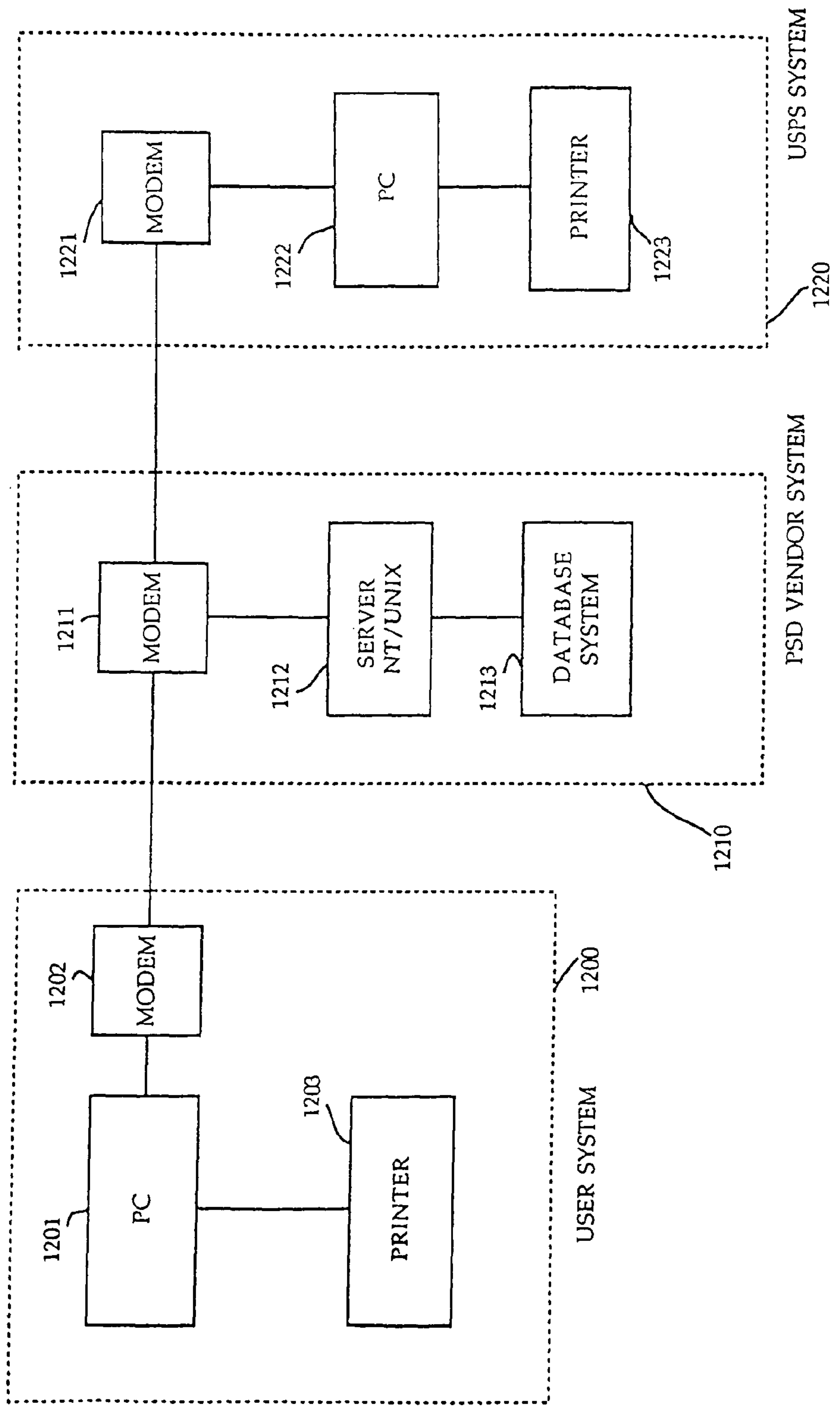
FIG. 12 shows a hardware block diagram of a secure electronic postage metering system constructed according to the invention.

To implement a secure on-line electronic metering system, the invention requires that the user's computer be able to communicate with a server computer, for example using a modem. FIG. 12 shows a hardware block diagram of a secure electronic metering system constructed according to the invention. The secure metering system of the invention may be used, for example, by an on-line postage metering service that provides virtual postage meter services to a customer, herein also referred to as a user or a client. In FIG. 12, user system 1200 functions as an on-line electronic postage meter and comprises a personal computer (PC) 1201, a modem 1202 connected to PC 1201, and a printer 1203 connected to PC 1201. Modem 1202 is connected to Postal Security Device (PSD) vendor system 1210.

As for software requirements, the system shown in FIG. 12 requires on-line postage metering software to provide the on-line postage metering service. In one embodiment of the invention, PC 1201 contains the header code portion of the on-line postage metering program. The header code by itself is not complete and requires inputs from the controller code of an on-line postage metering program to be operational. A user or a client must have access to user system 1200 to provide inputs such as desired postage amount, delivery destination information, or personal information to the secure on-line electronic metering system.

PSD vendor system 1210 provides security-critical functions for users and comprises a user database. In FIG. 12, PSD vendor system 1210 has modem 1211, a PSD server 1212 connected to the modem 1211, and a database system 1213 connected to the PSD server 1212. The modem 1211 is connected via a communication network to user system 1200 and USPS system 1220. Server 1212 contains the controller code portion of the on-line postage metering program. Because the header code contained in user system 1200 needs inputs from the controller code to activate and operate the on-line postage metering software that allows postal indicia to be printed by the user's system, a continuous link between PC 1201 and server 1212 must be established and maintained so that the header code in PC 1201 and the controller code in server 1212 can communicate with each other.

In one embodiment of the invention, server 1212 may be implemented by a personal computer or a workstation. In one embodiment, database system 1213 is a relational database that records postage purchased and used for each customer, including origin and destination information for each postal indicia generated by the postage metering system. Server 1212 includes customer service software for on-line performance of customer service functions and various communication programs for interfacing with user system 1200, USPS system 1220, and USPS-approved institutions. For example, in one embodiment of the invention, server 1212 runs software that provides for accounting, billing, monitoring, and auditing functions, and collects information such as customer profiles, accounting information, and details of the postage printed by the customer. In this embodiment, server 1212 has statistical analysis and monitoring tools to detect attempted fraud.

Referring to FIG. 12, USPS system 1220 comprises a modem 1221, a PC 1222 connected to the modem 1221, and a printer 1223 connected to the PC 1222. Software on USPS system 1220 includes statistical analysis tools, user activity monitoring tools, and user financial information access tools. In the embodiment shown in FIG. 12, USPS system 1220 performs user monitoring and user information access through PSD vendor system 1210, and allows authorized USPS personnel to have real-time, on-demand access to user usage and accounting data. For example, USPS 1220 can turn off a customer's ability to print postage by modifying the status of the customer on PSD vendor system 1210.

Database 1213 typically comprises user profiles for every user licensed to use the secure on-line postage metering system including the user's name, address, phone number, E-mail address, licensing post office, license number, and registration status. Database 1213 also comprises ascending and descending registers for each user. The descending register tracks the remaining amount of money available for postal indicium printing. The ascending register stores the total postage value used or purchased by the user. Database 1213 comprises a system usage log to log every postage metering transaction, quality assurance information for indicium quality assurance purposes, encryption information for users' public keys, and users' financial information such as credit cards, users' banking institutions, electronic funds transfer information, and automated clearinghouse transfer information.

The communication between modems 1202 and 1211 and between modems 1211 and 1221 may be via an Internet connection, or any other suitable means, including for example, a satellite link. All communications between user system 1200 and PSD vendor system 1210 are encrypted using a suitable encryption algorithm such as RSA (Rivest Shamir Adleman) by security modules 1310 and 1402 to ensure secure communication. Likewise, all communications between PSD vendor system 1210 and USPS 1220 are encrypted using a suitable encryption algorithm such as RSA (Rivest Shamir Adleman) algorithm by security modules 1310 and 1502 to ensure secure communication.

Figure 13:
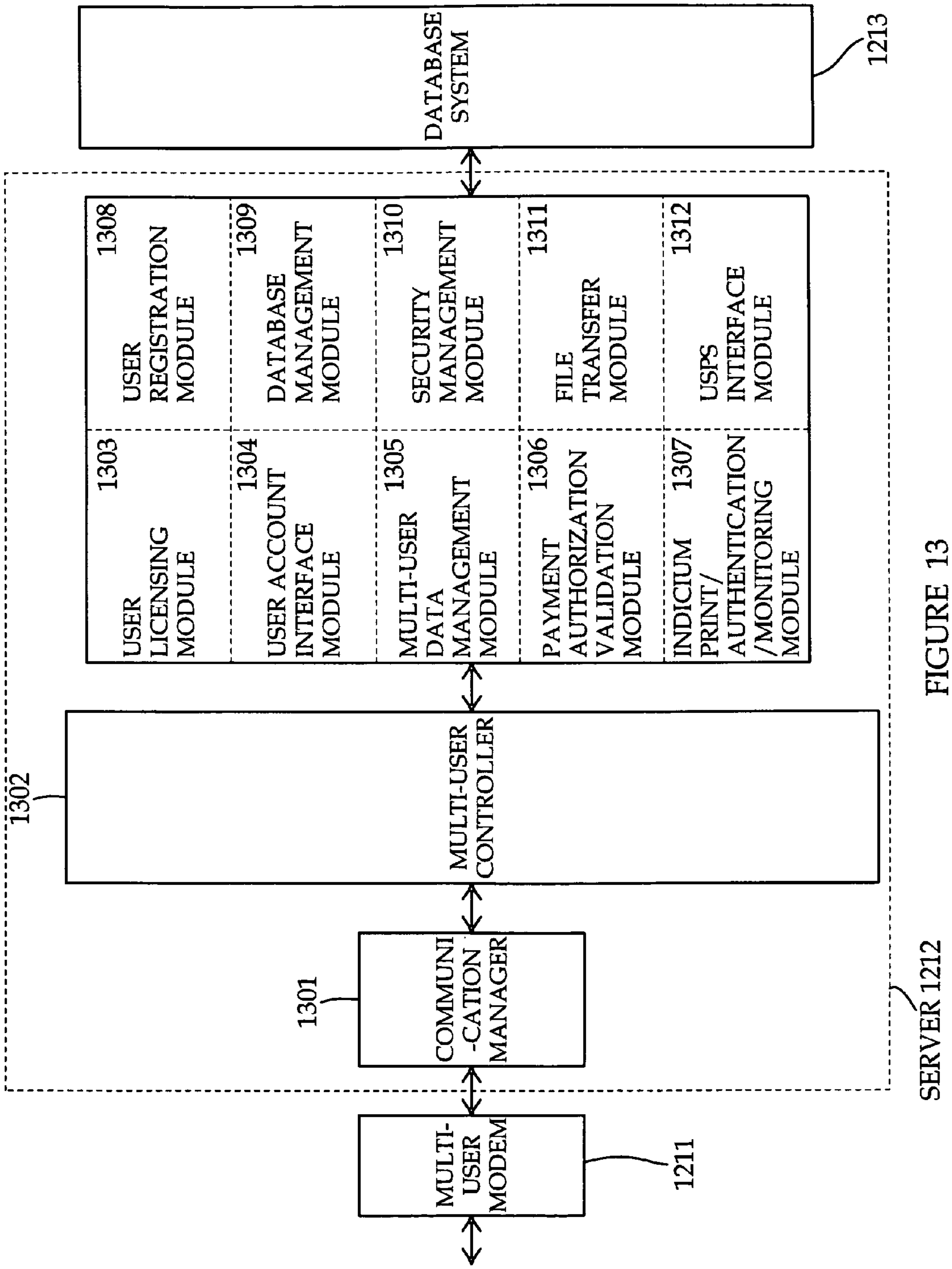
FIG. 13 shows server 1212 of FIG. 12 in greater detail according to one embodiment of the invention.

FIG. 13 shows server 1212 of FIG. 12 in greater detail according to one embodiment of the invention. In FIG. 13, server 1212 comprises communication manager 1301, multi-user controller 1302 connected to communication manager 1301, and a plurality of control modules 1303-1312: user licensing module 1303, user account interface module 1304, multi-user data management module 1305, payment authorization/validation module 1306, indicium print/authentication/monitoring module 1307, user registration module 1308, database management module 1309, security management module 1310, file transfer module 1311, and USPS interface module 1312.

User registration module 1308 may also include a telephone number verification module to identify the calling telephone number and to verify its association with a registered user. Security management module 1310 performs security-related functions such as dynamic password verification and cryptographic digital signature generation and verification.

PSD server 1212 also contains ZIP+4 ZIP code information. The ZIP+4 information on PSD server 1212 is constantly updated and modified to keep current with postal changes.

Figure 14:
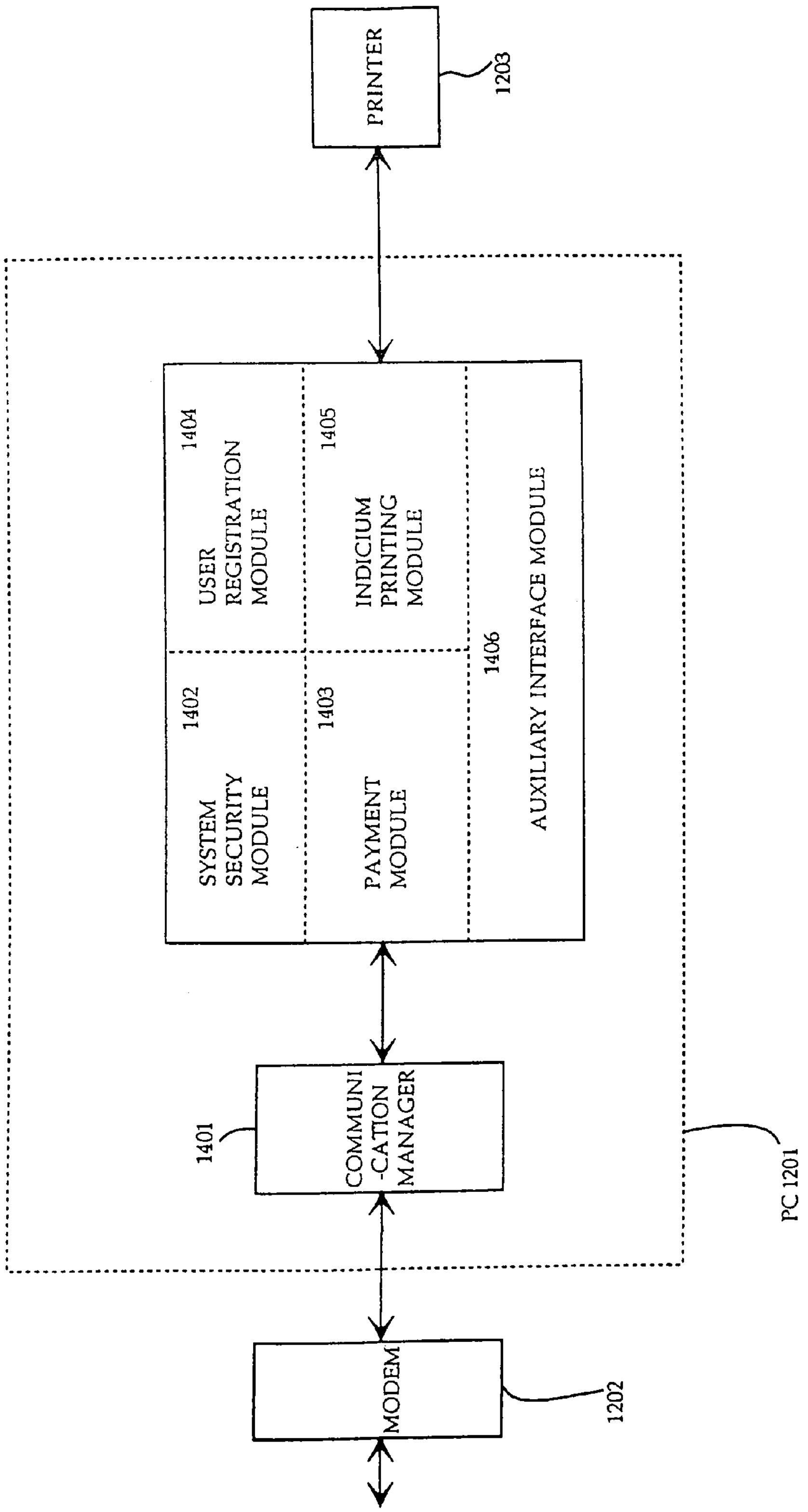
FIG. 14 shows user system PC 1201 of FIG. 12 in greater detail in one embodiment of the invention.

FIG. 14 shows user system PC 1201 of FIG. 12 in greater detail in one embodiment of the invention. As shown in FIG. 14, PC 1201 comprises communication manager 1401, system security module 1402, payment module 1403, user registration module 1404, indicium printing module 1405, and auxiliary interface module 1406.

User registration module 1404 comprises a user license module and a telephone number verification module. Payment module 1403 may provide prepayment options, according to which a user can prepay a certain amount of funds that entitles the user to print USPS postage for that prepaid amount. System security module 1402 performs security-related functions such as dynamic password verification and encryption/decryption. Indicium printing module 1405 performs payment validation and bar-code indicia printing, and can disable the print spooler. Auxiliary interface module 1406 comprises postal rate tables, address information, and ZIP+4 or ZIP+4+2+1 data.

Figure 15:
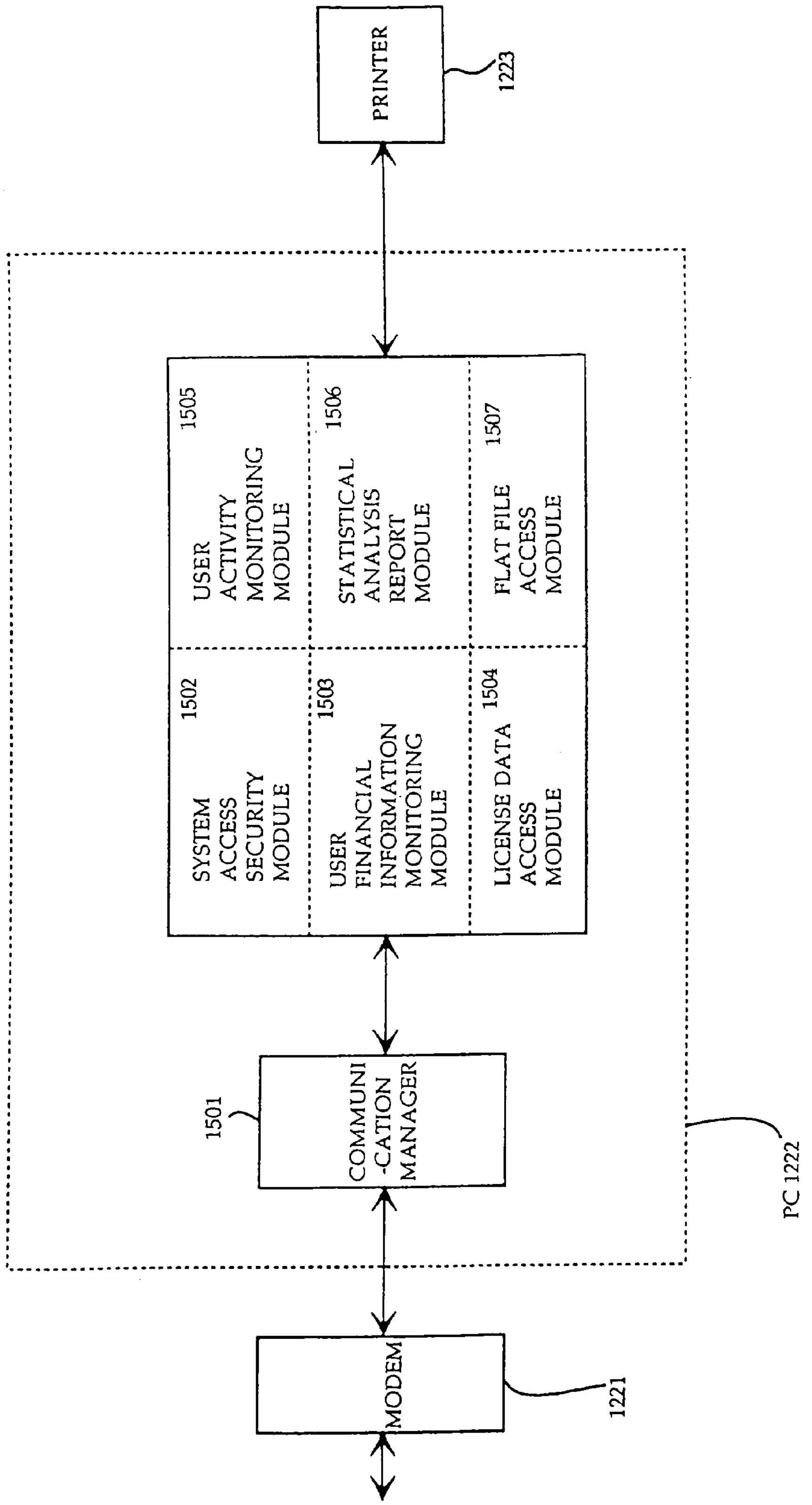
FIG. 15 shows USPS PC 1222 of FIG. 12 in greater detail in one embodiment of the invention.

FIG. 15 shows USPS PC 1222 of FIG. 12 in greater detail in one embodiment of the invention. As shown in FIG. 15, PC 1222 comprises communication manager 1501, system access security module 1502, user financial information monitoring module 1503, license data access module 1504, user activity monitoring module 1505, statistical analysis report module 1506, and flat file access module 1507. Flat files are used for data transfer between USPS 1220 and vendor system 1210, and include the following: License application, license notification, license update, and meter activity and update files.

In one embodiment of the invention, authorized USPS personnel have real-time, on-demand access to customer usage and accounting data in the vendor database system 1213 through USPS system 1220 to allow them to monitor user activities and prevent fraudulent usage. For example, random checking can be performed by USPS personnel to determine whether particular postage is being used repeatedly by checking a unique postage number against a store of all previously issued numbers maintained on the vendor database system 1213.

One possible source of fraud is the user printer 1203, which is responsible for placing the postage indicia on an envelope or a label or any other desired medium. It is possible to capture an indicium print file (that contains image information for printing a postal indicia) and store it for later reuse by the user while the print image is in the print queue of the user's computer. To prevent such possibility, one embodiment of the invention disables the print spooler and does not allow print jobs to line up in a print queue. Because print jobs cannot queue up and because printing must take place on-line, PSD vendor system 1210 can closely monitor actual printing carried out by the user system 1200. In one embodiment of the invention, print spooler disabling is accomplished by setting (or resetting) an appropriate control bit in a user application (print) program installed in PC 1201. The user is prevented from changing the control bit setting to enable the print spooler without PSD vendor system 1210 knowing it.

Figure 16:
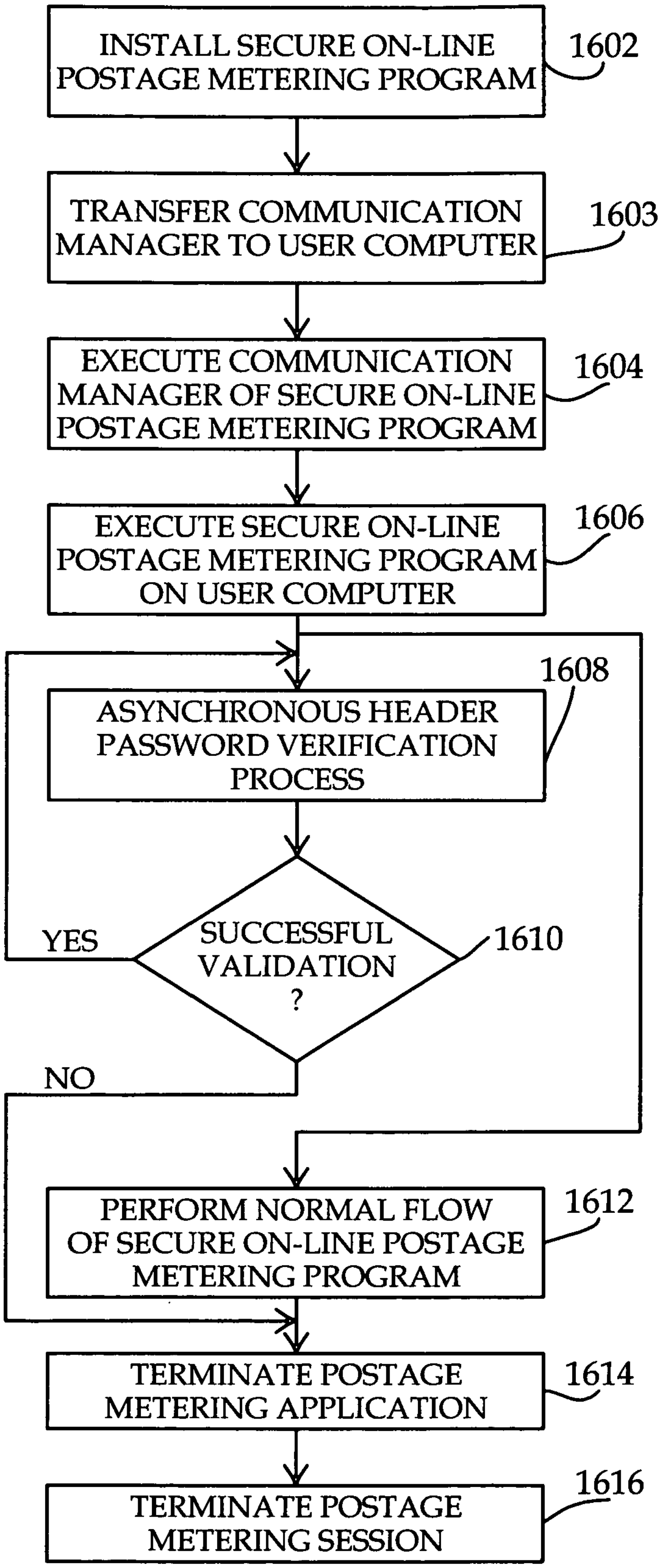
FIG. 16 is a flowchart illustrating the secure on-line postage metering process in one embodiment of the invention.

FIG. 16 is a flowchart illustrating the secure on-line postage metering process in one embodiment of the invention. Referring to FIG. 16, in step 1602, the user code (header code) of a secure on-line postage metering program is installed in user system PC 1201. In one embodiment, the on-line postage metering program can be downloaded from vendor system 1210's World Wide Web (www) page or uploaded from a diskette or a CD-ROM.

In one embodiment of the invention, each copy of the secure on-line postage metering program contains an embedded ID code that is associated to each user computer to prevent the program from being stolen or used on another PC. During the installation process, the PSD server 1212 notes the unique embedded code for a particular copy of the secure on-line postage metering program and saves the number as part of the user's account profile. If a secure on-line postage metering program installed on a PC is copied to another PC, reinstalled, and communications are initiated with the PSD server PSD vendor system 1210 will recognize the program as a unit that is already associated with an existing account and thus recognize that a fraud is being attempted. Any such attempts are rejected by PSD server 1212.

Once the user code (header code) of the secure on-line postage metering program is installed, most of the tools required to purchase and print postage indicia are resident on PC 1201. However, these tools are not usable until the user (represented by user system 1200) is connected on-line with PSD vendor system 1210. While user system 1200 maintains an on-line connection with PSD vendor system 1210, PSD vendor system 1210 closely monitors the user's use of the tools.

The tools on PC 1201 are not immediately usable after installation because the user code is logically "incomplete" and unable to trigger the opening of the secure on-line postage metering application program. Thus, although the code that runs most secure on-line postage metering functions is resident on user PC 1201, it remains inoperable because it is not logically "complete." To activate the on-line postage metering program, the missing portion of the code must be completed by establishing an authorized on-line connection with PSD vendor system 1210 and by receiving the missing portion from PSD vendor system 1210. If the user attempts to execute the secure on-line postage metering program without first establishing an authorized connection with PSD vendor system 1210, the user PC 1201 will respond with an error message indicating that the user has not established an authorized connection, and that the secure on-line postage metering program cannot be executed until such a connection is established.

In step 1603, communication manager 1401 is transferred from PSD vendor system 1210 to user PC 1201. In step 1604, communication manager 1401 of PC 1201 is executed. In step 1606, the secure on-line postage metering program is executed on user PC 1201. In step 1608, an asynchronous header password verification process is executed in parallel with the normal flow of secure on-line postage metering application of step 1612. This process verifies that a continuous link in maintained between the user system 1200 and PSD vendor system 1210.

In decision block 1610, a determination is made as to whether the password verification is successful. When decision block 1610 returns true (yes), execution continues at step 1608. When decision block 1610 returns false (no), execution continues at step 1614. In step 1614, the secure on-line postage metering application is terminated. In step 1616, the secure on-line postage metering session is terminated.

The asynchronous header password verification process of step 1608 is similar to the process discussed above referring to FIGS. 10A-10D. The password verification process is asynchronous, and is independent of the rest of the on-line postage metering program and transparent to the user. Once a communication link is established between user system 1200 and PSD vendor system 1210, user system 1200 and PSD vendor system 1210 "talk" periodically using passwords. This periodical "talk" is referred to as authentication, by which PSD vendor system 1210 allows user system 1210 to stay on-line and communicate with PSD vendor system 1210. Each time a new authentication process begins for on-line postage metering, a new password is generated based on a new set of inputs.

In this particular application, a password is generated from inputs of a user license serial number, a mail delivery ZIP code, a user system time (from the internal clock of PC 1201), and a postage value. At no two moments are these inputs the same. For example, time of day, in this embodiment, is constantly changing and is practically unpredictable to the user. The inputs that were used by PC 1201 to generate the password are then sent to PSD server 1212 which uses the same matching algorithm to generate its own password. The PSD server 1212 then sends the server-generated password to user PC 1201. PC 1201 then compares the server-generated password with the password generated earlier by PC 1201. If the two passwords are the same, the connection is authenticated and the user is allowed to continue. Otherwise, the connection between user PC 1201 and PSD vendor system 1210 is terminated as in step 1614.

The asynchronous header password verification process is an effective tool to prevent unauthorized postal indicia printing by the user. Suppose a user attempts to alter the amount of postage in an effort to receive more postage value than paid for. Such an attempt would change the postage value, which in turn would change the password generated from user system 1200. The changed password would then fail the test of step 1610 since it would not match the password generated from PSD vendor system 1210, which uses the original, untampered postage value to generate the password.

The asynchronous dynamic password verification method also prevents attempts to intercept the communication between user system 1200 and PSD vendor system 1210 by outsiders since the communication is carried out in encrypted form. Even if an outsider successfully decodes the encryption, the outsider would not be able to maintain a link to PSD vendor system 1210 because the outsider would not have the necessary information to generate proper passwords such as password generation algorithm, user license number, or embedded user PC code.

Figure 17:
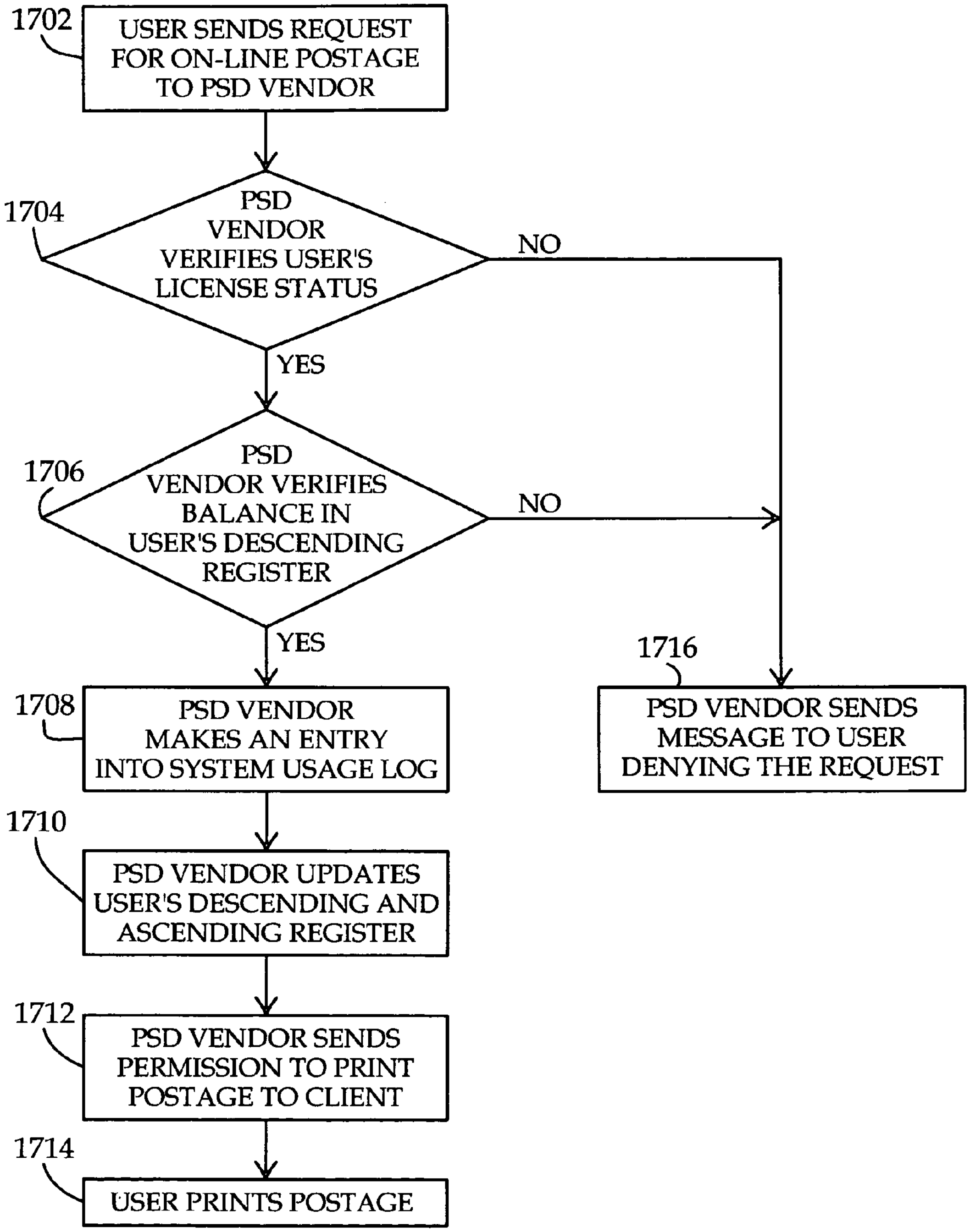
FIG. 17 is a flowchart illustrating the normal flow of the secure on-line postage metering process shown in step 1612 of FIG. 16 in greater detail.

FIG. 17 is a flow chart illustrating the normal flow of the secure on-line postage metering process shown in step 1612 in greater detail. In step 1702, user PC 1201 sends a request for on-line postage metering service using PC 1201 to PSD vendor system 1210. The request contains the user license number and a desired amount of postage. In step 1704, PSD server 1212 verifies the user's license status. If the user's license is valid and current, the process proceeds to step 1706 where PSD server 1212 checks the balance in the user's descending register to verify that sufficient funds are in the user's account to cover the requested amount of postage. If the user's license is not valid or expired, PSD server 1212 sends a message to the user system 1200, denying the user's request in step 1716. Likewise, if there are not sufficient funds left in the user's account for the requested amount of postage, PSD server 1212 sends a message to user system 1200, denying the user's request in step 1716.

If there are sufficient funds left in the user's account for the requested amount of postage in step 1706, PSD server 1212 makes an entry in its system usage log, reflecting the current request, in step 1708. In step 1710, PSD server 1212 decreases the value of the user's descending register and increases the value of the user's ascending register by the purchased amount of postage. Indicium print/authentication/monitoring module 1307 authenticates the request and generates image information for printing a postal indicium for the purchased amount so that PSD server 1212 can send a permission or authorization message and the image information to user system 1200 in step 1712. Upon receiving permission or authorization and image information from PSD server 1212, the user PC 1201 proceeds to step 1714 and sends the image information to the user printer 1203. The user printer 1203 prints an image on an envelope, a label, or other desired medium. Indicium print/authentication/monitoring module 1307 of PSD server 1212 monitors the actual printing on user printer 1203.

Figure 19:
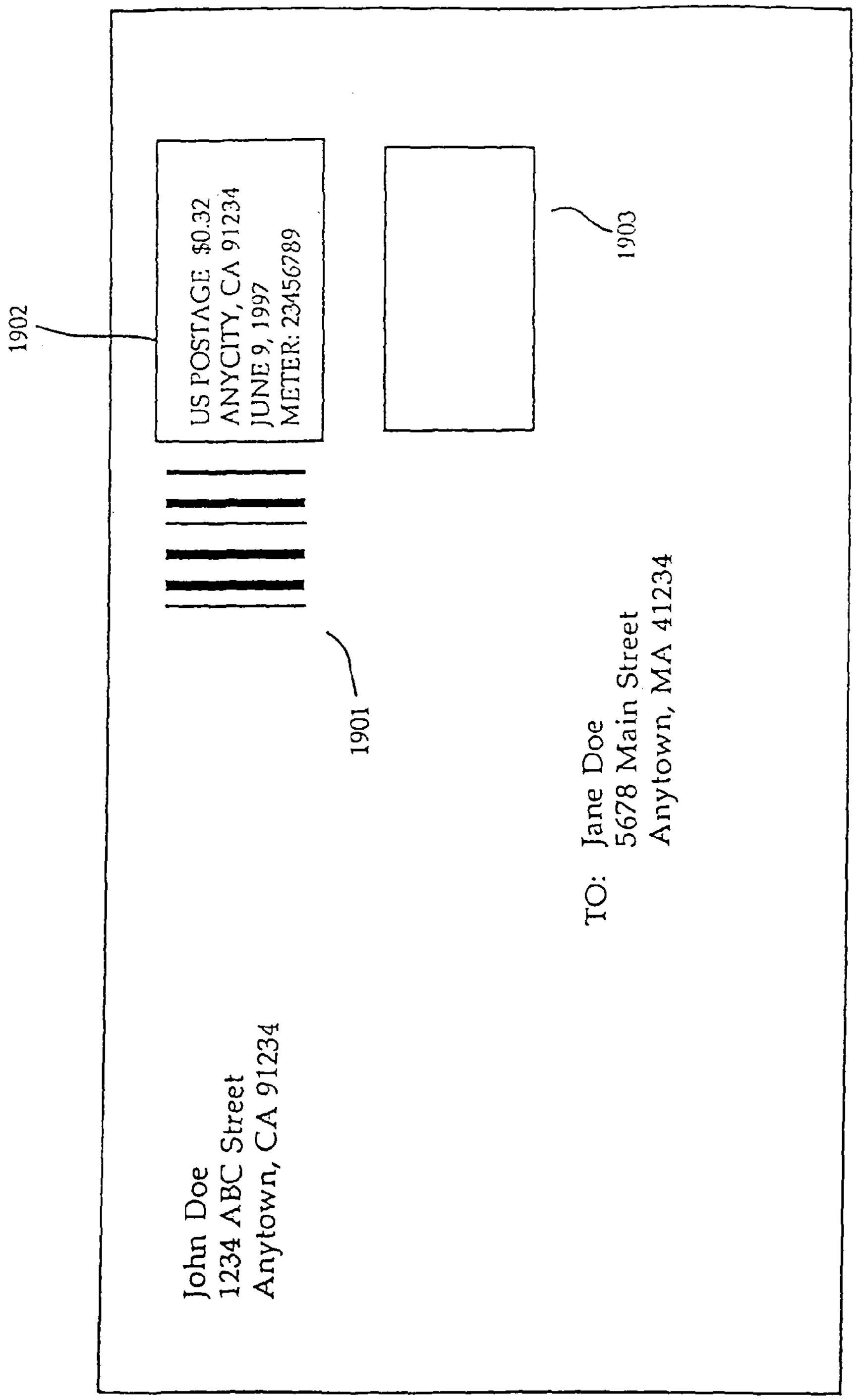
FIG. 19 shows an example of a postal indicium printed on an envelope according to the invention.

In one embodiment of the invention, the postage printed appears as a two-dimensional bar-code, along with certain human-readable information. In addition, in one embodiment, the on-line postage metering software of the invention accesses USPS ZIP+4 ZIP code information stored on server 1212 and relays barcoding information to PC 1201 at the time that postage is printed, to allow a complete delivery point bar-code to be printed. FIG. 19 shows an example of a postal indicium printed on an envelope by the user printer 1203 according to the invention. As can be seen in FIG. 19, the user printer 1203 has printed scanner code 1901, postage information 1902, and two-dimensional bar-code postal indicium 1903 on an envelope. Two-dimensional bar-code postal indicium 1903 is represented as a blank box in FIG. 19. (A two-dimensional bar-code will appear in place of blank box 1903 in actual printing.)

The scanner code 1901 is required by USPS for optical scanning. As can be seen in FIG. 19, postage information 1902 includes an amount of postage, a date of mailing, the location of a processing postal office, and a meter number. The meter number may be uniquely assigned to the on-line postage metering software in addition to the embedded software ID code to allow a human readability in one embodiment of the invention. Since the unique embedded software code associates the on-line postage metering software with a specific user computer, the meter number or embedded software ID code can be used to uniquely identify the on-line postage metering software and the user PC on which it is resident.

Two-dimensional bar-code 1903 represents a postal indicium and includes a signature algorithm flag, device ID/type, a user license ID number, a date of mailing, an amount of postage, a licensing ZIP code, a special purpose ID number, on-line metering software ID number, the value of an ascending register, the value of a descending register, a digital signature, PSD X.509 certificate, a rate category, and a reserve field. The special purpose ID may be used to prevent the meter fraud due to repeated usage.

In this embodiment, images of two-dimensional bar-code 1903 are generated by indicium print/authentication/monitoring module 1307 of PSD server 1212 and sent to the user PC 1201. The user is prevented from altering the image of the two-dimensional bar-code received from PSD server 1212. If the user attempts to alter information on the bar-code received from PSD server 1212 such as the mail delivery ZIP code or the postage value, such attempt will cause the asynchronous header password verification to fail and cause the on-line postage metering session to terminate immediately as was described above with respect to step 1608.

The user may also attempt to meter an envelope with a postal indicium purchased for one destination and address the envelope to another destination (with a different ZIP+4 code). In this case, the mail scanner (with bar-code reader) can easily detect and sort out such a mail piece because the delivery point information (e.g., ZIP code), on the envelope would not match that on the postal indicium.

Figure 18:
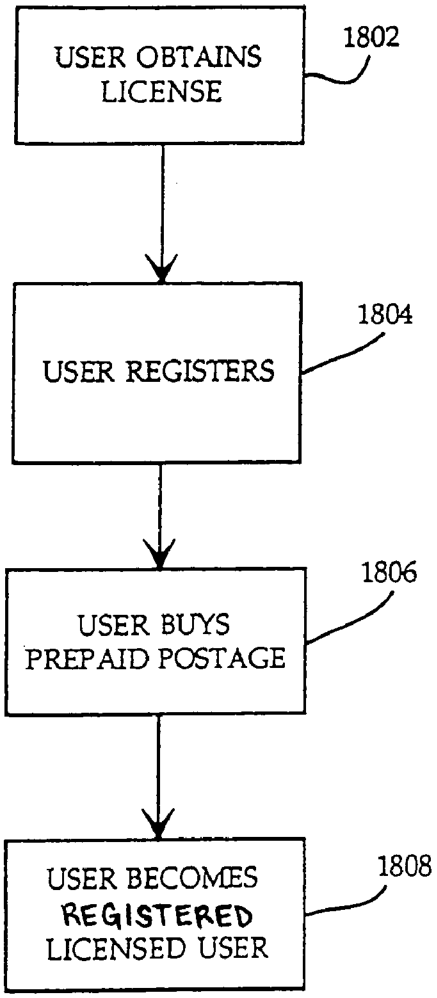
FIG. 18 is a flowchart describing a user registration process in one embodiment of the invention.

FIG. 18 is a flowchart describing a user registration process in one embodiment of the invention. Before a user can use the secure on-line metering system, the user needs to obtain a license from the USPS. In step 1802, the user obtains a license from an authorized issuer. For example, a local post office can get authorized by the USPS to issue licenses to on-line postage metering system users. In another embodiment of the invention, a license applicant is required to submit an electronic license application containing the user's biographical information (e.g., birth date) and financial information (e.g., banking institutions and credit card numbers) to PSD vendor system 1210. USPS interface module 1312 in PSD vendor system 1210 then forwards the electronic application to USPS system 1220 for approval/rejection. When the license application is approved, user licensing module 1303 generates a license number for the user and adds the user license number to the licensee list in the database system 1213.

When a licensed user first registers for on-line postage metering service in step 1804, the ascending and descending registers in PSD vendor database system 1213 are established for that particular user to read $0.00, indicating there are no funds available to print postage. Upon a user's registration, user registration module 1308 updates the database system 1213 to reflect the new registration. In step 1806, the user prepays for a certain amount of postage to the USPS using a suitable payment method, and becomes a registered, licensed user in step 1808. Suitable payment methods may include debit cards, credit cards, electronic fund transfers or personal checks.

Once a user has submitted a payment, an amount equal to the user's payment is deposited in the user's USPS account and database 1213 on PSD vendor system 1210 is updated to reflect the new payment in the user's account. In one embodiment of the invention, a user is allowed to access and download the user's account balance and statement from PSD vendor system 1210. However, no user is allowed to modify the user's account information in database 1213. At this point, PSD server 1212 increases the value in the user's descending register by the amount of postage purchased. Once a user becomes a registered, licensed user, the user can install and use the on-line postage metering system to print postal indicia on envelopes, labels or other desired media for up to the prepaid or otherwise authorized amount.

Thus, one embodiment of the invention applicable for electronic postage metering has been described. In alternate embodiments, the invention can be used for other secure on-line printing applications. For example, the secure on-line printing system can have a server generate images of checks, tickets, coupons or certificates and transmit them to a user computer for printing on a user printer. Therefore, the invention can be applied to print symbols other than postal indicia in a secure, authenticated manner.

One embodiment of the present invention modifies application software by integrating header software with application software. The combined header and application software are the rental application software. The header software is an integral element of the secure rental software system. The header software operates transparently so that the user provides normal input/output operations to the application software without change. When an unauthorized usage of the application software occurs, a message notifies the user that the application software is terminating, and the application software terminates.

Another embodiment of the current invention uses the Internet as means of communication between the client and the server system.

1. On-line Postage System Architecture

The on-line postage system of the invention is based on a client/server architecture. The on-line postage system software in one embodiment of the invention is executed on a personal computer (herein sometimes referred to as client system or client). An associated enabling software is executed concurrently on a second system of computers herein referred to as server or server system.

In one embodiment, the server system is remotely located in a separate location from the client. All communication between the client and the server is accomplished via the Internet. FIG. 20 is a diagram illustrating a remote client system 150 connected to a server system 180 via the Internet 136A.

a) Hardware Architecture

FIGS. 20, 21, and 22 illustrate the various hardware components of a client system in one or more embodiments of the invention.

Figure 23:
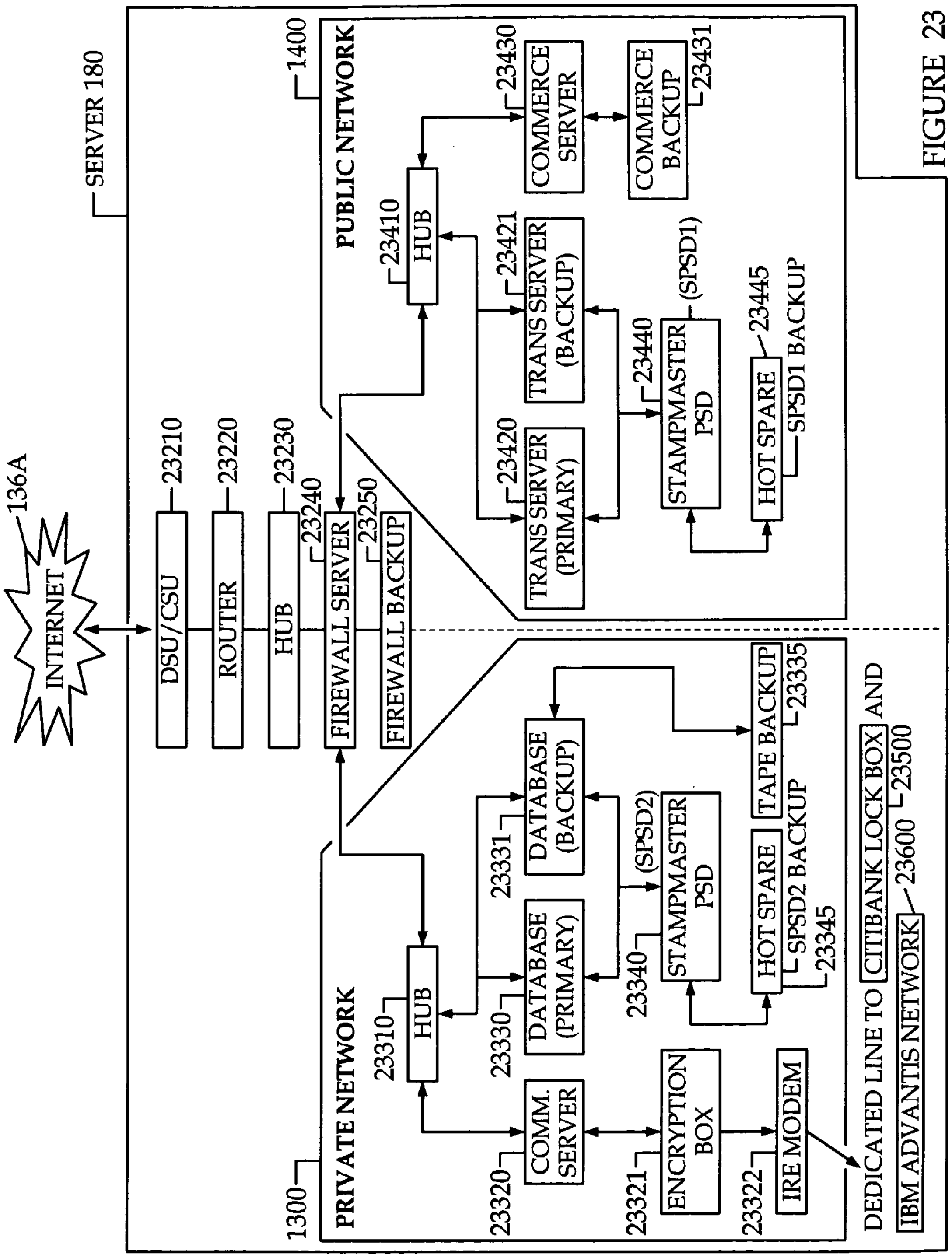
FIG. 23 is an illustration of the hardware components of a server system.

FIG. 23 is a diagram illustrating an embodiment of server system 180 comprising a number of sub-servers each dedicated to perform independent functions. In one embodiment server system 180 is connected to the Internet 136A utilizing a dedicated telephone line (T1 line) for communication with one or more client systems 150 and the USPS system 1220.

An embodiment of server system 180 comprises an industry standard network connection hardware DSU/CSU 23210, a router 23220, a hub 23230, a firewall server 23240, a firewall backup 23250, a private network 1300, and a public network 1400.

A signal coming from the Internet to server system 180 passes through DSU/CSU 1210 network connection hardware, router 23220 and then through hub 23230 before entering firewall server 23240. The primary purpose of firewall server 23240 is to prevent any unauthorized access by an intruder to server system 180. Backup firewall server 23250 becomes operational in the event of a failure of the primary firewall server 23240.

In one embodiment, private network 1300 and public network 1400 are two independent subsystems within server system 180 connected to the firewall server 23240. The double layer architecture of server system 180 prevents unauthorized access to sensitive information stored in server system 180.

In one embodiment, public network 1400 includes a number of servers that are connected via a hub. In an embodiment of the invention public network 1400 is comprised of a hub 23410, a primary transaction server 23420, a backup transaction server 23421, a primary commerce server 23430, a backup commerce server 23431, a first primary cryptographic device identified as First StampMaster™ Postal Security Device (hereinafter PSD1) 23440, and a first backup StampMaster™ Postal Security Device 23445, (hereinafter PSD1 backup) for PSD1 23440.

In one embodiment of the invention, primary transaction server 23420, backup transaction server 23421, and primary commerce server 23430 are connected to one another and to firewall server 23240 through hub 23410, and constitute the back bone of public network 1400. PSD1 23440 by which all the cryptographic computation is performed is connected to transaction server 23420 and backup transaction server 23421. First backup cryptographic device 23445 is available to take the place of PSD1 in the event of any failure.

Information packets entering server system 180 through an established Internet connection 136A, in one embodiment, enter public network 1400 only after proper authentication by firewall 23240. Such information packets do not enter private network 1300. Communications to private network 1300 are allowed only from transaction server 23420 to ensure the integrity of the system against potential intruders.

Private network 1300 includes a number of servers connected via a hub. In one embodiment of the current invention private network 1300 is comprised of a hub 23310, a communication server 23320, a primary database server 23330, a backup database server 23331, a second primary cryptographic device identified as Second StampMaster™ Postal Security Device (hereinafter PSD2) 23340, a second backup StampMaster™ Postal Security Device (hereinafter PSD2 backup) 23345, a tape backup 23335, an encryption box 23321, and an IRE modem 23322.

In one embodiment, communication server 23320, primary database server 23330 and backup database server 23331 are connected to one another and to firewall server 23240 through hub 23310, and constitute the back bone of private network 1300. PSD2 23340 is connected to primary database server 23330 and backup database server 23331 within which all user information and other sensitive data for processing of system requests are stored. Backup cryptographic device 23345 is available to take the place of PSD2 23340 in the event of any failure.

In an embodiment of the invention communication server 23320 is connected to encryption box 23321 which in turn is connected to IRE modem 23322. IRE modem 23322 is connected via a dedicated line to Citibank Lock Box 23500 and IBM Advantis Network 23600. Communication line communication server 23320 may send and receive data to and from Citibank Lock Box System 23500, and IBM Advantis Network 23600. IBM Advantis Network 23600 is utilized to deliver and process user license information communicated between server system 180 and the USPS central meter licensing system (CMLS). Citibank Lock Box System 23500 is utilized to manage and process user financial information such as bank account and fund transfer related information for USPS.

In one embodiment a tape backup 23335 is connected to backup database server 23331 to periodically obtain a complete or partial copy of the content of backup database server 23331.

b) Software Architecture (1) Functional Architecture

Figure 24:
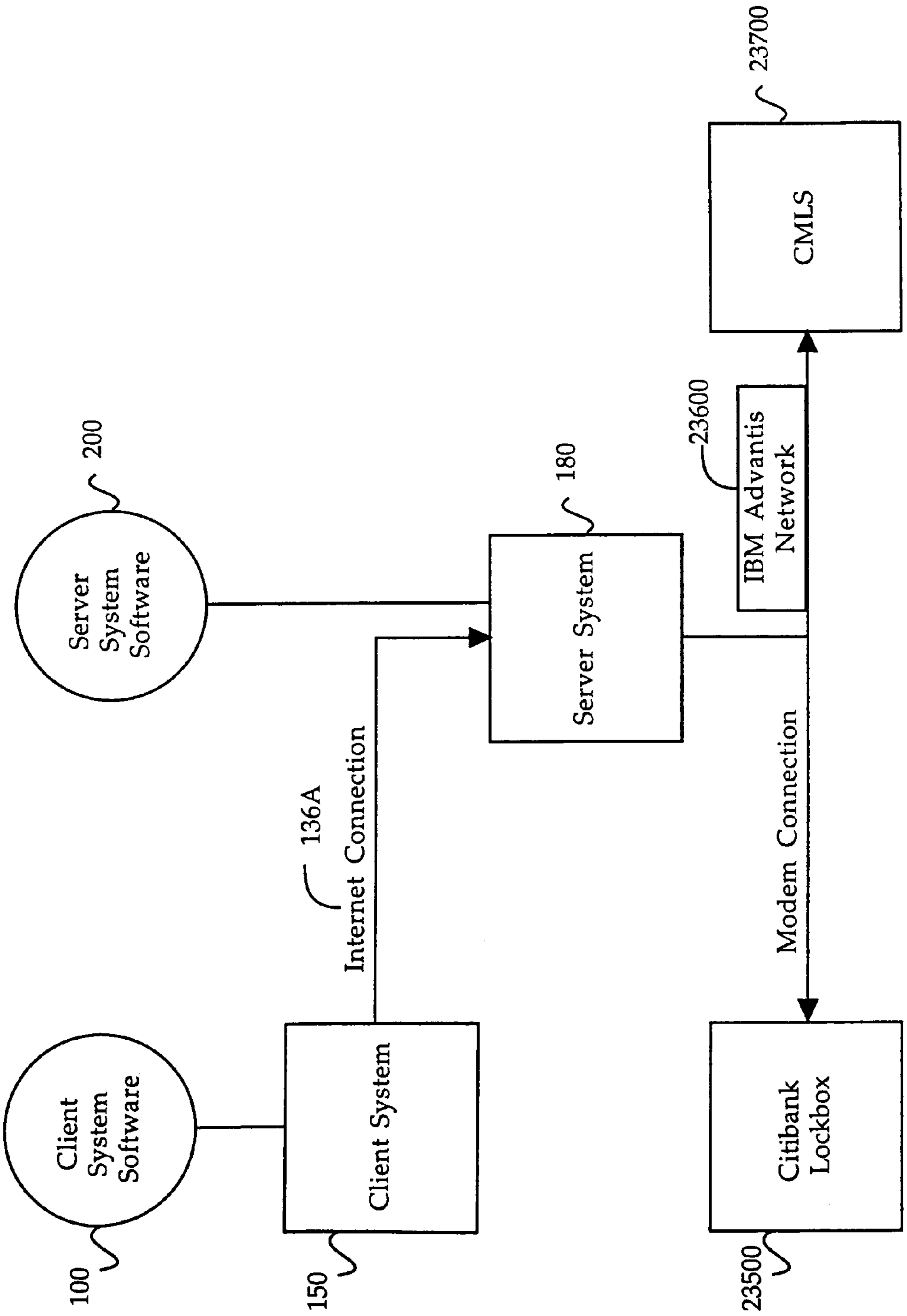
FIG. 24 is an illustration of the functional architecture of one embodiment of the on-line postage system.

FIG. 24 is a diagram illustrating an embodiment of the on-line postage system software's functional architecture. It includes the following components: client system software 100, server system software 200, client system 150, server system 180, Citibank lock box 23500, IBM Advantis Network 23600, and CMLS 23700.

The client system software 100 operates on client system 150. Server system software 200 operates on server system 180. Concurrent operation of both software is a requirement for client system software 100 to operate properly on client 150.

Server system software 200 manages all requests from one or more clients. Such requests pertain, for example, to functions relating to database access management, interfacing with the USPS Central Meter Licensing System (CMLS), interfacing with the USPS Central Meter Resetting System (CMRS), interfacing with Citibank Lock Box 23500, and address and payment validation.

Server system software 200 transports relevant information to Citibank lock box 23500, IBM Advantis Network 23600 and thereby to CMLS 23700 to allow the proper processing of users' licensing and financial information by USPS.

(2) Functional Modules

Figure 25A:
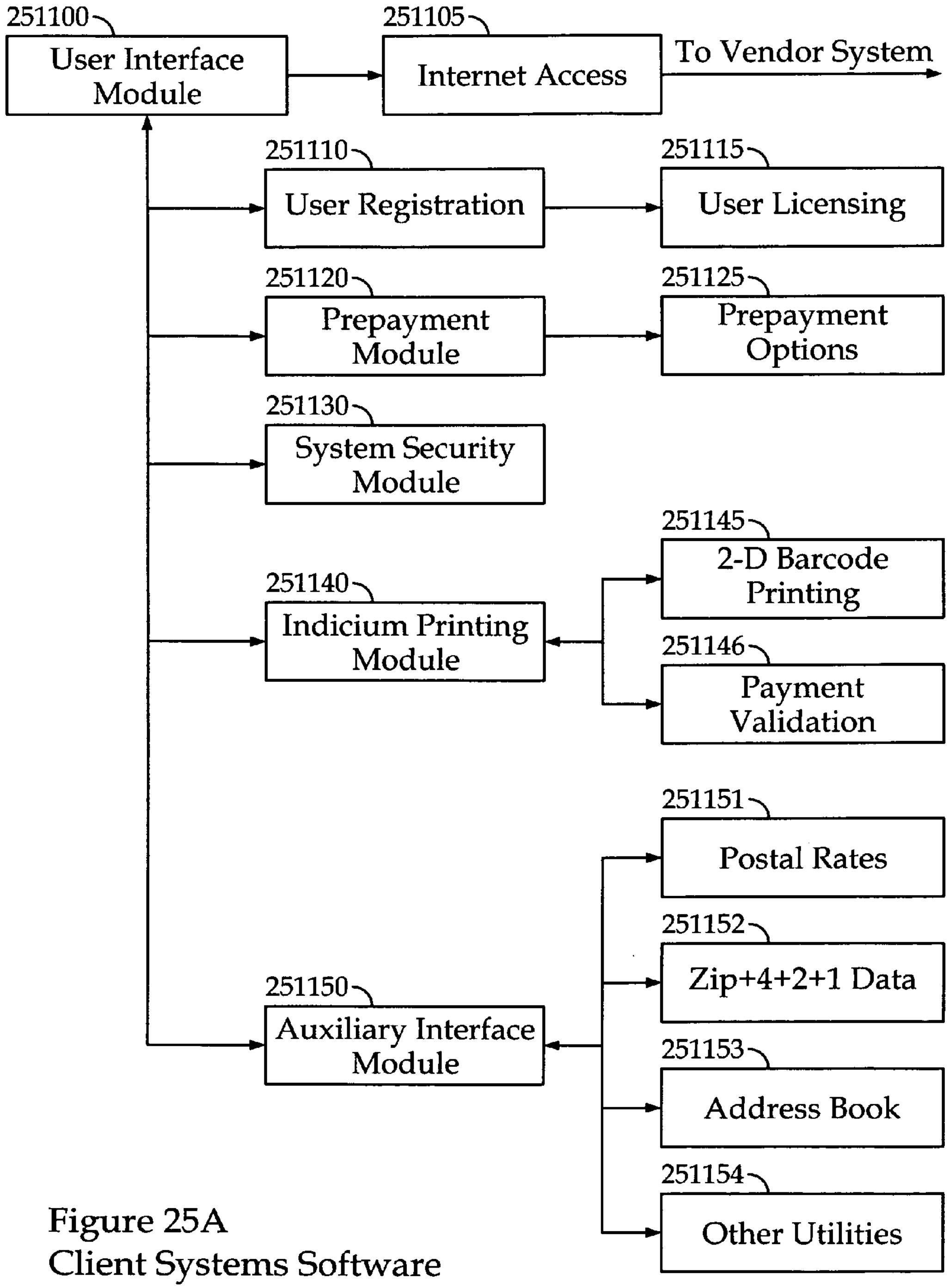
FIGS. 25A-25C are block diagrams illustrating the functions of a client system software, server system software, an administrator system software, and their functional interrelationships, in one embodiment.
Figure 25B:
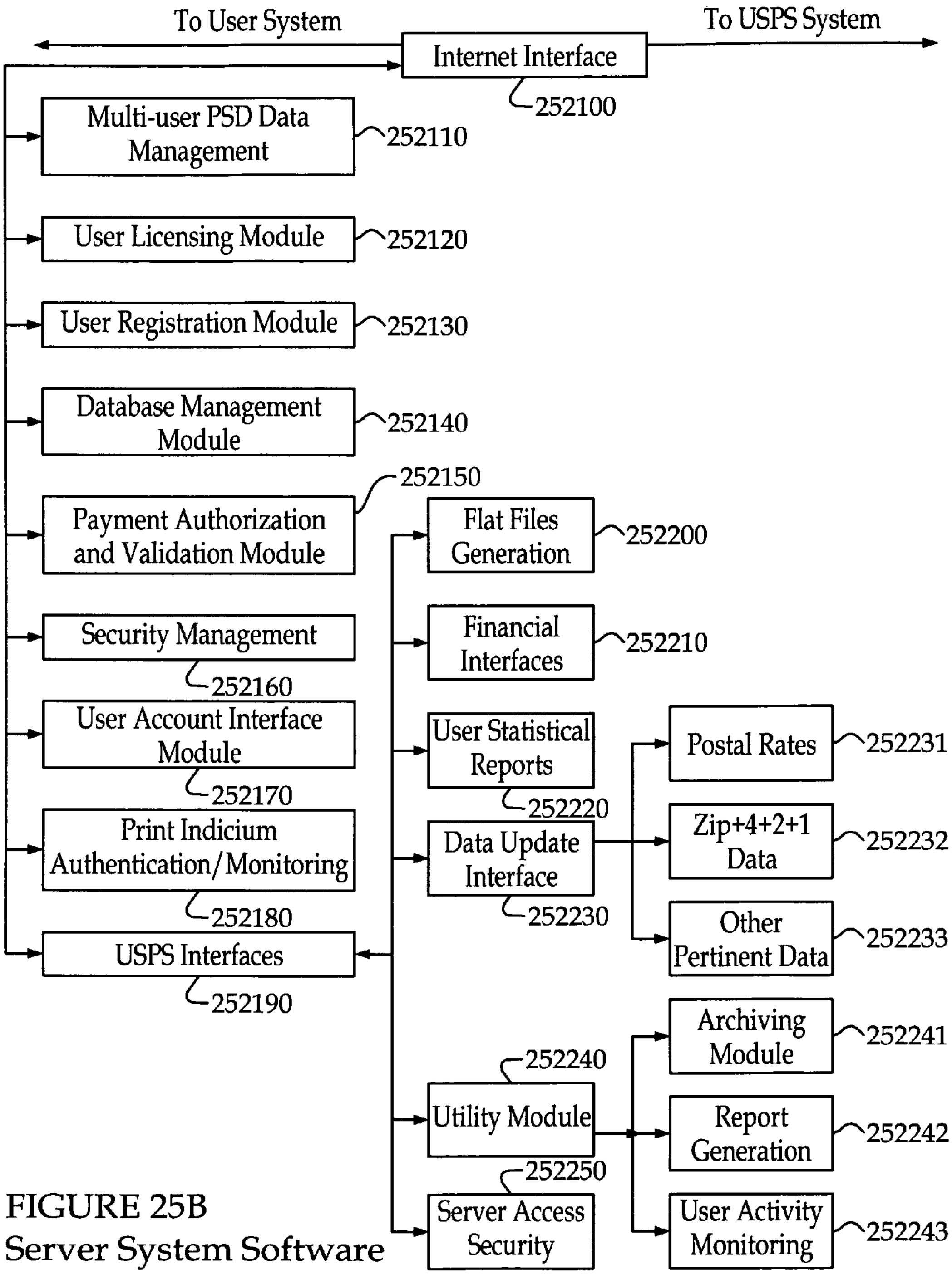
Figure 25C:
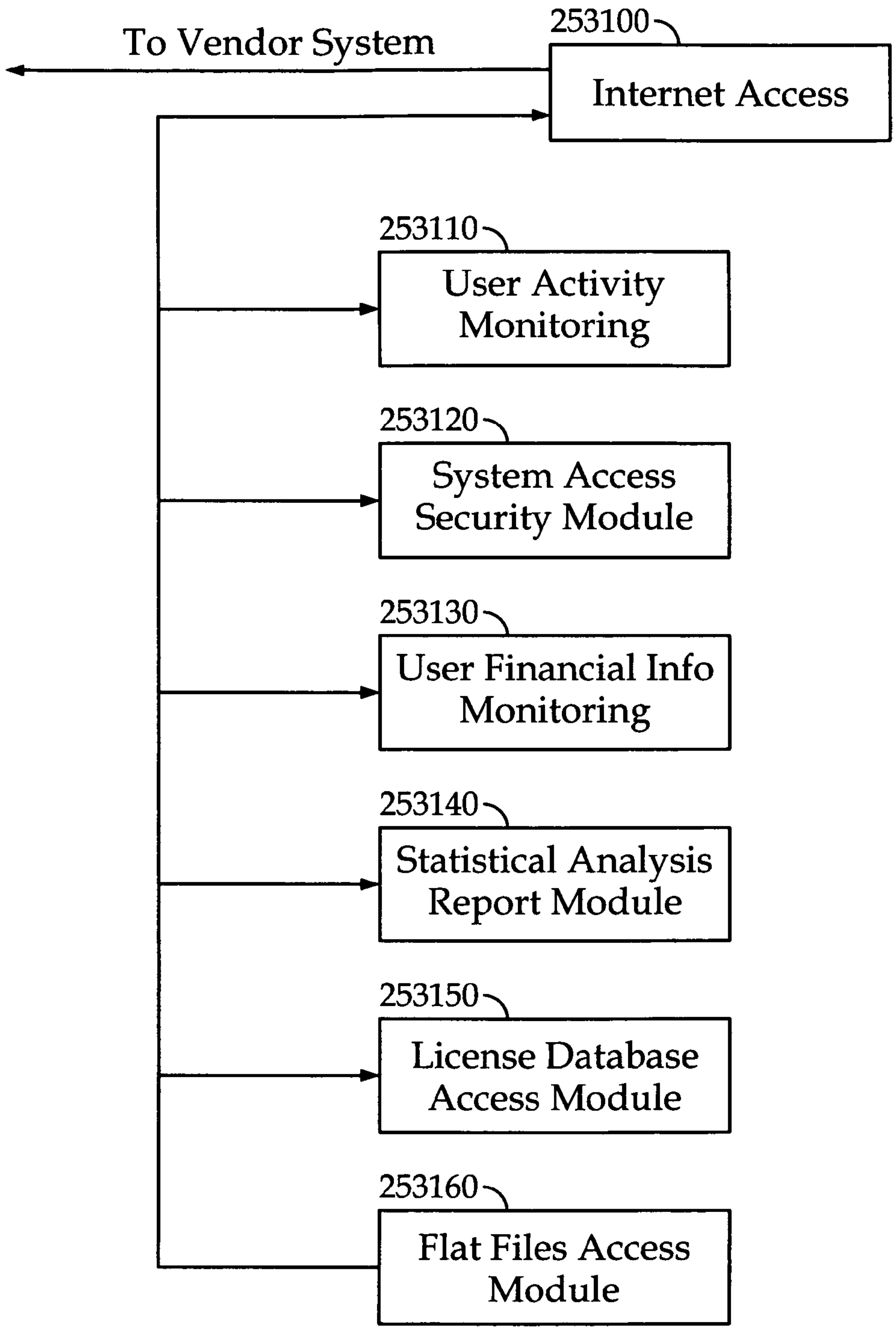

FIGS. 25A through 25C are diagrams of an embodiment of the current invention illustrating the functional modules in the system software and their inter-relationships. FIG. 25A depicts the functional modules included in client system software 100; FIG. 25B depicts the functional modules included in server system software 200; and FIG. 25C depicts the functional modules included in administrator software 300.

Client system software 100, server system software 200, and administrator system software are in communication with one another via a communication medium, such as the Internet 136A. Server system software 200 communicates with both client system software 100 and administrator system software through the Internet access interface module 252100. Client system software 100 exchanges relevant information with server system software 200 through the Internet access module 251105. Administrator system software exchanges pertinent information with server system software 200 through its Internet access module 253100.

(a) Client System Software

FIG. 25A is a diagram of one embodiment of the current invention depicting the functional modules of the client system software 100 of one embodiment of the invention. Client system software 100 contains a user interface module 251100 which works in conjunction with one or more of the following functions or modules: Internet access module 251105, user registration module 251110, prepayment module 251120, system security module 251130, indicium printing module 251140, and auxiliary interface module 251150.

Internet access module 251105 prohibits the complete execution of client system software 100, unless proper communication is established between client system 150 and server system 180.

User registration module requests from the user to select a login name and a password by which the user registers and obtains a unique identification number, referred to as a customer ID. The customer ID is used in subsequent communication attempts to identify the user and to process user requests.

User licensing module 251115 provides the user with options to apply for a new meter license, update an existing meter license, check the meter license status, and print the meter license application form (PS-3601A). The purpose of the user licensing module 251115 is to facilitate the application and granting of the USPS postage meter license to a user.

User prepayment module 251120 provides the user with payment options including but not limited to automatic clearing house (ACH) funds transfer, electronic funds transfer, debit card, and credit card transactional services. The user prepayment module 251120 in turn works in conjunction with prepayment options module 251125 that enables the user to purchase postage by using the most convenient method of payment available to the user and acceptable by the on-line postage system.

System security module 251130 interfaces with the secure sockets layer (SSL) module of the Internet communications protocol developed by Netscape. The SSL module enables client system software 100 to securely communicate with server system software 200 by taking advantage of the built-in encrypting and decrypting capabilities of SSL.

User interface module 251100 works with indicium printing module 251140, which in turn works with 2-D bar-code printing module 251145, and payment validation module 251146 to enable the user to print the cryptographic indicia once the client system receives the approval information generated by server system software 200.

User interface module 251100 works with auxiliary interface module 251150 which in turn works with the postal rates module 251151, ZIP+4+2+1 data module 251152, address book module 251153, and other utilities module 251154 to obtain updated ZIP code and postal rate information from the server system software. Address book module 251153 maintains relevant address information saved locally on a storage medium at client 150 processor system 102. Drag and drop functionality is provided by address book module 251153 enabling users to print the address along with the indicium on an envelope or a label. Other utilities module 251154 provides the user with additional useful utilities.

(b) Server System Software

FIG. 25B is a diagram depicting the functional modules in the server system software 200, in one embodiment of the invention. Server system software 200 contains an Internet interface module 252100 that works in conjunction with one or more of the following functions or modules: multi-user PSD data management module 252110, user licensing module 252120, user registration module 252130, database management module 252140, payment authorization and validation module 252150, security management module 252160, user account interface module 252170, print indicium authentication/monitoring module 252180, and USPS Interfaces module 252190.

Server system software 200 operates and executes system functions on the primary transaction server 23420, or alternatively backup transaction server 23421. Certain server system software 200 modules are executed on primary and backup database servers 23330 and 23331.

In one embodiment of current invention, server system software 200 interacts with other components of the system to both provide and obtain information necessary for the proper operation of the on-line postage system. Server system software 200 obtains or provides said information through server 180's connection to the Internet or other suitable communication media.

Internet interface module 252100 channels the information managed by server system software 200 to the Internet and among the resident modules of server system software 200.

Multi-user PSD data management module 252110 works in conjunction with cryptographic devices 23340 or 23440 (also referred to as StampMaster PSD) responsible for generating all the cryptographically protected data printed as a part of the postage indicia.

User licensing module 252120 and user registration module 252130 receive, process, transport and otherwise manage information necessary for proper registration of users with the on-line postage system and facilitate submission and granting of USPS postage licenses for registered users.

Database management module 252140 stores and retrieves all user related data. Database management module 252140 interfaces with both transaction server 23420 and the database server 23330 to perform the aforementioned operations.

Payment authorization and validation module 252150 verifies a user's available funds.

Security management module 252160 interfaces with the secure sockets layer (SSL) protocol to establish secured communication between server system 180 and the client 150. The SSL protocol secures all communications between client 150 and server system 180 through encryption methods imbedded therein.

User account interface module 252170 interfaces with database server 23330, retrieves user account information and makes it available to the user upon request.

Print indicium authentication/monitoring module 252180 interfaces with the cryptographic device and authenticates the indicium print request from client 150 and also verifies the proper communication of relevant cryptographic data to client 150.

USPS interfaces module 252190 manages all communication interfaces between server system 180 and the various USPS systems. The USPS interfaces module 252190 interfaces with flat files generation module 252200, financial interfaces module 252220, user statistical reports module 252230, utility module 252240, and server access security module 252250.

Flat files generation module 252200 generates the various data files that are periodically sent to both CMRS and CMLS 23700.

Financial interfaces module 252210 facilitates the data exchange between server system 180 and Citibank Lock Box 23500 at which the USPS lock box account is maintained. Such data exchange includes transfer of information pertaining to the amount of purchase, purchase option selected, and electronic processing and transfer of funds from a user account to the Citibank USPS lock box account.

User statistical reports module 252220 generates information and reports pertaining to the manner of use of the on-line postage system and resources thereof by the users.

Data update interface module 252230 works in conjunction with postal rates module 252231, ZIP+4+2+1 data module 252232, and "other pertinent data module" 252233.

Postal rates module 252231 computes the appropriate and accurate postal rate for the service selected by the user. A postal rate table is maintained by the postal rate module 252231 that is updated to be concurrent with any postal rate changes implemented by the USPS.

ZIP+4+2+1 data module 252232 interfaces with a USPS generated ZIP code database that contains all addresses with their valid corresponding ZIP codes. To obtain print authorization, a user enters the mailing address and the weight of the mail piece. ZIP+4+2+1 data module 252232 validates all mailing addresses by comparing them with a valid ZIP code contained in the ZIP code database. Any detected differences will be corrected based on the information contained in the ZIP code data base. The USPS generated ZIP code database is updated periodically for the most recent ZIP code information available.

"Other pertinent data module" 252233 contains other relevant information that is necessary to effectively service the users of the on-line postage system.

Utility module 252240 works in conjunction with archiving module 252241, report generation module 252242, and user activity monitoring module 252243.

Archiving module 252241 archives relevant data from the resident database structures on database server 23330 for long term storage.

Report generation module 252242 generates reports relating to various transactions and operations performed by the on-line postage system.

User activity monitoring module 252243 summarizes and monitors user activities in real time.

Server system access security module 252250 manages and limits access to the server.

(c) Administrator System Software

FIG. 25C is a diagram of the functional modules in the administrator system software of one embodiment of the invention. Administrator system software contains an Internet access module 253100 that works in conjunction with one or more of the following functions or modules: user activity monitoring module 253110, system access security module 253120, user financial information monitoring module 253130, statistical analysis module 253140, license database access module 253150, and flat files access module 253160.

Administrator system software is used by the on-line postage system administrator, who is the person responsible for upkeep and proper operation of the system. Internet access module 253110 provides for proper interaction between administrator system software and server system software 200 through a communication medium, for example, the Internet.

User activity monitoring module 253110 monitors the transactional activities of users.

System access security module 253120 secures communication between administrator software 300 and server system software 200.

User financial information monitoring module 253130 reviews and monitors financial status of the clients.

Statistical analysis report module 253140 performs statistical studies pertaining to on-line postage system transactional activities.

License database access module 253150 reviews the status of postage meter licenses issued by the USPS to registered system users.

Flat files access module 253160 reviews the information contained in flat files generated by server system software 200 for transmission to various USPS systems.

2. Communication Between Client Software and Server Software

In one embodiment, client system software 100 (herein also referred to as client software) is installed on a user's computer 150 from a CDROM or a disc or by downloading directly from a vendor's computer or web site. Communication between client software 100 and server software 200 is established through an Internet connection 136A. In one embodiment, to achieve the communication in a reliable manner through the Internet, the industry standard method of the use of sockets for communication is implemented in the system design. For example, one embodiment of the current invention incorporates Microsoft Windows version of sockets identified as Winsock. The Winsock layer isolates the application software from network dependencies.

In this embodiment, server software 200 is available at any time for communication connection from one or more client software 100. Client software 100 contains the server 180 Internet address and the port number to be able to connect to the server software 200. The client software 100 connects to the server software 200 using a socket API Connect. The server software 200 accepts client software 100 request with an Accept socket call. The client software 100 and the server software 200 will start exchanging information using Send and Receive once they are successfully connected.

All the data sent and received between client 100 and server 200 are encrypted. In one embodiment of the current invention, the communication encryption scheme employed is an industry standard software implementation known as Secure Sockets Layer (SSL). SSL is a security protocol developed by Netscape and is used to perform data encryption, assure message integrity and validate user authentication.

In one embodiment of the current invention, the SSL version implemented in the design is a Federal Information Processing Standard (FIPS) Publication 140-1 security level 1 certified by the National Institute of Standards and Technology (NIST). This design provides highly secured communication between a client and a server.

In one embodiment, client/server communications take place in two operational states. These are registration and operation. During the registration phase client 100 selects a password; the password is sent to server 200 over the Internet 136A, using triple Data Encryption Standard (DES). Once the SSL triple DES session is established, the client software 100 issues a 64-bit random number (also referred to as a challenge) to server software 200. Server software 200 using a cryptographic device 23440 digitally signs the challenge using the private key of server software 200. Client software 100 uses the corresponding public key of server software 200 to verify the digital signature on the server message. If the signature is valid then the authentication process has been successful and the remainder of registration process continues.

During the operation phase, due to the challenge-response protocol, the password is not directly exposed, therefore a single DES is used for encryption. Once a registered user establishes a SSL session with server 180 an additional challenge-response protocol is used. The server retrieves client's password from the database in which it has been stored in an encrypted form and decrypts it. A hashing keyed message authentication code (HMAC) value of the challenge is generated using the client's password as the key. The challenge with its HMAC is then sent to the client. The client uses its password and the received challenge to verify the received HMAC. If the received HMAC is valid for the received challenge, then the authentication process has been successful, otherwise the communication between client software 100 and server software 200 is interrupted.

In one embodiment of the invention, in addition to the data encryption between client software 100 and server software 200, in order to reduce network traffic and thereby improve the performance of the system, the data exchanged between the client and the server is also compressed as needed.

3. Meter Licensing Process and Postage Payment

To use the on-line postage system a user has to obtain a meter license from the United States Postal Service (USPS). In an embodiment of the invention, client software 100 allows a user to electronically apply for the meter license and obtain a license. The software enables the user to apply for a new meter license, update an existing meter license, check the meter license status, and print the meter license application.

Figure 26:
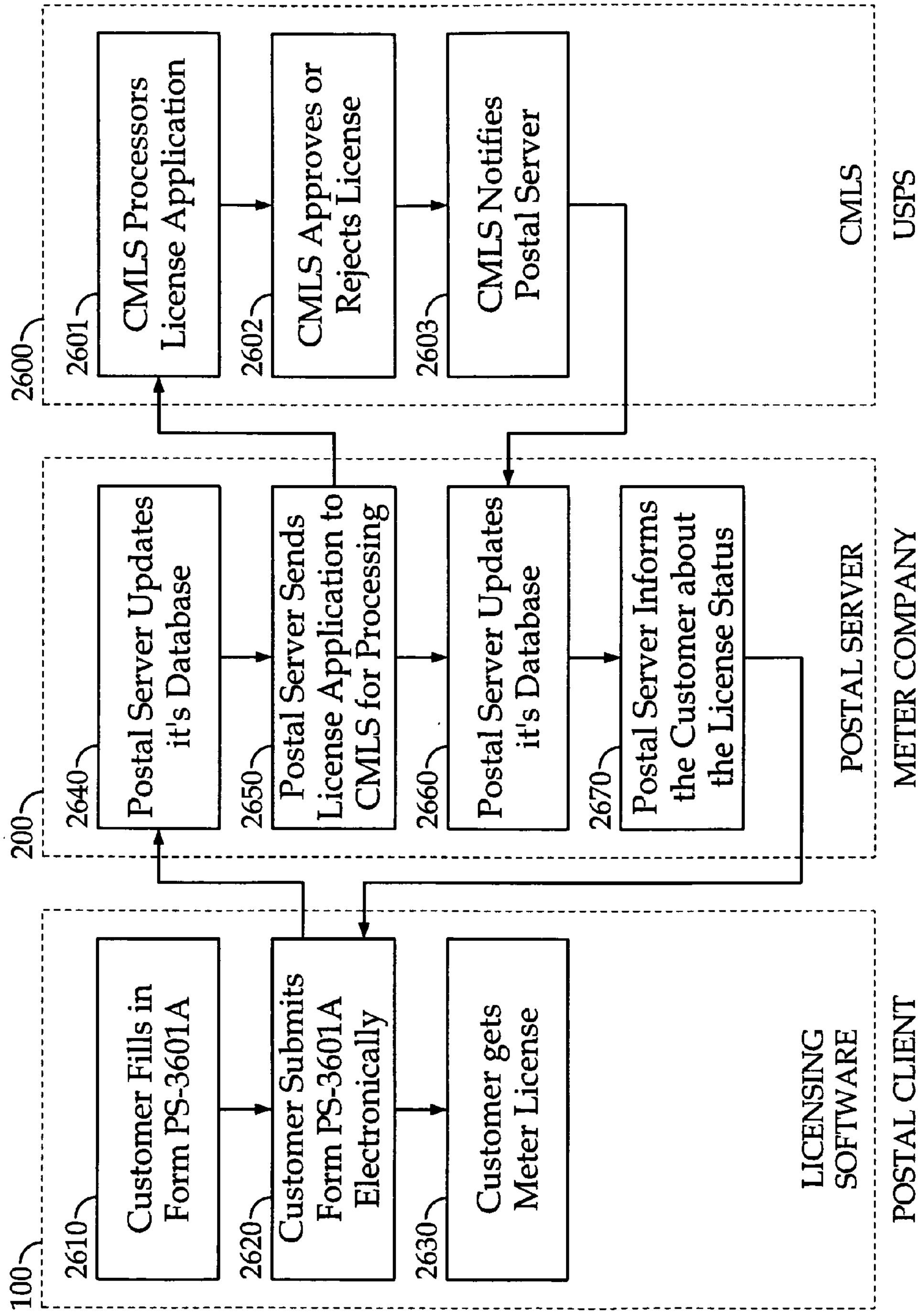
FIG. 26 is a flow diagram illustrating the license application process in one embodiment.

FIG. 26 is a diagram illustrating an embodiment of the invention showing various stages of license application processing. License application processing involves interfacing among a client software 100, a server software 200, and the USPS computer through its Central Meter Licensing System (CMLS) 2600.

In one embodiment, at step 2610 a user fills in form PS-3601 for a license request. At step 2620 the user submits the form electronically to server system 180. At step 2640 server software 200 receives the application and updates its data base. At step 2650 server software 200 sends the data to CMLS. At step 2601 the license application is processed by CMLS. At step 2601 CMLS approves or rejects issuance of a license to requesting user. At step 2603 CMLS software notifies server software 200 of the approval or rejection information. At step 2660 server 200 updates its database. At step 2670 server 200 communicates the license information to client software 100. If the license is approved at step 2630 the user is granted a meter license.

Figure 27:
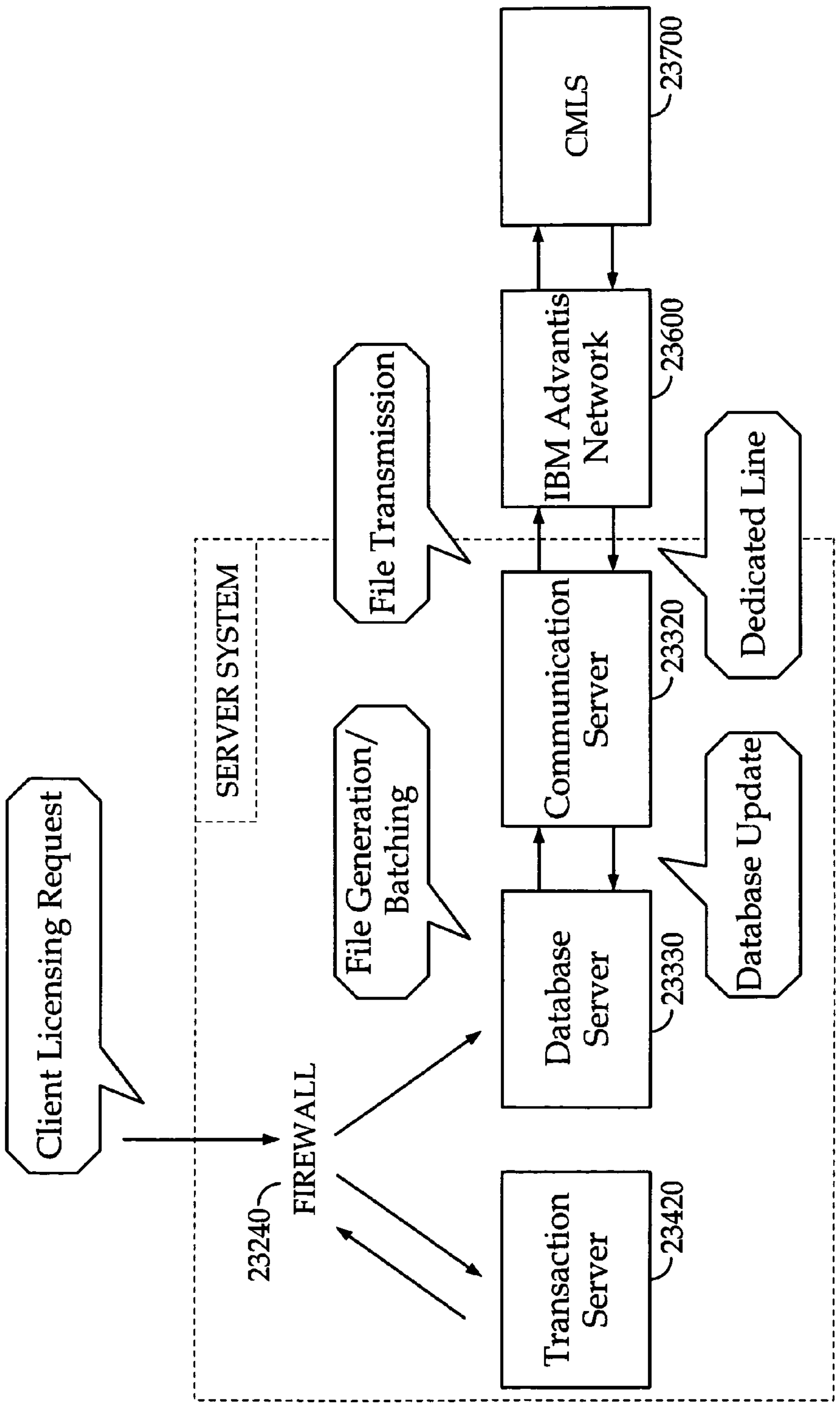
FIG. 27 is a diagram of an embodiment of the current invention, illustrating the CMLS configuration and communication procedure.

FIG. 27 is a diagram illustrating the CMLS configuration and communication procedures in an embodiment of the current invention. Server 180 communicates with CMLS 23700 by utilizing the IBM Advantis network 23600. Database server 23330 generates files containing information to be processed by CMLS 23700. The generated files are collected together and sent to the communication server 23320, after communication server 23320 has properly formatted the files for transmission.

CMLS 23700 replies to server 180 requests by sending the appropriate responses to IBM Advantis Network 23600. IBM Advantis Network 23600 retrieves the data files generated and kept in its mailbox for communication server 23320. Communication server 2320 retrieves the data and sends it to database server 23330 to update corresponding client records.

A user has to purchase postage before the user is able to print the postage indicia via the on-line postage system. The following methods of payment are available to a user for purchasing postage in one embodiment: the automatic clearing house funds transfer (ACH), credit card, debit card and electronic funds transfer.

In one embodiment of the invention, a client may select a method of payment. Once the user selects a particular method of payment the information is communicated to server 180 and server 180 initiates the necessary processing to effectuate payment to the USPS.

In the case of an ACH transaction, once the user has provided an ABA routing number and a bank account number the information is transmitted to the server 180. Database server 23330 processes the data in standard ACH debit format for each client. In an embodiment of the invention, the information is then sent to Citibank communication center 23500, (Citibank being the USPS lock box account bank). Citibank further processes the funds transfer and credits the client's account.

Other financial transactions generated by server 180 are sent to the Central Meter Resetting System (CMRS). Database server 23330 generates all the financial status files and sends them to the CMRS through the IBM Advantis network 23600.

4. Cryptographic Process

The cryptographic process employed in one embodiment of the current invention is based on public key cryptography and a cryptographic hardware device 23340 or 23440 (StampMaster PSD), which meets the FIPS 140-1 level 3 requirements for operation and level 4 requirements for physical security.

The cryptographic devices 23340 and 23440 incorporated in the server 180 infrastructure provide high performance Data Encryption Standard (DES) and Rivest Shamir Adleman (RSA) cryptographic processing. The cryptographic processes are performed within a secure enclosure that is designed to meet the stringent requirements of FIPS 140-1 security level 4. All software operating within the cryptographic device's secure environment is first authenticated using digital signature techniques.

In one embodiment, server 180 initiates the key management process on receiving a certificate from the USPS Certificate Authority (CA) comprising a CA's public key, common parameters for the RSA algorithm, and a hash value consisting of the concatenation of the next public key and the next set of common parameters. The USPS RSA public key and its associated modulus are generated by the USPS and distributed according to the USPS key management plan. The modulus length is 1024 bits. The USPS certificate provided to the server 180 is stored in the database server 23330 and retrieved when necessary.

In one embodiment, server RSA key pair is generated by the cryptographic device 23440. The server private key is encrypted also by the cryptographic device 23440 utilizing the root key of the cryptographic device. The encrypted private key is stored on the database server 23330 for retrieval. The server public key is certified by the USPS CA. For each client, a PSD RSA key pair is also generated by the cryptographic device. These client PSD private keys are also encrypted by the cryptographic device 23440 by utilizing the cryptographic device root key. The client PSD public key is signed by the server private key and sent to the USPS CA for certification. The client PSD private key is used by the cryptographic device to generate the digital signatures for the postal indicia, and the client PSD public key is used by the USPS to verify and validate the postal indicia. Another server RSA key pair which is used to sign and verify the client software executable code is also generated by cryptographic device 23440. This private key is also encrypted by cryptographic device 23440 by utilizing the root key. It is stored in the database server 23330 and retrieved as needed.

Figure 28:
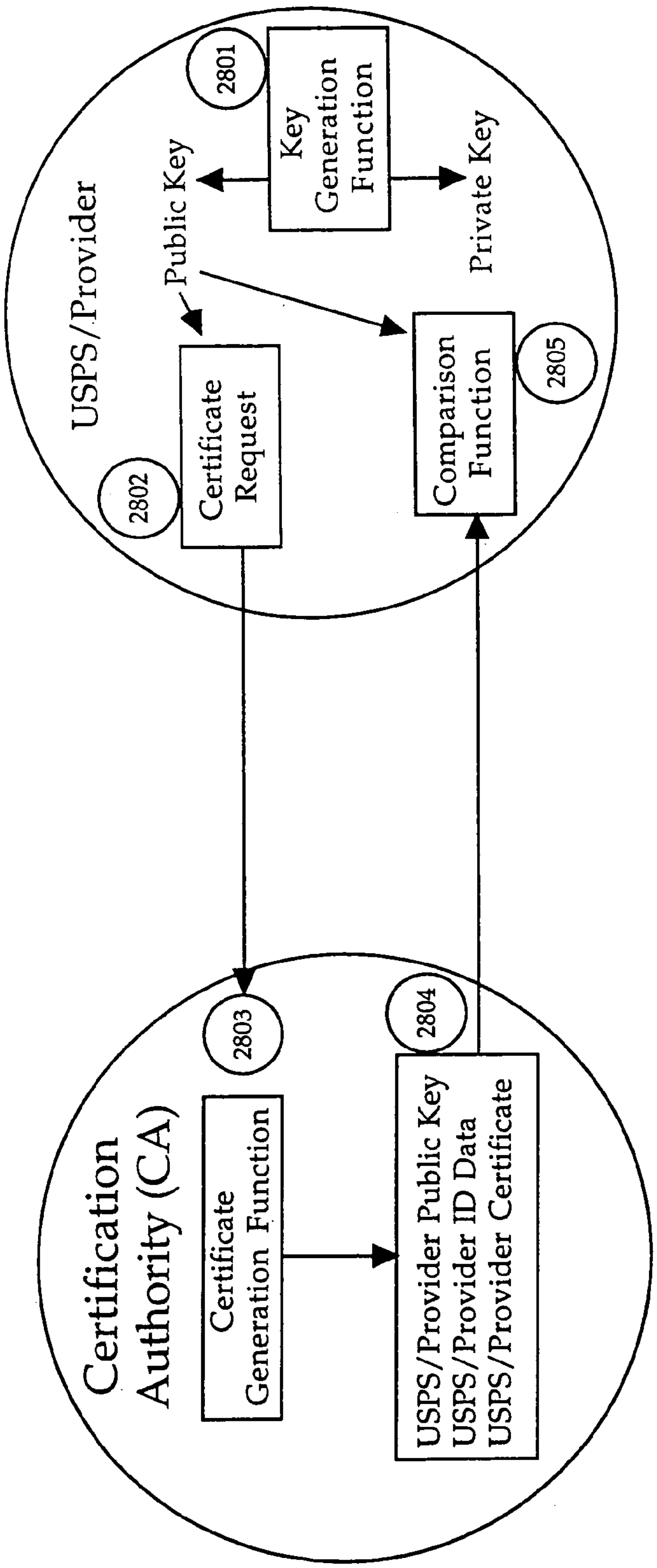
FIG. 28 is a diagram according one of the embodiments of this invention, illustrating the interface for obtaining a server 180 public key certificate.

FIG. 28 is a diagram according to one of the embodiments of this invention, illustrating the interface for obtaining server 180 public key certificate. In step 2801*a* public and a private key are generated by the USPS. In step 2802 the public key is formatted to conform to the Certification Request Syntax Standard for a request. In step 2803 the public key request is electronically sent to the USPS CA. The request will be self-signed with the generated private key corresponding to the public key in the request. In step 2803, the CA, upon receiving the request, verifies the signature using the public key in the request and then generates a new X.509 certificate. Server 180 obtains the X.509 certificate and initiates the process to generate the PSD RSA key pair for each client and obtains a certificate for each client at step 2804.

In an embodiment of the invention, once the PSD RSA key pair for each client 150 is generated, the public key is taken and signed with the server's private key and sent to the USPS CA for certificate creation. The request for certificate creation conforms to the Certificate Request Syntax Standards. The CA verifies the received data using the server's public key and creates the certificate and sends it back to server 180.

5. Mail Piece Generation

Figure 29:
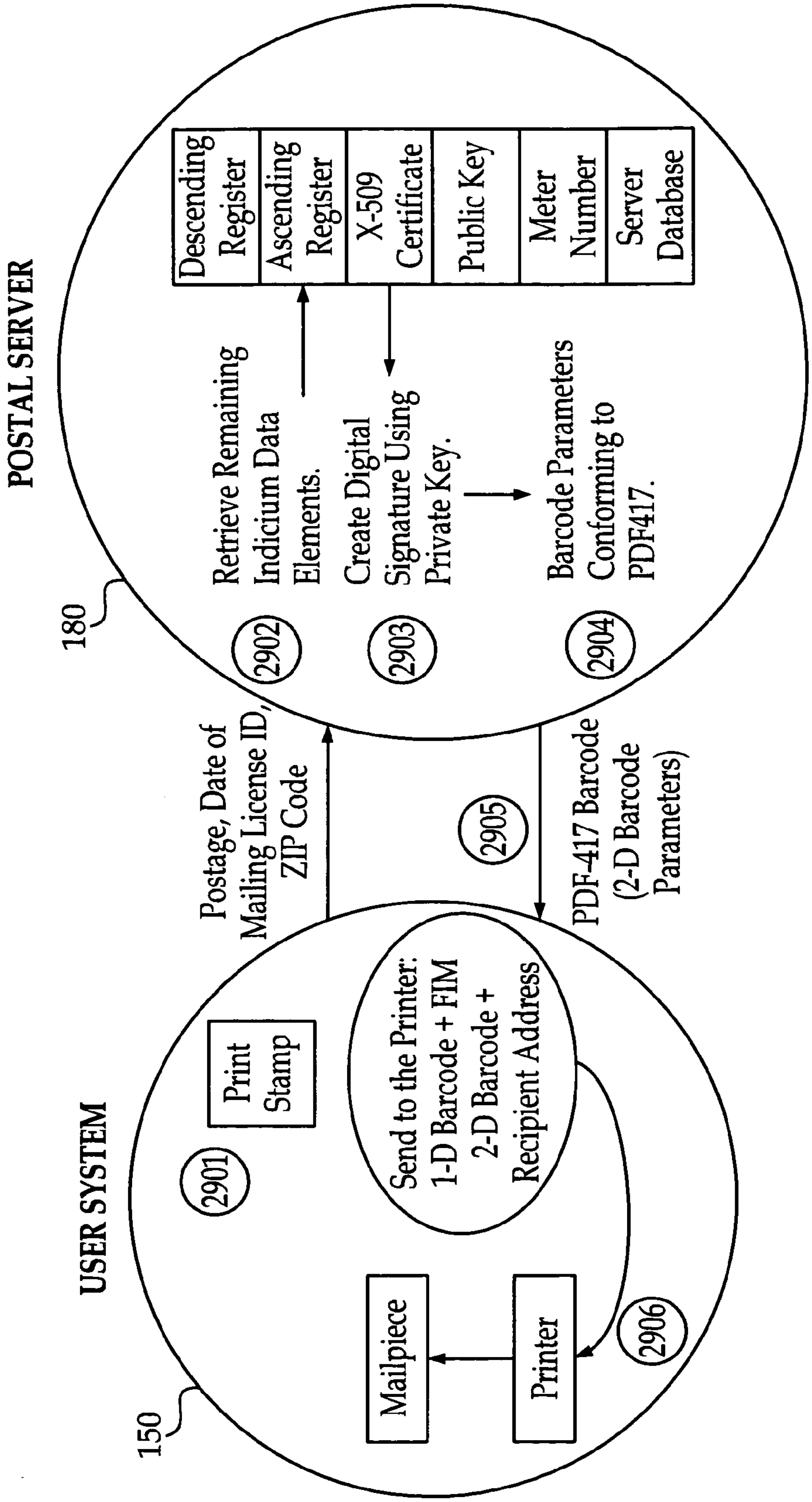
FIG. 29 is a diagram according to an embodiment of this invention, illustrating the steps taken in the generation of a mail piece.

FIG. 29 is a diagram according to an embodiment of this invention, illustrating the steps taken in the generation of a mail piece. Client software 100 in association with server software 200 provide a user graphic interface for the intake and processing of information entered by a client.

In step 2901*a* user activates a print stamp button in a dialogue window. In step 2902 information such as the amount of the postage or the weight of the mail piece from which the accurate postage is to be computed by the server, date of mail, destination address, license identification and other relevant data are transferred to the server 180. In step 2903 the cryptographic device 23440 generates a unique digital signature for the digital signature field of the two dimensional bar code that is part of the cryptographic postage indicia. In step 2904 all other necessary parameters that are required to generate the two dimensional barcode conforming to PDF417 assembled. In step 2905 these parameters are provided to client 150. In step 296 a barcode is generated and printed by client software 200 in accordance to the information transmitted in step 2905.

6. Other Embodiments

The on-line postage system of this invention in one embodiment provides means for download of the entire software system via the Internet or another suitable communication medium. In another embodiment, it can be accessed through a portal, for example it can be accessed from a webpage with a hotlink jump to the location on the Internet where the on-line postage system may be accessed. In another embodiment, a client system acts as an administrator system, providing selected options of the on-line postage system of this invention to locally connected client systems with limited operational capabilities.

Thus, the on-line postage system has been described. In alternate embodiments, this invention can be used for other secure server based client printing applications. For example, the server can generate images of checks, tickets, coupons, or certificates and transmit them securely to a client for printing on a client's printer. This invention can therefore be applied to print symbols other than postage indicia in a secure authenticated manner.

I claim:

1. A method for secure processing of items having value in a computer network comprising a plurality of user terminals comprising:

establishing a connection between a database system and a user terminal via a network;

in response to the connection, activating a secure application on the user terminal;

sending a request for an item of value from said user terminal to said database system;

receiving, in response to the request, an authorization message comprising image information corresponding to the item of value by the user terminal;

performing a secure function by the secure application using the image information;

continuously verifying the connection by the user terminal by: receiving a first password from said database system, generating a second password using a system time of said user terminal, and comparing the second password and the first password;

and based on the comparing, maintaining the connection between the database system and the user terminal, and activation of the secure application.

2. The method of claim 1 wherein said image information comprises image information for printing a postal indicium.

3. The method of claim 1 wherein said image information comprises image information for printing a check.

4. The method of claim 1 wherein said image information comprises image information for printing a ticket.

5. The method of claim 1 wherein said image information comprises image information for printing a coupon.

6. A system for secure processing of items having value in a computer network comprising a plurality of user terminals wherein each of said plurality of user terminals comprises:

a processor;

a memory connected to the processor, the memory storing executable instructions that when executed causes the processor to perform the steps of:

establishing a connection between a database system and a user terminal of said plurality of user terminals via a network;

in response to the connection activating secure application on the user terminal;

sending a request for an item of value from said user terminal to said database system;

receiving, in response to the request, an authorization message comprising image information corresponding the item of value by the user terminal;

performing a secure function by the secure application using the image information;

continuously verifying the connection by the user terminal by receiving a first password from said database system, generating a second password using a system time of said user terminal, and comparing the second password and the first password;

and based on the comparing, maintaining the connection between the database system and the user terminal, and activation of the secure application.

7. The system of claim 6 wherein said image information comprises image information for printing a postal indicium.

8. The system of claim 6 wherein said image information comprises image information for printing a check.

9. The system of claim 6 wherein said image information comprises image information for printing a ticket.

10. The system of claim 6 wherein said image information comprises image information for printing a coupon.

11. A method for secure processing of items having value in a computer network comprising a vendor system comprising:

establishing a connection between a vendor system and a user terminal via a network;

in response to the connection, transmitting by the vendor system a secure application activating code to the user terminal;

receiving a request for an item of value from said user terminal by said vendor system;

sending, by the vendor system, in response to the request, an authorization message comprising image information corresponding to the item of value to the user terminal;

monitoring by the vendor system a performing of a secure function by the secure application using the image information;

continuously verifying the connection by the vendor system by receiving a system time of said user terminal, generating a first password using the system time of said user terminal, and transmitting the first password to the user terminal;

and based on the continuously verifying, maintaining the connection between the vendor system and the user terminal, and activation of the secure application by the vendor system.

12. The method of claim 11 wherein said image information comprises image information for printing a postal indicium.

13. The method of claim 11 wherein said image information comprises image information for printing a check.

14. The method of claim 11 wherein said image information comprises image information for printing a ticket.

15. The method of claim 11 wherein said image information comprises image information for printing a coupon.

16. A system for secure processing of items having value in a computer network comprising a vendor system comprising:

a processor;

a memory connected to the processor, the memory storing executable instructions that when executed cause the processor to perform the steps of:

establishing a connection between the vendor system and a user terminal via a network;

in response to the connection, transmitting by the vendor system a secure application activating code to the user terminal;

receiving a request for an item of value from said user terminal by said vendor system;

sending, by the vendor system, in response to the request, an authorization message comprising image information corresponding to the item of value to the user terminal;

monitoring by the vendor system a performing of a secure function by the secure application using the image information;

continuously verifying the connection by the vendor system by receiving a system time of said user terminal, generating a first password using the system time of said user terminal, and transmitting the first password to the user terminal;

and based on the continuously verifying, maintaining the connection between the vendor system and the user terminal, and activation of the secure application by the vendor system.

17. The system of claim 16 wherein said image information comprises image information for printing a postal indicium.

18. The system of claim 16 wherein said image information comprises image information for printing a check.

19. The system of claim 16 wherein said image information comprises image information for printing a ticket.

20. The system of claim 16 wherein said image information comprises image information for printing a coupon.

* * * * *